United States Patent
Balaoro et al.

(10) Patent No.: US 11,900,350 B2
(45) Date of Patent: Feb. 13, 2024

(54) AUTOMATIC INVENTORY TRACKING IN BRICK AND MORTAR STORE BASED ON SENSOR DATA

(71) Applicant: Block, Inc., Oakland, CA (US)

(72) Inventors: Marvin Balaoro, San Francisco, CA (US); Nicholas Slaney, San Francisco, CA (US); Brett Andler, San Francisco, CA (US); Nikolaj Leschly, Alameda, CA (US); Jeremy Martin, Oakland, CA (US); Joshua Boilard, San Francisco, CA (US); Isreal Blagdan, San Francisco, CA (US); Patrick Willett, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/355,015

(22) Filed: Jun. 22, 2021

(65) Prior Publication Data
US 2022/0374855 A1 Nov. 24, 2022

Related U.S. Application Data

(60) Provisional application No. 63/191,906, filed on May 21, 2021.

(51) Int. Cl.
*G06Q 20/20* (2012.01)
*H04W 4/80* (2018.01)
*G06Q 20/40* (2012.01)

(52) U.S. Cl.
CPC ......... *G06Q 20/203* (2013.01); *G06Q 20/204* (2013.01); *G06Q 20/209* (2013.01); *G06Q 20/401* (2013.01); *H04W 4/80* (2018.02)

(58) Field of Classification Search
CPC .. G06Q 20/203; G06Q 20/204; G06Q 20/209; G06Q 20/401; H04W 4/80
See application file for complete search history.

(56) References Cited

U.S. PATENT DOCUMENTS 10,078,003 B2 * 9/2018 Gurumohan ........... A47G 19/00
10,318,569 B1 * 6/2019 Funk .................... G06Q 10/087
(Continued)

FOREIGN PATENT DOCUMENTS

WO   WO-2020181066 A1 * 9/2020 ......... G06K 9/00624

*Primary Examiner* — Michael Jared Walker
(74) *Attorney, Agent, or Firm* — Polsinelli PC

(57) ABSTRACT

A brick-and-mortar (BAM) store control system uses sensors and wireless transceivers to track customers, merchant representatives, devices, and/or objects within a BAM store area. The system can identify and track product and/or service inventory within the BAM store area and/or in individual's personal inventories, for instance by detecting movements of objects by individuals in sensor data. The system can generate inventory replenishment schedules, for instance based on inventory quantity patterns. The system can provide recommendations to customers and/or merchants, for example recommending products that customers have interacted with. The system can identify individuals and/or objects using a machine learning algorithm, which can learn based on feedback. The system can generate temporary identifiers for unrecognized individuals or objects, which it can merge or convert into long-term identifiers as more information is received. The system can recognize sensitive information based on secure identifiers generated based on the sensitive information.

20 Claims, 22 Drawing Sheets

(56) References Cited

U.S. PATENT DOCUMENTS

| | | | | |
|---|---|---|---|---|
| 10,430,798 B2* | 10/2019 | Volpi | G06Q 30/0238 |
| 10,516,982 B2* | 12/2019 | Jiang | H04W 4/80 |
| 10,861,086 B2* | 12/2020 | Glaser | H04N 7/181 |
| 10,885,336 B1* | 1/2021 | Davis | G06N 7/005 |
| 10,963,704 B2* | 3/2021 | Glaser | G08B 13/2402 |
| 11,132,658 B2* | 9/2021 | Hara | G06Q 20/203 |
| 2014/0179231 A1* | 6/2014 | Charania | G06Q 20/32 455/41.2 |
| 2015/0012396 A1* | 1/2015 | Puerini | G06Q 10/0875 705/28 |
| 2016/0203431 A1* | 7/2016 | Renfroe | G06Q 30/0641 705/7.25 |
| 2018/0139570 A1* | 5/2018 | Calvarese | G06K 7/0004 |
| 2019/0007381 A1* | 1/2019 | Isaacson | G06Q 20/20 |
| 2019/0147446 A1* | 5/2019 | Varma | G06Q 20/202 705/28 |
| 2019/0149725 A1* | 5/2019 | Adato | G06V 20/17 348/158 |
| 2019/0281030 A1* | 9/2019 | Isaacson | G06Q 20/40 |
| 2019/0392189 A1* | 12/2019 | Kumar | G06K 9/6288 |
| 2019/0392220 A1* | 12/2019 | Maan | G06Q 20/202 |
| 2021/0004606 A1* | 1/2021 | Se | G06T 7/215 |

* cited by examiner

AUTOMATIC INVENTORY TRACKING IN BRICK AND MORTAR STORE BASED ON SENSOR DATA

CROSS-REFERENCE TO RELATED APPLICATIONS

This application claims the benefit of, and priority to, U.S. Provisional Patent Application No. 63/191,906, filed May 21, 2021, entitled AUTOMATED ASSISTANCE BASED ON SENSOR DATA, the full disclosure of which is incorporated herein by reference in its entirety.

TECHNICAL FIELD

A merchant operating a brick and mortar (BAM) store can initiate transactions between the merchant and a customer using a point of sale (POS) device. For example, the POS device can include a payment card reader device, which can read payment card information from the customer's payment card for use in a transaction. Payment card reader devices can read payment card information from a magnetic stripe of a payment card, a chip of a payment card, or from near field communication (NFC) signals from a payment card. The POS device can send the payment card information to a card processing entity, a card issuing entity, and/or a financial institution (e.g., a bank) for approval of the transaction and transfer of funds. In addition to handling payments, the POS device can serve other functions, such as tracking the merchant's inventory.

Some BAM store areas include security cameras. Security cameras traditionally used in BAM store areas are generally limited to specific uses, for instance monitoring by a security staff member. Security cameras generally do not interact with other systems associated with the BAM store area.

Mobile computing devices, such as smartphones, mobile handsets, wearable devices, or tablet computers, are computing devices with mobile and/or portable form factors. Mobile computing devices often include display screens, input interfaces, and sensors such as cameras. Mobile computing devices are increasingly popular among both customers and merchants.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

Figure 1:
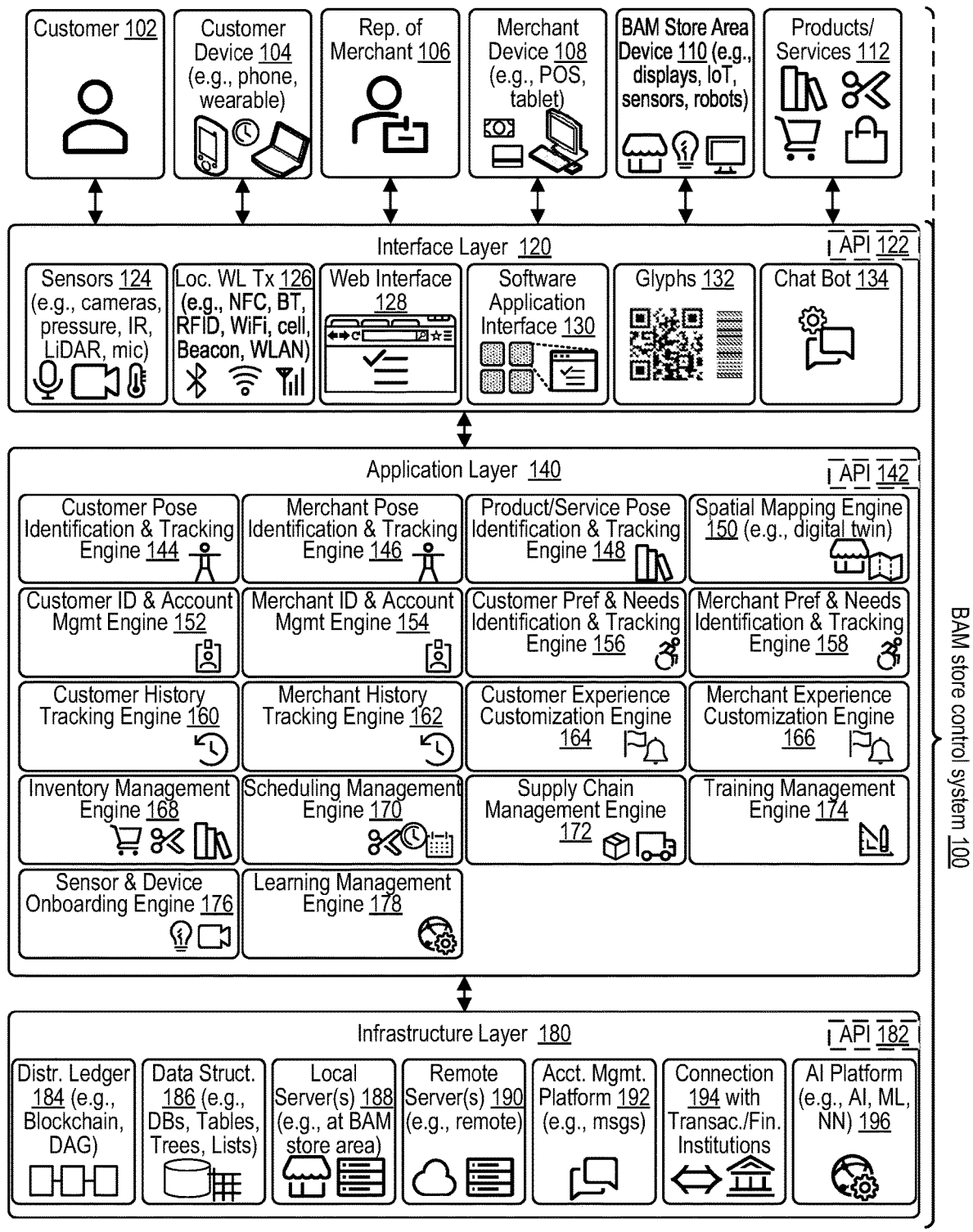
FIG. 1 is a block diagram illustrating an architecture of a brick and mortar (BAM) store control system.

As customers become more comfortable interacting with merchants online, customers also are beginning to expect those merchants to offer some of the customization and personalization found online in brick and mortar store locations. However, the majority of merchants are still relatively small businesses that are unlikely to have the complex and customized software and hardware necessary to provide the type of customer experience that the modern customer desires.

Accordingly, the present technology provides a BAM store control system for which merchants can request and install a variety of applications that can be useful to provide the type of customer experience that the modern customer desires. For example, merchants may have a merchant account with a provider of the present BAM store control system. Merchants can apply one or more applications provided by the BAM store control system to interface with the merchant account and interface with other applications provided by the BAM store control system.

Some of the applications provided by the BAM store control system can collect and interpret data associated with merchant account and information known about customers to provide additional customizations, information, or services to the merchant. Some of the applications provided by the BAM store control system can be used to interface with one or more hardware sensors installed in the merchant point of sale or installed generally throughout and/or outside the merchant brick and mortar store area.

The BAM store control system can also provide one or more interfaces such as sensors, web interfaces, apps, or virtual assistants (chat bots) to work on behalf of a merchant to interface with a consumer.

In this way, the BAM store control system of the present technology can lower the barrier to merchants, especially small merchants, to take advantage of state-of-the-art techniques for managing their brick and mortar locations and for providing a better customer experience.

Systems and methods are described herein for merchant retail customization based on sensor data. A merchant can operate a brick-and-mortar (BAM) store area. A BAM store area can be referred to as a physical store area, a tangible store area, a corporeal store area, a geographic store area, a structural store area, a building-based store area, a structure-based store area, a storefront, a storefront area, a physical storefront, a tangible storefront, a corporeal storefront, a geographic storefront, a structural storefront, a building-based storefront, a structure-based storefront, a BAM storefront, a BAM storefront area, a BAM area, a store area, a retail area, or a combination thereof. The merchant can use a BAM store control system that supports the BAM store area and that provides customized information to merchants and/or customers based on events that the BAM store control system identifies within the BAM store area. The BAM store control system can include one or more point of sale (POS) devices in the BAM store area. The merchant can use the POS systems to initiate transactions between the merchant and customers. The BAM store control system can include various interface technologies, such as sensors and local wireless transceivers. The BAM store control system can use information gathered through the interface technologies to identify events occurring within the BAM store area and/or to interact with other devices in the BAM store area. The BAM store control system can perform actions that provide customized experiences for customers and merchants based on events occurring within the BAM store area.

For instance, the BAM store control system can use a local wireless transceiver in the BAM store area to identify a position of a wireless communication device in the BAM store area. The BAM store control system can use a camera in the BAM store area to identify, within image data from the camera, a visual representation of an individual, such as an individual associated with the wireless communication device and at the identified position of the wireless communication device. The camera can also be used to identify individuals not associated with a wireless communication device. The BAM store control system can identify individuals as customers, merchants, or representatives of merchants. The BAM store control system can identify and/or track positions and orientations of individuals, their bodies (e.g., their faces, their hands), products (e.g., objects or services), and devices that are inside the BAM store area, entering into the BAM store area, exiting from the BAM store area, outside the BAM store area, or combinations thereof.

The BAM store control system can identify interactions between individuals and products, between products and products (e.g., objects or services), and between individuals and individuals, for instance by identifying when an individual moves an object into or out of a merchantable inventory area for that object. The BAM store control system can adjust a merchantable inventory of the object based on detected movements of objects into or out of merchantable inventory areas. For instance, the BAM store control system can increase a merchantable inventory of an object when the BAM store control system identifies that a representative of a merchant has brought more of the object into a merchantable inventory area to replenish merchantable inventory of the object. The BAM store control system can decrease the merchantable inventory of the object when the BAM store control system identifies that a customer has taken the object from the merchantable inventory area to purchase the object. If the BAM store control system identifies that a customer has taken the object, the BAM store control system can identify the object in a personal inventory data structure (e.g., virtual shopping cart) associated with the customer.

The BAM store control system can correlate specific tracked individuals and/or devices with temporary identifiers and/or long-term identifiers. The BAM store control system can identify preferences or needs associated with customers and/or merchants. The BAM store control system can manage merchant retail inventories of particular products or services. The BAM store control system can manage personal inventory data structures of customers, which the BAM store control system can share with a POS device and/or another merchant device, and can use for automatic transaction processing, restocking, and replenishment. The BAM store control system can provide scheduling, training, sensor onboarding guidance, customer information guidance, and other information to representatives of merchants.

Technical problems with traditional BAM store systems include sensors generally being limited to security cameras, and outputs of sensors (e.g., security cameras) generally being limited to human monitoring by security staff, with no connectivity to any other system or usability for any other purpose. Traditional BAM store systems thus generally cannot automatically track positions of people, devices, products, services, or other objects within and/or relative to BAM store areas.

The BAM store control systems and methods described herein provide technical improvements and/or benefits such as expanding functionality of camera data from cameras for automatically tracking customers, merchants, representatives of merchants, devices, products, services, and/or other objects, for instance using the customer pose identification and tracking engine 144, the merchant pose identification and tracking engine 146, the product/service pose identification and tracking engine 148, the spatial mapping engine 150, the customer identifier and account management engine 152, the merchant identifier and account management engine 154, the customer preferences and needs identification and tracking engine 156, the merchant preferences and needs identification and tracking engine 158, the customer history tracking engine 160, the merchant history tracking engine 162, the customer experience customization engine 164, the merchant experience customization engine 166, the inventory management engine 168, the scheduling management engine 170, the supply chain management engine 172, the training management engine 174, the sensor and device onboarding engine 176, the learning management engine 178, or a combination thereof.

The BAM store control systems and methods described herein provide technical improvements and/or benefits such as expanding types of devices and/or elements that can be used to track customer and/or merchant activities in and/or relative to a BAM store area, such as cameras, pressure sensors, infrared (IR) sensors, light detection and ranging (LIDAR) sensors, biometric sensors, other sensors 124, local wireless transceivers 126, BAM store area devices 110, web interfaces 128, software application interfaces 130, glyphs 132, chat bots 134, other devices described herein, other elements described herein, or combinations thereof. The BAM store control systems and methods described herein are therefore able to consistently and precisely track customers, merchants, representatives of merchants, devices, products, services, and/or other objects within and/or relative to a BAM store area. By automatically tracking customers, merchants, representatives of merchants, devices, products, services, and/or other objects, using cameras, other sensors, and other tracking elements, the BAM store control systems and methods described herein can automatically assist merchants and representatives of merchants with supply chain management, product or service replenishment, training, scheduling, tracking customer interests, tracking customer personal inventories, tracking merchant merchantable inventories, assisting customers with finding products or services.

Automation of such assistive operations by the BAM store control systems and methods described herein can increase speed, efficiency, bandwidth, and/or throughput of BAM store merchant systems. For instance, automatically detecting customer activities and/or tracking customer personal inventories can allow merchants to check customers out more quickly and efficiently, and even automatically without merchant input in some examples. Checking customers out more quickly and efficiently can increase how many customers BAM store merchant systems can check out in a given time period, increasing bandwidth and/or throughput and/or efficiency of BAM store merchant systems. Automatically detecting customer and/or merchant activities, tracking merchant merchantable inventories, managing supply chains, and/or generating replenishment schedules can improve customization, efficiency, and flexibility of BAM store merchant systems of merchants and of systems associated with suppliers of merchants (e.g., manufacturers, distributors, warehouses). Automatically generating recommendations for customers and/or merchants, and/or providing the recommendations to the customers and/or the merchants, can improve customization, personalization, and flexibility of BAM store merchant systems.

FIG. 1 is a block diagram illustrating an architecture of a BAM store control system 100. The architecture of the BAM store control system 100 includes three layers—an interface layer 120, an application layer 140, and an infrastructure layer 180. In some examples, the BAM store control system 100 can include other devices and/or elements, such as one or more customers 102, one or more customer devices 104 associated with the one or more customers 102, one or more representatives of merchant(s) 106, one or more merchant devices 108 associated with the one or more representatives of merchant(s) 106, one or more BAM store area devices 110 that are located in a BAM store area, one or more products and/or services 112, or a combination thereof.

The interface layer 120 can generate and/or provide one or more interfaces that can interact with individuals, devices, products, services, other elements of a BAM store area, or combinations thereof. The interface layer 120 can generate and/or provide one or more interfaces that can interact with individuals, such as customers 102 or representatives of merchants 106. The interface layer 120 can identify positions, orientations, poses, preferences, payment accounts, shopping lists, purchase histories, schedules, and other properties of the individuals. The interface layer 120 can include interfaces through which the individuals can provide inputs to the BAM store control system 100. The interface layer 120 can generate and/or provide one or more interfaces that can interact with products and/or services 112. The interface layer 120 can identify positions, orientations, poses, histories, and other properties of products and/or services 112.

The interface layer 120 can generate and/or provide one or more interfaces that can interact with devices, such as customer devices 104, merchant devices 108, and/or BAM store area devices 110. The interface layer 120 can receive data from the devices, transmit data to the devices, identify positions of the devices, identify properties of the devices, or combinations thereof. Customer devices 104 can include devices associated with customers 102, such as cellular phones, smartphones, mobile handsets, tablet devices, laptops, wearable devices, earpieces, mobile devices, portable devices, head-mounted display (HMD) devices, augmented reality (AR) devices, virtual reality (VR) devices, mixed reality (MR) devices, extended reality (XR) devices, portable media devices, portable gaming consoles, any type of devices discussed with respect to the computing system 1500, or a combination thereof. Merchant devices 108 can include devices associated with merchants and/or representatives of merchants 108, such as point of sale (POS) devices, card reader devices, cash registers, scanners, inventory management systems, security systems, any type of device discussed with respect to the customer devices 104, or a combination thereof. BAM store area devices 110 can include displays, speakers, light sources (e.g., light-emitting diodes), internet-of-things (IoT) devices, sensors (e.g., such as sensors 124), robots, any type of device discussed with respect to the customer devices 104, or a combination thereof.

As noted above, merchant devices 108 can include POS devices and/or card reader devices. A merchant device 108, such as a POS device and/or a card reader device, can include one or more payment object reader interfaces. The payment object reader interfaces can include a magnetic stripe reader that reads payment instrument information from a magnetic stripe of a payment instrument, such as a payment card. The magnetic stripe reader can read the payment instrument information from the magnetic stripe of a payment instrument while the payment instrument is in a reading area, such as a slot that the payment instrument is swiped through. The payment object reader interfaces can include an integrated circuit (IC) chip reader that reads payment instrument information from an IC chip of a payment instrument, such as a payment card. The IC chip may, for example, be a Europay-Mastercard-Visa (EMV) chip, a smart card chip, a subscriber identity module (SIM) card chip, or an IC chip with a similar design. The IC chip reader can read the payment instrument information from the IC chip of a payment instrument while the payment instrument is in a reading area, such as a slot that the payment instrument is inserted into. The payment object reader interfaces can include a near field communication (NFC) reader that reads payment instrument information wirelessly from a wireless signal received from an NFC transmitter or NFC transceiver of a payment instrument. The NFC transmitter or NFC transceiver of the payment instrument may be an active NFC transmitter/transceiver or passive NFC transmitter/transceiver. The NFC reader can read the payment instrument information from the NFC transmitter or NFC transceiver of a payment instrument while the payment instrument is in a reading area, such as an area in NFC communication range of the NFC reader. The reading area may be referred to as a reading section, a reading portion, a reading region, a receiving area, a receiving section, a receiving portion, a receiving region, an interface area, an interface section, an interface portion, an interface region, a payment area, a payment section, a payment portion, a payment region, a transaction area, a transaction section, a transaction portion, a transaction region, or a combination thereof.

In some examples, the interface layer 120 includes one or more sensors 124. In some examples, the sensors 124 can be part of the interface layer 120. In some examples, the sensors 124 include sensor interfaces for sensors that are included in the BAM store area devices 110 and/or merchant devices 106. Sensors can be IOT devices that can communicate with or without a hub. The sensors 124 can include, for example, one or more cameras, one or more image sensors, one or more pressure sensors, one or more radio detection and ranging (RADAR) sensors, one or more light detection and ranging (LIDAR) sensors, one or more sound detection and ranging (SODAR) sensors, one or more sound navigation and ranging (SONAR) sensors, one or more structured light sensors, one or more time of flight (ToF) sensors, one or more microphones, one or more infrared (IR) sensors, one or more depth sensors, one or more thermometers, one or more touch sensors, one or more touch-sensitive surfaces (e.g., of one or more trackpads and/or one or more touchscreens), one or more signature input touchpads, one or more fingerprint sensors, one or more voiceprint sensors, one or more iris scanner sensors, one or more face scanner sensors, one or more other biometric sensors, one or more accelerometers, one or more gyroscopes, one or more inertial measurement units (IMUs), one or more altimeters, one or more barometers, one or more barcode scanners, one or more quick response (QR) code scanners, one or more proximity sensors, one or more button press sensors, one or more sensors associated with positioning of a mouse pointer, one or more keyboard/keypad button press sensors, one or more current sensors, one or more voltage sensors, one or more resistance sensors, one or more impedance sensors, one or more capacitance sensors, one or more network traffic sensors, or a combination thereof. Cameras and image sensors can be sensitive to one or more portions of the electromagnetic spectrum, such as the visible light spectrum, the infrared (IR) spectrum the ultraviolet (UV) spectrum, the microwave spectrum, the radio wave spectrum, the x-ray spectrum, the gamma spectrum, subsets thereof, or combinations thereof. The BAM store control system 100 can, for example, identify representations of individuals (e.g., customers 102 or representatives of merchants 106) or objects (e.g., customer devices 104, merchant devices 108, BAM store area devices 110, or products/services 112) within sensor data captured by the sensors 124. In some cases, cameras, depth sensors, or other sensors 124 can be positioned so as to capture sensor data spanning a large portion of a BAM store area. In some cases, cameras, depth sensors, or other sensors 124 can be positioned so as to capture sensor data for a small area, such as an individual shelving unit or other merchantable inventory area. In some cases, access to sensor data from one or more sensors 124 can be shared between multiple BAM store areas and/or merchants. For instance, a single camera or other sensor 124 may have a view of the entrances and/or exits of multiple adjacent stores (e.g., such as the camera 215S of FIG. 2H), and its image data may in some cases be accessed by BAM store control systems 100 associated with each of the BAM store areas of each of the stores. If situations where one store is inside another store (as in the store-within-store area 255 in the first inner BAM store area 240 of FIG. 2H), certain cameras or other sensors 124 can have views that include both stores (e.g., such as the cameras 215N-215R of FIG. 2H), and their image data may in some cases be accessed by BAM store control systems 100 associated with each of the BAM store areas of each of the stores. In some cases, merchants with multiple branches may also share sensor data from sensors 124 between BAM store control systems 100 associated with different branches.

In some examples, the interface layer 120 includes one or more local wireless transceivers 126. In some examples, the one or more local wireless transceivers 126 can be part of the interface layer 120. In some examples, the local wireless transceivers 126 include local wireless transmitter interfaces for local wireless transmitters that are included in the BAM store area devices 110 and/or merchant devices 106. Either way, the local wireless transceivers 126 can include, for example, radio frequency identification (RFID) receivers, RFID transmitters, RFID transceivers, near field communication (NFC) receivers, NFC transmitters, NFC transceivers, Bluetooth® receivers, Bluetooth® transmitters, Bluetooth® transceivers, Bluetooth® Low Energy (BLE) receivers, BLE transmitters, BLE transceivers, Wi-Fi receivers, Wi-Fi transmitters, Wi-Fi transceivers, wireless local area network (WLAN) receivers, WLAN transmitters, WLAN transceivers, personal area network (PAN) receivers, PAN transmitters, PAN transceivers, beacon receivers, beacon transmitters, beacon transceivers, proximity receivers, proximity transmitters, proximity transceivers, other types of local wireless receivers, other types of local wireless transmitters, other types of local wireless transceivers, or combinations thereof. In some examples, the one or more local wireless transceivers 126 can send one or more local wireless signals to one or more customer devices 104, merchant devices 108, BAM store area devices 110, or combinations thereof. In some examples, the one or more local wireless transceivers 126 can receive one or more local wireless signals to one or more customer devices 104, merchant devices 108, BAM store area devices 110, or combinations thereof. In some examples, the one or more local wireless transceivers 126 can send a first set of one or more local wireless signals to a device (e.g., a customer devices 104, a merchant device 108, and/or a BAM store area device 110), and can receive a second set of one or more local wireless signals from the device in response to the first set of one or more local wireless signals. For example, the first set of one or more local wireless signals can include a query or challenge, and the second set of one or more local wireless signals can include an answer or response to the query or challenge. In some cases local wireless transceivers 126 can be positioned and configured so that their range spans a large portion of a BAM store area. In some local wireless transceivers 126 can be positioned and configured so that their range spans a small area, such as an individual shelving unit or other merchantable inventory area. In some cases, access to communication data from one or more local wireless transceivers 126 can be shared between multiple BAM store areas and/or merchants. For instance, a single local wireless transceiver 126 (e.g., the beacon device 220S of FIG. 2H) may have a range covering at least portions of multiple adjacent stores (e.g., the first inner BAM store area 240 and the second inner BAM store area 250 of FIGS. 2G-2H) and/or stores within stores (e.g., the store-within-store area 255 of FIG. 2H), and its communication data may in some cases be accessed by BAM store control systems 100 associated with each of the BAM store areas of each of the stores. In some cases, merchants with multiple branches may also share communication data from one or more local wireless transceivers 126 between BAM store control systems 100 associated with different branches.

In some examples, the one or more local wireless transceivers 126 can be used to identify a position of a device (e.g., a customer device 104, a merchant device 108, and/or a BAM store area device 110). In an illustrative example, the device can report a signal receipt time at which the device receives a local wireless signal from a local wireless transceiver 126. The BAM store control system 100 (e.g., customer pose identification and tracking engine 144 and/or merchant pose identification and tracking engine 146) can compare the signal receipt time to a signal transmission time at which the same signal was transmitted by the local wireless transceiver 126 to identify a time difference between the signal receipt time and the signal transmission time. Based on the time difference, the BAM store control system 100 (e.g., customer pose identification and tracking engine 144 and/or merchant pose identification and tracking engine 146) can identify a distance between the device and the local wireless transceiver 126. The BAM store control system 100 (e.g., customer pose identification and tracking engine 144 and/or merchant pose identification and tracking engine 146) can identify a position of the device based on a known position of the local wireless transceiver 126 and the distance. The BAM store control system 100 (e.g., customer pose identification and tracking engine 144 and/or merchant pose identification and tracking engine 146) can identify a more specific position of the device by performing triangulation based on multiple such distances between the device and other local wireless transceivers 126, and based on known positions of the other local wireless transceivers 126. In some cases, the BAM store control system 100 (e.g., customer pose identification and tracking engine 144 and/or merchant pose identification and tracking engine 146) may compare signal strength at transmission to signal strength at receipt instead of, or in addition to, comparing signal transmission time and signal receipt time.

In another illustrative example, the device can transmit a local wireless signal to a local wireless transceiver 126. The local wireless transceiver 126 can report a signal receipt time of the local wireless signal. The BAM store control system 100 (e.g., customer pose identification and tracking engine 144 and/or merchant pose identification and tracking engine 146) can compare the signal receipt time to a signal transmission time at which the same signal was transmitted by the device to the local wireless transceiver 126 to identify a time difference between the signal receipt time and the signal transmission time. The BAM store control system 100 (e.g., customer pose identification and tracking engine 144 and/or merchant pose identification and tracking engine 146) can identify a position of the device based on a known position of the local wireless transceiver 126 and the distance. The BAM store control system 100 (e.g., customer pose identification and tracking engine 144 and/or merchant pose identification and tracking engine 146) can identify a more specific position of the device by performing triangulation based on multiple such distances between the device and other local wireless transceivers 126, and based on known positions of the other local wireless transceivers 126. In some cases, the BAM store control system 100 (e.g., customer pose identification and tracking engine 144 and/or merchant pose identification and tracking engine 146) may compare signal strength at transmission to signal strength at receipt instead of, or in addition to, comparing signal transmission time and signal receipt time. In some examples, a merchant device 108 and/or local server 188 can act as a hub for BAM store area devices 110, sensors 124, and/or local wireless transceivers 126.

In some examples, the interface layer 120 includes one or more web interfaces 128. The one or more web interfaces 128 can include one or more websites. The web interface 128 may include one or more forms, buttons, or other interactive elements accessible by a device (e.g., a customer device 104, a merchant device 108, and/or a BAM store area device 110) through the website. The web interface 128 may include an interface to a web server. The web server can host the website and serve the website to the device (e.g., in response to a request from the device). The web server can receive inputs from the device, and can provide those inputs to the application layer 140, the infrastructure layer 180, other elements in the interface layer 120, a customer device 104, a merchant device 108, a BAM store area device 110, or a combination thereof. In some examples, the web interface 128 may include an interface that calls an API of (or otherwise interacts with) the web server. The web server(s) can include one or more local servers 188, on or more remote servers 190, or a combination thereof. At least a subset of the web server(s) may be remote from the BAM store control system 100 in some examples.

In some examples, the interface layer 120 includes one or more software application interfaces 130. The one or more software application interfaces 130 may include interfaces for one or more software applications that run on one or more customer devices 104, one or more merchant devices 108, one or more BAM store area devices 110, or a combination thereof. For instance, the one or more software application interfaces 130 may include an interface that calls an API of (or otherwise interacts with) a software application that runs on (or that is configured to run on) on a device (e.g., a customer device 104, a merchant device 108, and/or a BAM store area device 110). In some cases, the software application may be a mobile application, for instance where the device that runs the software application is a mobile device, such as a smartphone, a tablet device, a mobile handset, a mobile device, or a combination thereof. The one or more software application interfaces 130 may include interfaces for one or more software applications that run on an intermediate device between the BAM store control system 100 and a device (e.g., a customer device 104, a merchant device 108, and/or a BAM store area device 110). For instance, the one or more software application interfaces 130 may include an interface that calls an API of (and/or otherwise interacts with) the device (e.g., a customer device 104, a merchant device 108, and/or a BAM store area device 110) and/or of one or more software applications that run on (and/or that are configured to run on) the intermediate device. In some examples, the software application interface 130 may interface with a POS software application that runs at least partially on a merchant device 108 (e.g., a POS device). In some examples, the software application interface 130 may interface with a customer transaction application that runs at least partially on a customer device 104 (e.g., a mobile handset). In some examples, the software application interface 130 may interface with a IoT application that runs at least partially on a BAM store area device 110 (e.g., an IoT device).

In some examples, the interface layer 120 includes one or more glyphs 132. The glyphs 132 can include, for examples, bar codes, quick response (QR) codes, micro QR codes, Swiss QR codes, Aztec codes, AuUco codes, data matrices, cool data matrices, Maxicodes, PDF417 codes, truncated PDF417 codes, microPDF codes, shortcodes, shotcodes, high capacity color barcodes, crontosign codes, Han Xin barcodes, Microsoft® Tags, Qodes, NexCodes, Coda-block-F codes, codablock codes, dotcodes, trillcodes, quickmark codes, mCodes, Beetagg codes, upcodes, semacodes, ezcodes, or combinations thereof. For example, a QR code and a barcode are illustrated in FIG. 1 in the box labeled "glyphs 132." The BAM store control system 100 can generate the glyphs 132 to encode information. The glyphs 132 can be scanned (e.g., photographed, laser-scanned, read) by a device such as a customer device 104, a merchant device 108, or a BAM store area device 110. The device can decode the information encoded in the glyphs 132 upon scanning the glyphs 132. In some examples, the information encoded in the glyphs 132 can include a pointer to a website associated with the web interface 128, to a software application associated with the software application interface 130, or a combination thereof. The pointer may be a uniform resource locator (URL).

In one illustrative example, a customer 102 can check-in and/or check-out of a BAM store area by scanning a glyph 132 with their customer device 104, which may cause the customer device 104 to decode a pointer from the glyph 132 that leads to a website or software application that handles at least some aspect of the check-in and/or check-out processes, in some cases by interacting with the application later 140 and/or the infrastructure layer 180. In another illustrative example, a representative of a merchant 106 can clock in or clock out of their work shift by scanning a glyph 132 with their merchant device 108, which may cause the merchant device 108 to decode a pointer from the glyph 132 that leads to a website or software application that handles at least some aspect of the clock in and/or clock out processes, in some cases by interacting with the application later 140 and/or the infrastructure layer 180. In another illustrative example, a customer 102 or a representative of a merchant 106 can obtain information about a product or service 112 by scanning a glyph 132 on or adjacent to the product or service 112 with their customer device 104 or merchant device 108, which may cause the customer device 104 or merchant device 108 to decode a pointer from the glyph 132 that leads to a website or software application that provides the information about the product or service 112, in some cases by interacting with the application later 140 and/or the infrastructure layer 180.

In some examples, the interface layer 120 includes one or more chat bots 134. The chat bots 134 can communicate information from the BAM store control system 100 to a customer 102 through a customer device 104 and/or to a representative of a merchant 106 through a merchant device 108. The chat bots 134 can communicate the information as one or more text-based messages. The chat bots 134 can communicate the information as one or more oral or verbal messages. The one or more chat bots 134 may use a text-to-speech algorithm to convert text-based information from the BAM store control system into the one or more oral or verbal messages. In an illustrative example, the BAM store control system 100 may identify information about a customer 102, such as preferences of the customer 102, and may use a chat bot 134 to communicate the information about the customer 102 to a representative of a merchant 106 through a merchant device 108 (e.g., an earpiece worn by the representative of the merchant 106, a POS device in use by the representative of the merchant 106, or a mobile device in use by the representative of the merchant 106) so that the representative of the merchant 106 can service the customer 102 according to the preferences of the customer 102.

The interface layer 120 can receive information from individuals 102/106, devices 104/108/110, and/or products/services 112, and can send the information to application layer 140 and/or the infrastructure layer 180. The interface layer 110 can receive information from the application layer 140 and/or the infrastructure layer 180 and output (e.g., transmit and/or display) the content to a customer device 104, a merchant device 108, a BAM store area device 110, another device described herein, a customer 102 (e.g., through a device such as the customer device 104 or the BAM store area device 110), a representative of a merchant 106 (e.g., through a device such as the merchant device 108 or the BAM store area device 110), or a combination thereof.

In some examples, the interface layer 120 may include an API 122 that can trigger performance of an operation by the interface layer 120 in response to the API 122 being called by the application layer 140, the infrastructure layer 180, a customer device 104, a merchant device 108, a BAM store area device 110, the above-described web server, another computing system 1500 that is remote from the BAM store control system 100, or another device or system described herein. The API 122 can define standardized protocol-based messaging and structure(s) for request and response messages to and/or from the interface layer 120. Any of the operations described herein as performed by the interface layer 120 may be performed in response to a call of the API 122 by one of the devices or systems listed above. For example, a call of the API 122 can trigger an operation to be performed by and/or performed at the sensor(s) 124, the local wireless transceiver(s) 126, the web interface(s) 128, the software application interface(s) 130, the glyph(s) 132, the chat bot(s) 134, the customer device(s) 104 (through the interface layer 120), the merchant device(s) 108 (through the interface layer 120), the BAM store area device(s) 110 (through the interface layer 120), or a combination thereof.

The infrastructure layer 180 can include one or more distributed ledgers 184. A distributed ledger 184 may store one or more transactions and/or smart contracts. The distributed ledger 184 may be decentralized, stored, and synchronized among a set of multiple devices. The distributed ledger 184 may be public or private. In some examples, the distributed ledger 184 may be a blockchain ledger. For instance, the blockchain ledger may an Ethereum blockchain ledger. In some examples, the distributed ledger 184 may be a directed acyclic graph (DAG) ledger. Each block of the distributed ledger may include a block payload and/or a block header. The block header may include a hash of one or more previous blocks, a Merkle root of the blocks of the distributed ledger (before or after addition of the block itself), a nonce value, or a combination thereof. The block payload may identify or include one or more transactions and/or smart contracts.

The infrastructure layer 180 can include one or more data structures 186. The data structures 186 can include databases, tables, trees, lists, linked lists, association lists, arrays, arraylists, buffers, heaps, containers, sets, stacks, queues, graphs, dictionaries, vectors, matrices, look-up tables, or combinations thereof. The data structures 186 can be at least partially stored locally at one or more computing systems associated with the BAM store control system 100, for example in local servers 188. The data structures 186 can be at least partially stored remotely at one or more remote computing systems, for example in remote servers 190. In some examples, the BAM store control system 100 stores information about a customer 102 in one or more data structures 186. In some examples, the BAM store control system 100 stores information about a customer device 104 in one or more data structures 186. In some examples, the BAM store control system 100 stores information about a representative of a merchant 106 in one or more data structures 186. In some examples, the BAM store control system 100 stores information about a merchant device 108 in one or more data structures 186. In some examples, the BAM store control system 100 stores information about a BAM store area device 110 in one or more data structures 186. In some examples, the BAM store control system 100 stores information about a product or server 112 in one or more data structures 186.

The infrastructure layer 180 can include one or more local servers 188. The infrastructure layer 180 can include one or more remote servers 190. The local servers 188 and the remote servers 190 may be computing systems 1500. The one or more local servers 188 can be located in and/or at a BAM store area associated with the BAM store control system. The one or more remote servers 190 can be located outside of, and/or remote from, a BAM store area associated with the BAM store control system. Examples of a BAM store area are illustrated in and discussed with respect to FIGS. 2A-2F. A BAM store area may include one or more inner BAM store areas, one or more outer BAM store areas, one or more combined inner and outer BAM store areas, or combinations thereof. A BAM store area may include an inner BAM store area, which may for example represent the interior of a particular store, structure, or other brick-and-mortar location. Examples of an inner BAM store area are illustrated as the inner BAM store areas 205 and 230 of FIGS. 2A-2F. A BAM store area may include an outer BAM store area, which may for example represent an area that outside of, but still related to, an inner BAM store area. An outer BAM store area may include, for example, a sidewalk adjacent to the inner BAM store area, a parking lot adjacent to the inner BAM store area, a parking lot for the inner BAM store area, a parking garage adjacent to the inner BAM store area, a parking garage for the inner BAM store area, a street adjacent to the inner BAM store area, a hallway adjacent to the inner BAM store area (e.g., if the inner BAM store area is within a shopping mall or other larger indoor structure), a queue area in which a queue can form to enter the inner BAM store area, an area in which sensors 124 (e.g., cameras) associated with the inner BAM store area can see or otherwise sense, an area in which a range of one or more local wireless transceivers 126 associated with the inner BAM store area reaches, or a combination thereof. Examples of an outer BAM store area are illustrated as the outer BAM store areas 210 and 235 of FIGS. 2A-2F.

In some examples, the local servers 188 and/or the remote servers 190 can be used as a cloud storage and/or processing system. The cloud storage and/or processing system can store and/or process information associated with a user account managed by the account management platform 192. In some examples, the cloud storage and/or processing system can store one or more copies of a distributed ledger 184. In some examples, the cloud storage and/or processing system can store one or more copies of one or more data structures 186. The cloud storage and/or processing system can store information associated with one or more customers 102, one or more customer devices 104, one or more merchants, one or more representatives of one or more merchants 106, one or more merchant devices 108, one or more BAM store area devices 110, one or more products or services 112, or combinations thereof.

The infrastructure layer 180 can include an account management platform 192. The account management platform 192 may create and/or manage user accounts associated with different users, such as customers 102, merchants, and representatives of merchants 106. In some examples, the account management platform 192 can allow one user using one user account to communicate with another user using another user account, for example by sending a message or initiating a call between the two users through the account management platform 192. The user accounts may be tied to financial accounts, such as bank accounts, credit accounts, debit accounts, checking accounts, savings accounts, gift card accounts, store credit accounts, travel accounts (e.g., airplane miles), transit accounts (e.g., metro/bus/subway/train passes), video gaming accounts (e.g., with in-game virtual currencies), or combinations thereof. The account management platform 192 can allow one user using one user account to transfer funds or other assets from a financial account associated with their user account to or from another financial account associated with another user using another user account. In some examples, the account management platform 192 processes the transfer of funds by sending a fund transfer request to one or more financial processing systems, for instance through a connection 194 with transaction institutions or financial institutions associated with the one or more financial processing systems. The one or more financial processing systems can validate and perform the transfer. The transaction institutions or financial institutions associated with the one or more financial processing systems can include, for instance, a credit card processor, a credit card issuer, a bank, or a combination thereof. The fund transfer request can, for example, include identifiers associated with the two financial accounts and an amount to be transferred between the two financial accounts.

The infrastructure layer 180 can include a connection 194 with one or more transaction institutions or financial institutions associated with the one or more financial processing systems. The transaction institutions or financial institutions associated with the one or more financial processing systems can include, for instance, a credit card processor, a credit card issuer, a bank, or a combination thereof. In some examples, the BAM store control system can send a fund transfer request through the connection 194 to the one or more financial processing systems in order to process a payment or other transaction. The one or more financial processing systems can validate and perform the transfer. The transaction institutions or financial institutions associated with the one or more financial processing systems can include, for instance, a credit card processor, a credit card issuer, a bank, or a combination thereof. The fund transfer request can, for example, include identifiers associated with the two financial accounts and an amount to be transferred between the two financial accounts. The identifiers associated with the two financial accounts can be, for example, credit card numbers, debit card numbers, credit accounts, bank account numbers, bank names, check numbers, routing numbers, account usernames, account usernames, account passwords, account personal identification number (PIN) codes, or combinations thereof. The identifiers associated with the two financial accounts can, in some examples, include an identifier associated with a financial account associated with a customer 102 and/or a customer device 104. The identifiers associated with the two financial accounts can, in some examples, include an identifier associated with a financial account associated with a merchant and/or a merchant device 108 and/or a representative of the merchant 106.

The infrastructure layer 180 can include one or more artificial intelligence (AI) platforms 196. The one or more AI platforms 196 can include one or more AI algorithms, one or more trained machine learning (ML) models based on ML algorithms and trained using training data, one or more trained neural networks (NNs) based on NN algorithms and trained using training data, or combinations thereof. The one or more trained NNs can include, for example, convolutional neural networks (CNNs), recurrent neural networks, feed forward NNs, time delay neural networks (TDNNs), perceptrons, or combinations thereof. The one or more AI platforms 196 can be used for operations performed by the application layer 140, the interface layer 120, and/or other elements of the infrastructure layer 180. The one or more AI platforms 196 can be used by the customer pose identification and tracking engine 144, the merchant pose identification and tracking engine 146, the product/service pose identification and tracking engine 148, the spatial mapping engine 150, the customer identifier and account management engine 152, the merchant identifier and account management engine 154, the customer preferences and needs identification and tracking engine 156, the merchant preferences and needs identification and tracking engine 158, the customer history tracking engine 160, the merchant history tracking engine 162, the customer experience customization engine 164, the merchant experience customization engine 166, the inventory management engine 168, the scheduling management engine 170, the supply chain management engine 172, the training management engine 174, the sensor and device onboarding engine 176, the learning management engine 178, or a combination thereof. The one or more AI platforms 196 can be used for operations such as feature detection, feature extraction, feature recognition, feature tracking, object detection, object recognition, object tracking, facial detection, facial recognition, facial tracking, body detection, body recognition, body tracking, pose detection, pose recognition, pose tracking, gait detection, gait recognition, gait tracking, clothing detection, clothing recognition, clothing tracking, text-to-speech conversion, speech-to-text conversion, text recognition, natural language recognition, computer vision, spatial mapping, localization, relocalization, pose estimation, simultaneous localization and mapping (SLAM), or combinations thereof.

In some examples, the infrastructure layer 180 may include an API 182 that can trigger performance of an operation by the infrastructure layer 180 in response to being called by the interface layer 110, the application layer 130, the user device 105, the above-described web server (not pictured), another computing system 1300 that is remote from the BAM store control system 100, or another device or system described herein. The API 182 can define standardized protocol-based messaging and structure(s) for request and response messages to and/or from the infrastructure layer 180. Any of the operations described herein as performed by the infrastructure layer 180 may be performed in response to a call of the API 182 by one of the devices or systems listed above. For example, a call of the API 182 can trigger an operation to be performed by and/or performed at the distributed ledger 184, the data structure(s) 186, the local server(s) 188, the remote server(s) 190, the account management platform 192, the connection 194 with one or more transaction institutions or financial institutions, the AI platform(s) 196, or a combination thereof.

The application layer 130 can include a variety of applications or services that can integrated with a merchant account associated with the BAM store control system, for example the account management platform 192. The applications and services exemplified in the application layer 140 can provide packaged solutions to merchants to provide one or more services to assist in managing the BAM store area, or to provide a better customer experience to a customer. Some of the applications in application layer can be used to receive output of one or more sensors can utilize that data to provide functions to the merchant. In some instances the applications can be endowed with various sensor fusion algorithms that can receive standard outputs from classes and sensors to make more advanced conclusions that would be possible with data from just one sensor or type of sensor.

In some embodiments of the present technology, objects within a merchant BAM store area are tracked by one or more sensors, and customers and merchants are likewise tracked by one or more sensors. This can be facilitated by use of a digital twin whereby the physical retail environment is represented by the collective perceptions of various sensors. In such embodiments, as each new sensor is onboarded by a merchant, additional data and perceptions can be represented in the digital twin of that BAM store area. Various embodiments described herein make reference to perception of one or more sensors upon which a conclusion is based—a customer has put an item in their basket, a customer has an interest or preference in an item, a customer is ready to check out, etc. These conclusions and resulting actions are handled through a merchant's digital twin and then manifested elsewhere in BAM store control system 100.

The application layer 130 may include a customer pose identification and tracking engine 144, which may identify and/or track a pose of a customer 102, a customer device 104 associated with the customer 102, and/or a BAM store area device 110 associated with the customer 102. The customer pose identification and tracking engine 144 may identify and/or track a pose of the customer 102 and/or these devices by identifying and/or tracking representations of customer 102 and/or these devices in sensor data from the one or more sensors 124, by receiving information about communications between the one or more local wireless transceivers 126 and these devices, or a combination thereof. Pose may include location (e.g., latitude, longitude, and/or altitude), orientation (e.g., pitch, yaw, and/or roll), bodily arrangement (e.g., location and orientation of an individual's limbs relative to one another, location and orientation of different portions of a device relative to one another), gaze, or a combination thereof.

The application layer 130 may include a merchant pose identification and tracking engine 146, which may identify and track a pose of a representative of a merchant 106 and/or a merchant device 108 and/or a BAM store area device 110. The merchant pose identification and tracking engine 146 may identify and/or track a pose of the representative of the merchant 106 and/or these devices by identifying and/or tracking representations of representative of the merchant 106 and/or these devices in sensor data from the one or more sensors 124, by receiving information about communications between the one or more local wireless transceivers 126 and these devices, or a combination thereof. As noted above, pose may include location (e.g., latitude, longitude, and/or altitude), orientation (e.g., pitch, yaw, and/or roll), bodily arrangement (e.g., location and orientation of an individual's limbs relative to one another, location and orientation of different portions of a device relative to one another), gaze, or a combination thereof.

The customer pose identification and tracking engine 144 and/or the merchant pose identification and tracking engine 146 can receive device communication data from the one or more local wireless transceivers 126. The device communication data may include information about one or more communications between the one or more local wireless transceivers 126 and one or more customer devices 104, one or more merchant devices 108, one or more BAM store area device 110, or a combination thereof. The device communication data can include information about timing differences between a transmission time of each communication and a corresponding receipt time of the communication. The communication data can include information about signal strength at transmission and signal strength at receipt. The customer pose identification and tracking engine 144 and/or the merchant pose identification and tracking engine 146 can use the device communication data to locate a customer device 104, a merchant device 108, and/or a BAM store area device 110 within a BAM store area. In some examples, the customer pose identification and tracking engine 144 can locate the customer device 104 and/or the BAM store area device 110. In some examples, the merchant pose identification and tracking engine 146 can locate the merchant device 108 and/or the BAM store area device 110. The customer pose identification and tracking engine 144 and/or the merchant pose identification and tracking engine 146 can use the operations for device positioning discussed above in the description of the one or more local wireless transceivers 126. For instance, the customer pose identification and tracking engine 144 and/or the merchant pose identification and tracking engine 146 can determine the position of the device based on a difference between signal transmission time and signal receipt time, a difference between signal strength at transmission and signal strength at receipt, or both. The customer pose identification and tracking engine 144 and/or the merchant pose identification and tracking engine 146 can determine the position of the device based on triangulation.

The customer pose identification and tracking engine 144 and/or the merchant pose identification and tracking engine 146 can receive sensor data from one or more sensors 124. The customer pose identification and tracking engine 144 and/or the merchant pose identification and tracking engine 146 may identify, within the sensor data from the sensors 124, a representation of an individual. In an illustrative example, if the sensors 124 include an image sensor (e.g., of a camera) and the sensor data includes image data captured by the image sensor, the representation of the individual may be a visual representation (e.g., depiction) of the individual within the image. The image data may include one or more images. For instance, the one or more images can include one or more image frames (e.g., consecutive video frames) captured by the image sensor. In another illustrative example, if the sensors 124 include a depth sensor (e.g., RADAR, LIDAR, SONAR, SODAR, structured light sensor, time of flight sensor) and the sensor data includes depth data captured by the depth sensor, the representation of the individual may be a 3D point cloud representation of the individual within the depth data. The customer pose identification and tracking engine 144 and/or the merchant pose identification and tracking engine 146 can identify the representation of the individual within the sensor data using the AI platform 196, for instance using feature detection, feature extraction, feature recognition, feature tracking, object detection, object recognition, object tracking, facial detection, facial recognition, facial tracking, body detection, body recognition, body tracking, pose detection, pose recognition, pose tracking, gait detection, gait recognition, gait tracking, clothing detection, clothing recognition, clothing tracking, or a combination thereof. The customer pose identification and tracking engine 144 can identify, using the AI platform 196, that the representation of the individual within the sensor data is a representation of a customer 102, for instance by comparing the representation of the customer to stored representations known to be of known customers (e.g., customers that have frequented a particular BAM store area in the past). The merchant pose identification and tracking engine 146 can identify, using the AI platform 196, that the representation of the individual within the sensor data is a representation of a representative of a merchant 106, for instance by comparing the representation of the customer to stored representations known to be of known representatives of the merchant (e.g., individuals who are on the merchant's payroll).

In some examples, the customer pose identification and tracking engine 144 and/or the merchant pose identification and tracking engine 146 can track a pose of an individual (e.g., a customer 102 or a representative of the merchant 106) and/or a device (e.g., the customer device 104, the merchant device 108, and/or the BAM store area device 110) using the glyphs 132. For instance, glyph 132 may be positioned at a specific location within or near a BAM store area, such as a location at or near an entrance to a BAM store area. A customer 102 may scan the glyph 132 using the customer device 104 to check into the BAM store area, which may notify the BAM store control system 100 (e.g., through the web interface 128). This notification that the customer device 104 scanned the glyph 132 may indicate to the customer pose identification and tracking engine 144 that the customer 102 and/or the customer device 104 are located at the location of the glyph 132 at the time of scanning. A second glyph 132 can be located at a location at or near an exit to the BAM store area. The customer 102 may scan the second glyph 132 using the customer device 104 to check out of the BAM store area, which may indicate to the customer pose identification and tracking engine 144 that the customer 102 and/or the customer device 104 are located at the location of the second glyph 132 at the time of scanning. A representative of the merchant 106 scanning a glyph 132 with a merchant device 108 may similarly indicate to the merchant pose identification and tracking engine 146 that the representative of the merchant 106 and/or the merchant device 108 are located at the location of the glyph 132. The representative of the merchant 106 may scan the glyph 132 with the merchant device 108, in some examples, to clock in and/or clock out of work, or to enter a warehouse, or to perform some other work-related task.

In some examples, the customer pose identification and tracking engine 144 and/or the merchant pose identification and tracking engine 146 can track a pose of an individual (e.g., a customer 102 or a representative of the merchant 106) and/or a device (e.g., the customer device 104, the merchant device 108, and/or the BAM store area device 110) using a website and/or a software application as accessed using the customer device 108 and/or the merchant device 108. The website and/or software application can be associated with the customer 102, the merchant, the BAM store area, a payment service, or a combination thereof. The website and/or software application can request the location of the device (e.g., the customer device 104, the merchant device 108) that is accessing and/or running the web site and/or software application. The user of the device (e.g., the customer 102 or the representative of the merchant 106) can authorize the device to provide the location to the website and/or software application. The device can provide the location to the website and/or software application in response to the authorization. The location can be a location that the device identifies using a positioning receiver of the device. The positioning receiver can be, for example, a Global Navigation Satellite System (GNSS) receivers or transceivers, such as a Global Positioning System (GPS) receiver or another type of GNSS receiver or transceiver discussed herein. The positioning receiver can be a receiver or transceiver for a cellular network, a Wi-Fi network, a WLAN network, a Bluetooth® network, a beacon network, a PAN network, or another type of network discussed herein. The location can be self-reported (e.g., received from the individual using the device using a user interface). The website and/or software application can report the location to the customer pose identification and tracking engine 144 and/or the merchant pose identification and tracking engine 146. In some cases, the location can be provided as part of a check-in, check-out, badge-in, or badge-out process. In some cases, the customer 102 or the representative of the merchant 106 can authorize provision of the location to the website and/or software application ahead of time, in which case the website and/or software application can automatically obtain the location of the device and can automatically report the location to the customer pose identification and tracking engine 144 and/or the merchant pose identification and tracking engine 146.

In some examples, the customer pose identification and tracking engine 144 can track the customer 102 and/or the customer device 104 as the customer 102 and/or the customer device 104 enter a BAM store area, move about the BAM store area, and/or exit the BAM store area. In some examples, the customer pose identification and tracking engine 144 can track the customer 102 as the customer 102 picks up, moves, and/or puts down an object, such as an object associated with a product or service 112. In some examples, the merchant pose identification and tracking engine 146 can track the representative of the merchant 106 and/or the merchant device 108 as the representative of the merchant 106 and/or the merchant device 108 enter a BAM store area, move about the BAM store area, and/or exit the BAM store area. In some examples, the merchant pose identification and tracking engine 146 can track the representative of the merchant 106 as the representative of the merchant 106 picks up, moves, and/or puts down an object, such as an object associated with a product or service 112. An object associated with a product or service 112, as discussed herein, can refer to a product itself, a packaging for a product, a claim check for a product or service, a ticket for a service, a pass for a service, an appointment confirmation for a service, or some combination thereof.

In some cases, the customer pose identification and tracking engine 144 and/or the merchant pose identification and tracking engine 146 can request that a representative of the merchant 106 confirm its identification of an individual, such as a customer 102 or another representative of the merchant 106. For example, the customer pose identification and tracking engine 144 can notify the representative of the merchant 106 through the merchant device 108 (e.g., through the local wireless transceivers 126, the web interface 128, the software application interface 130, and/or the chat bot 134) that the customer pose identification and tracking engine 144 has determined that a particular customer 102, John Smith, has just entered the BAM store area. The customer pose identification and tracking engine 144 can request that the representative of the merchant 106 confirm, through the merchant device 108, that customer 102 John Smith has indeed entered the BAM store area. If the representative of the merchant 106 confirms that the determination made by the customer pose identification and tracking engine 144 was correct, the customer pose identification and tracking engine 144 can strengthen the AI platform 196's ability to recognize that particular individual (customer 102 John Smith) in the future by using the representations in the sensor data from the sensors 124 as training data for the AI platform 196. If the representative of the merchant 106 indicates that the determination made by the customer pose identification and tracking engine 144 was incorrect, the customer pose identification and tracking engine 144 can modify the AI platform 196's model with respect to recognition of one or more individuals, for example by reducing weight given to certain features in the detection/recognition process. The same process may be used by the merchant pose identification and tracking engine 146 for a representative of the merchant 106 to confirm identification of another representative of the merchant 106.

In some examples, the customer pose identification and tracking engine 144 and/or the merchant pose identification and tracking engine 146 can track a pose of an individual (e.g., a customer 102 or a representative of the merchant 106) and/or a device (e.g., the customer device 104, the merchant device 108, and/or the BAM store area device 110) across multiple BAM store areas, such as adjacent BAM store areas. In some examples, the customer pose identification and tracking engine 144 and/or the merchant pose identification and tracking engine 146 can track a pose of an individual (e.g., a customer 102 or a representative of the merchant 106) and/or a device (e.g., the customer device 104, the merchant device 108, and/or the BAM store area device 110) across a large area that includes multiple BAM store areas within the large area. The large area can be, for example, a shopping mall, a farmer's market, a strip mall, or another collection of BAM store areas.

The application layer 130 may include a product/service pose identification and tracking engine 148, which may identify and/or track a pose of one or more objects associated with one or more products or services 112. The product/service pose identification and tracking engine 148 may identify and/or track a pose of one or more objects associated with one or more products or services 112 by identifying and/or tracking representations of the one or more objects in sensor data from the one or more sensors 124, by receiving information about communications between the one or more local wireless transceivers 126 and the one or more objects (e.g., if the one or more objects are capable of wireless communication with the local wireless transceivers 126 or are coupled to a device that is), or a combination thereof. Pose may include location (e.g., latitude, longitude, and/or altitude), orientation (e.g., pitch, yaw, and/or roll), bodily arrangement (e.g., location and orientation of an individual's limbs relative to one another, location and orientation of different portions of a device relative to one another), gaze, or a combination thereof.

The product/service pose identification and tracking engine 148 can receive device communication data from the one or more local wireless transceivers 126. The device communication data may include information about one or more communications between the one or more local wireless transceivers 126 and the one or more objects associated with products or services 112 (and/or devices coupled to the one or more objects). The device communication data can include information about timing differences between a transmission time of each communication and a corresponding receipt time of the communication. The communication data can include information about signal strength at transmission and signal strength at receipt. The product/service pose identification and tracking engine 148 can use the device communication data to locate the one or more objects within a BAM store area. The product/service pose identification and tracking engine 148 can use the operations for device positioning discussed above in the description of the one or more local wireless transceivers 126. For instance, the product/service pose identification and tracking engine 148 can determine the position of the one or more objects based on a difference between signal transmission time and signal receipt time, a difference between signal strength at transmission and signal strength at receipt, or both. The product/service pose identification and tracking engine 148 can determine the position of the one or more objects based on triangulation.

The product/service pose identification and tracking engine 148 can receive sensor data from one or more sensors 124. The product/service pose identification and tracking engine 148 may identify, within the sensor data from the sensors 124, a representation of the one or more objects associated with products or services 112. In an illustrative example, if the sensors 124 include an image sensor (e.g., of a camera) and the sensor data includes image data captured by the image sensor, the representation of the one or more objects may be a visual representation (e.g., depiction) of the one or more objects within the image. The image data may include one or more images. For instance, the one or more images can include one or more image frames (e.g., consecutive video frames) captured by the image sensor. In another illustrative example, if the sensors 124 include a depth sensor (e.g., RADAR, LIDAR, SONAR, SODAR, structured light sensor, time of flight sensor) and the sensor data includes depth data captured by the depth sensor, the representation of the one or more objects may be a 3D point cloud representation of the one or more objects within the depth data. The product/service pose identification and tracking engine 148 can identify the representation of the one or more objects (e.g., to identify that the one or more objects are the one or more objects that are associated with the product or service 112) within the sensor data using the AI platform 196, for instance using feature detection, feature extraction, feature recognition, feature tracking, object detection, object recognition, object tracking, facial detection, facial recognition, facial tracking, body detection, body recognition, body tracking, pose detection, pose recognition, pose tracking, gait detection, gait recognition, gait tracking, clothing detection, clothing recognition, clothing tracking, or a combination thereof.

In some examples, the BAM store control system 100 can use the product/service pose identification and tracking engine 148 in combination with the customer pose identification and tracking engine 144 to identify when and where a customer 102 picks up, moves, and/or puts down an object, such as an object associated with a product or service 112. In some examples, the BAM store control system 100 can use the product/service pose identification and tracking engine 148 in combination with the merchant pose identification and tracking engine 146 to identify when and where a representative of a merchant 106 picks up, moves, and/or puts down an object, such as an object associated with a product or service 112.

In some cases, the product/service pose identification and tracking engine 148 can request that a representative of the merchant 106 confirm its identification of the one or more objects associated with the product or service 112. For example, the product/service pose identification and tracking engine 148 can notify the representative of the merchant 106 through the merchant device 108 (e.g., through the local wireless transceivers 126, the web interface 128, the software application interface 130, and/or the chat bot 134) that the product/service pose identification and tracking engine 148 has determined that a particular customer 102 has likely picked up a jar of peanut butter. The jar of peanut butter may be an example of an object associated with a product or service 112. The product/service pose identification and tracking engine 148 and/or learning management engine 178 can request that the representative of the merchant 106 confirm, through the merchant device 108, that the customer 102 indeed picked up the jar of peanut butter (e.g., as in FIG. 6). If the representative of the merchant 106 confirms that the determination made by the product/service pose identification and tracking engine 148 was correct, the product/service pose identification and tracking engine 148 and/or learning management engine 178 can strengthen the AI platform 196's ability to recognize that type of object (jar of peanut butter) in the future by using the representations in the sensor data from the sensors 124 as training data for the AI platform 196. If the representative of the merchant 106 indicates that the determination made by the product/service pose identification and tracking engine 148 was incorrect, the product/service pose identification and tracking engine 148 and/or learning management engine 178 can modify the AI platform 196's model with respect to recognition of the one or more objects, for example by reducing weight given to certain features in the detection/recognition process.

The application layer 130 may include a spatial mapping engine 150. The spatial mapping engine 150 may generate a map of a BAM store area. The map of the BAM store area may be referred to as a digital twin of the BAM store area. The map of the BAM store area may be a two-dimensional (2D) map of the BAM store area, such as a birds-eye view of the BAM store area. The map of the BAM store area may be a three-dimensional (3D) map of the BAM store area, such as a birds-eye view of the BAM store area. The map of the BAM store area may map indoor areas, outdoor areas, or both.

Examples of a map of a BAM store area are illustrated in and discussed with respect to FIGS. 2A-2H. In FIGS. 2A-2H a number of techniques will also be discussed in the context of a map of a BAM store area, however, it should be understood that each such technique may be practiced even in the absence a completely-generated map or even a partially generated map. That is, some of the number of techniques may still be practiced without a generated map. A map of a BAM store area may include one or more maps of one or more inner BAM store areas, one or more maps of one or more outer BAM store areas, one or more maps of one or more combined inner and outer BAM store areas, or combinations thereof. A map of a BAM store area may include a map of an inner BAM store area, which may for example represent the interior of a particular store, structure, or other brick-and-mortar location. Examples of a map of an inner BAM store area are illustrated as the maps of the inner BAM store areas 205, 230, 240, 250, and 255 of FIGS. 2A-2H. A map of a BAM store area may include a map of an outer BAM store area, which may for example represent an area that outside of, but still related to, an inner BAM store area. A map of an outer BAM store area may include, for example, a map of a sidewalk adjacent to the inner BAM store area, a map of a parking lot adjacent to the inner BAM store area, a map of a parking lot for the inner BAM store area, a map of a parking garage adjacent to the inner BAM store area, a map of a parking garage for the inner BAM store area, a map of a street adjacent to the inner BAM store area, a map of a hallway adjacent to the inner BAM store area (e.g., if the inner BAM store area is within a shopping mall or other larger indoor structure), a map of a queue area in which a queue can form to enter the inner BAM store area, a map of an area in which sensors 124 (e.g., cameras) associated with the BAM store area can see or otherwise sense, a map of an area in which a range of one or more local wireless transceivers 126 associated with the BAM store area reaches, or a combination thereof. Examples of a map of an outer BAM store area are illustrated as the maps of the outer BAM store areas 210, 235, and 245 of FIGS. 2A-2H. In some examples, a map of a BAM store area generated by the spatial mapping engine 150 may be generated using simultaneous localization and mapping (SLAM).

In some examples, the spatial mapping engine 150 may generate a map of the BAM store area and may update the map of the BAM store area with up-to-date poses (e.g., locations, orientations, and/or expressions) of individuals (e.g., customers 102 and/or representatives of merchants 106), devices (e.g., customer devices 104, merchant devices 106, BAM store area devices 110, sensors 124, local wireless transceivers 126), and/or objects (e.g., glyphs 132, products and/or services 112). The up-to-date poses of the individuals, devices, and/or objects in the BAM store area can be obtained by the spatial mapping engine 150 and converted into up-to-date poses in the map of the BAM store area. The up-to-date poses of the individuals, devices, and/or objects in the BAM store area can be obtained by the spatial mapping engine 150 from the customer pose identification and tracking engine 144, the merchant pose identification and tracking engine 146, the product/service pose identification and tracking engine 148, or a combination thereof. For instance, the maps of FIGS. 2B and 2E and 2H highlight poses and identities of devices and/or objects in the respective BAM store areas of those figures. Similarly, the maps of FIGS. 2C and 2F highlight poses and identities of individuals in the respective BAM store areas of those figures.

In some examples, a representative of a merchant 106 can do "virtual walk through" of the digital twin of a BAM store area using a merchant device 108 based on the map generated by the spatial mapping engine 150. In the virtual walk through, the using a merchant device 108 can recreate the BAM store area, for example recreating poses of individuals, devices, and products and/or services 112. For example, the maps of FIGS. 2A-2H identify poses of individuals, merchant devices 108, sensors 124, local wireless transceivers 126, and BAM store area devices 110.

In some examples, the BAM store control system 100 can use detection of a customer 102 picking up and/or moving an object associated with a product or service 112 (e.g., using the customer pose identification and tracking engine 144 and/or the product/service pose identification and tracking engine 148) as a trigger for certain actions. For instance, in some examples, the BAM store control system 100 can charge a customer 102 for an object associated with a product or service 112 in a BAM store area in response to the BAM store control system 100 detecting that the customer 102 picked up the object. In such examples, BAM store control system 100 can refund the customer 102 if the customer puts the object back down. In some examples, the BAM store control system 100 can allow the customer 102 pick up or put down an object associated with a product or service 112 in a BAM store area without being charged, but can charge the customer 102 at least a threshold time period after the customer 102 has picked up the object, once the customer 102 moves at least a threshold distance away from the merchantable area from which the customer 102 picked up the object, once the customer heading toward and/or looking at and/or picking up another object associated with another product or service 112, or a combination thereof. In an illustrative example, the BAM store control system 100 can identify that a customer 102 is picking up and examining a block of cheese without charging the customer 102, but can charge the customer once the customer 102 has walked to a different aisle and picked up a loaf of bread while still holding onto the block of cheese.

In some examples, the BAM store control system 100 can use the customer pose identification and tracking engine 144, the merchant pose identification and tracking engine 146, the product/service pose identification and tracking engine 148, and/or the spatial mapping engine 150 to determine proximity of an individual (e.g., the customer 102, the merchant, the representative of the merchant 106) to another individual (e.g., the customer 102, the merchant, the representative of the merchant 106) or object (e.g., products or services 112, customer devices 104, merchant devices 108, BAM store area devices 110, sensors 124, local wireless transceivers 126, glyphs 132). For instance, the BAM store control system 100 can identify when a customer 102 is in proximity to a representative of a merchant 106, is in proximity to a door, is in proximity to a sensor 124, is in proximity to a POS device, is in proximity to a particular product, is in proximity to a particular merchantable inventory area, or some combination thereof. Proximity can include physical distance (e.g., proximity is 1 meter) but can also include an interaction threshold (e.g., proximity is close enough to grasp by reaching out, is close enough to speak, is close enough to see plainly by directing gaze, is close enough to be within field of view of the sensor 124, is close enough to be within range of the wireless transceiver 126, or some combination thereof). Proximity can be measured as a distance, in comparison to a threshold sufficient to support a given interaction, or a combination thereof.

The application layer 130 may include a customer identifier and account management engine 152. The customer identifier and account management engine 152 can store identifiers associated with a customer 102 and/or an account of the customer 102, such as the customer 102's name, address, email address, phone number, account username, account password, credit card number, debit card number, credit account, bank account number, bank name, check number, routing number, account personal identification number (PIN) code, one or more loyalty accounts with one or more merchants, one or more rewards accounts with one or more merchants, or combinations thereof. In some cases, the BAM store control system 100 can receive one customer identifier for a customer 102 from a merchant device 108 and can send back other identifier and/or account information to the merchant device 108 in return.

In some cases, the customer identifier and account management engine 152 may generate a temporary identifier for a customer 102. For example, if the customer pose identification and tracking engine 144 identifies an unrecognized individual (e.g., an individual whose facial recognition data does not match any faces known to the BAM store control system 100), the customer identifier and account management engine 152 can generate a new temporary identifier for the individual. Similarly, if the customer pose identification and tracking engine 144 identifies an unrecognized customer device 104 (e.g., having a device identifier that does not match any customer device 104 that the BAM store control system 100 has previously identified), the customer identifier and account management engine 152 can generate a new temporary identifier associated with the customer device 104 and with the customer 102 associated with the customer device 104. If the customer identifier and account management engine 152 later obtains further information tying the individual with the temporary identifier to a known customer 102 having a previously-generated customer identifier, then the customer identifier and account management engine 152 can merge the information stored linked to the temporary identifier to the previously-generated customer identifier. For example, the customer 102 might not be recognized through facial recognition due to a new hairstyle, a face mask, and/or glasses. Similarly, the customer device 104 might not be recognized based on communications using the local wireless transceivers 126 due to the customer 102 purchasing a new customer device 104, or an operating system update to the customer device 104, or another change to the hardware and/or software of the customer device 104. Nonetheless, the BAM store control system 100 can still recognize the customer 102's credit card information read from the customer 102's credit card by the merchant device 108 when the customer 102 checks out, and the BAM store control system 100 can merge the temporary identifier with a previously-generated customer identifier associated with the customer 102's credit card information (e.g., as in FIG. 7). If the customer identifier and account management engine 152 does not obtain information tying the individual with the temporary identifier to any known customer 102 having any previously-generated customer identifier, then the customer identifier and account management engine 152 can identify the individual as a new customer, and can convert the temporary identifier into a long-term identifier (e.g., permanent identifier) for the new customer 102 (e.g., after a predetermined period of time).

The present disclosure contemplates that in some instances, gathered data may include personal information data that uniquely identifies or can be used to contact or locate a specific person. Such personal information data can include demographic data, location-based data, telephone numbers, email addresses, social media ID's, home addresses, data or records relating to a user's health or level of fitness (e.g., vital signs measurements, medication information, exercise information), date of birth, payment account data, payment instrument data, or any other identifying or personal information.

The present disclosure recognizes that the use of such personal information data, in the present technology, can be used to the benefit of users. For example, the BAM store control system 100 can use personal data associated with customers 102, merchants, and/or representatives of merchants 106 to automatically track personal inventories, automatically track merchantable inventories, automate checkout based on personal inventory identification, expedite checkout based on personal inventory identification, schedule product replenishment, provide recommendations, highlight locations of products or services that customers are identified as looking for and/or interested in, highlight locations of products or services that merchants are to restock, other operations described herein as performed by the BAM store control system 100 using personal information, or combinations thereof.

The present disclosure contemplates that the entities (such as the BAM store control system 100) responsible for the collection, analysis, disclosure, transfer, storage, or other use of such personal information data will comply with well-established privacy laws, policies and/or practices. In particular, such entities can implement and consistently use privacy policies and practices that are generally recognized as meeting or exceeding industry or governmental requirements for maintaining the privacy and security of personal information data.

The present disclosure also contemplates embodiments in which users selectively prevent, block, limit, or restrict the use of, or access to, personal information data. That is, the present disclosure contemplates that hardware and/or software elements can be provided to prevent, block, limit, or restrict access to such personal information data. For example, the present technology can be configured to allow users to select to "opt in" or "opt out" of participation in the collection of personal information data during registration for services or anytime before or thereafter.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level, degrading image quality of and/or censoring facial data in images or video, etc.), controlling how data is stored (e.g., aggregating data across users, etc.), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Figure 8:
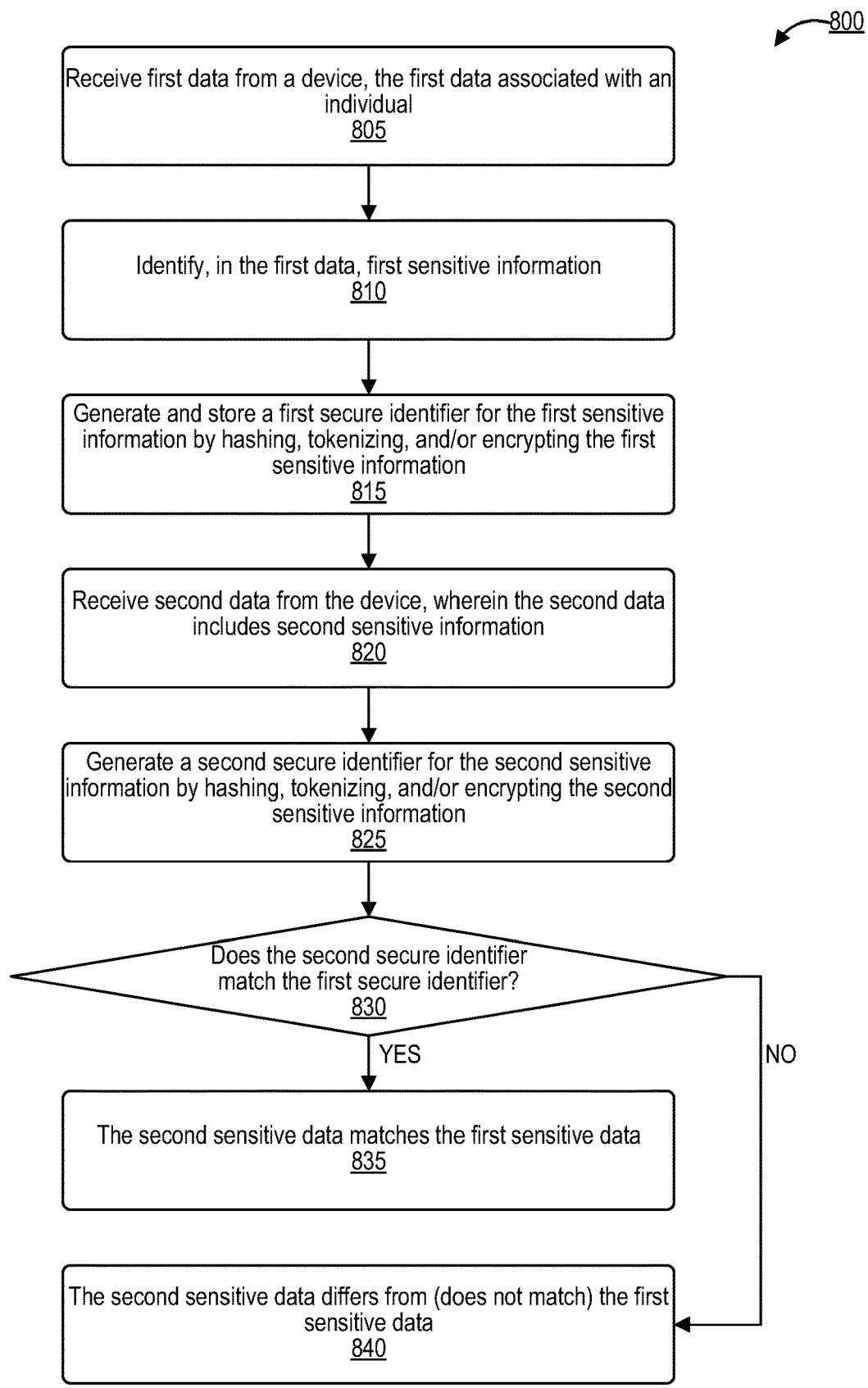
FIG. 8 is a flow diagram illustrating operations for securely identifying whether matching data is stored in a data storage.

In some cases, the customer identifier and account management engine 152 can, for certain information corresponding to a customer 102 (e.g., sensitive information) intentionally not store the information, at least partially delete the information after using the information (e.g., to process a transaction), at least partially delete the information after a predetermined period of time, at least partially delete the information after the customer 102 and/or customer device 104 exits the BAM store area or another geofence, or a combination thereof. Deletion of information can include, but is not limited to, overwriting the information with random numbers or zeros, erasing references to the information, degrading the information such as by adding noise data or blur, and/or censoring the information. The customer identifier and account management engine 152 may generate a tokenized and/or hashed and/or encrypted version of certain information, and may keep the tokenized and/or hashed and/or encrypted version of the information even after at least partially deleting the information. In an illustrative example, the customer identifier and account management engine 152 may generate a tokenized and/or hashed and/or encrypted version of a credit card number of a customer 102, and may delete the credit card number itself. When the merchant device 108 reads a credit card, the customer identifier and account management engine 152 can generate a secure identifier by hashing, tokenizing, and/or encrypting the credit card number and compare the secure identifier to previously stored secure identifiers (also generated using hashing, tokenization, and/or encryption) to see if any match, to know if the credit card number has been seen before, and if so, which customer 102's account the credit card number is linked to. In another illustrative example, the customer identifier and account management engine 152 may generate a secure identifier of customer facial recognition data (e.g., features extracted using a feature extraction trained machine learning algorithm) for a customer 102 (e.g., by hashing, tokenizing, and/or encrypting the customer facial recognition data), and may delete the customer facial recognition data itself. When the customer pose identification and tracking engine 144 identifies a face of an individual in image data from an image sensor (of the sensors 124) and generates facial recognition data for the face, the customer identifier and account management engine 152 can generate a new secure identifier for the facial recognition data and compare the new secure identifier to previously stored secure identifiers to know if the facial recognition data has been seen before, and if so, which customer 102's account the facial recognition data is linked to. An example of this type of secure matching is illustrated in FIG. 8.

The application layer 130 may include a merchant identifier and account management engine 154. The merchant identifier and account management engine 154 can store identifiers associated with a merchant, a representative of the merchant 106, an account of the merchant, and/or an account of the representative of a merchant 106. For example, the merchant identifier and account management engine 154 can store merchant's name, address, email address, phone number, account username, account password, credit card number, debit card number, credit account, bank account number, bank name, check number, routing number, account personal identification number (PIN) code, or combinations thereof. The merchant identifier and account management engine 154 can store representative of the merchant 106's name, address, email address, phone number, account username, account password, credit card number, debit card number, credit account, bank account number, bank name, check number, routing number, account personal identification number (PIN) code, or combinations thereof.

In some cases, the merchant identifier and account management engine 154 can, for certain information corresponding to a merchant and/or a representative of a merchant 106 (e.g., sensitive information) intentionally not store the information, at least partially delete the information after using the information (e.g., to process a transaction), at least partially delete the information after a predetermined period of time, at least partially delete the information after the representative of a merchant 106 and/or merchant device 108 exits the BAM store area or another geofence, or a combination thereof. The merchant identifier and account management engine 154 may generate a hashed and/or encrypted version of certain information, and may keep the hashed and/or encrypted version of the information even after at least partially deleting the information. This may be important to protect privacy for representatives of the merchant 106, for instance for temporary workers or contract workers that might not return to work in the same BAM store area and might not want their information stored indefinitely.

In some cases the customer identifier and account management engine 152 and the merchant identifier and account management engine 154 can interact, for instance to transfer funds between an account associated with a customer 102 and an account associated with the merchant and/or the representative of the merchant 106. In some cases the customer identifier and account management engine 152 and the merchant identifier and account management engine 154 can interact using the account management platform 192 and/or the connection 194 with transaction institutions or financial institutions associated with the one or more financial processing systems. For example, the customer identifier and account management engine 152 and the merchant identifier and account management engine 154 can be used to transfer funds from funds an account associated with a customer 102 to an account associated with the merchant to process a purchase by the customer 102 of one or more products/services 112 from the merchant.

The application layer 130 may include a customer preferences and needs identification and tracking engine 156. The customer preferences and needs identification and tracking engine 156 can gather and store information about the customer 102 and/or the customer device 104. The information may be include the customer 102's likes, dislikes, preferences, handicaps, accessibility requirements, need for glasses/contacts, need for hearing aids, illnesses, allergies, dietary restrictions, food preferences, beverage preferences, brand preferences, manufacturer preferences, distributor preferences, merchant preferences, preferences as to representatives of the merchant 106, merchant preferences, style preferences (e.g., hairstyle), sizing (e.g., clothing sizing), operating system preferences, device preferences, or combinations thereof. The customer preferences and needs identification and tracking engine 156 can gather such preference/needs information based on previous purchases by the customer 102, previous interactions between the customer 102 and one or more representatives of one or more merchants 106, information received from the customer device 104 (e.g., through the local wireless transceivers 126, the web interface 128, and/or the software application interface 130), gaze tracking by the customer pose identification and tracking engine 144 (e.g., identifying interest in a product or service 112 if gaze time exceeds a threshold time), interactions with particular products/services 112 tracked by the customer pose identification and tracking engine 144, social media posts by the customer 102 and/or by the customer device 104, shopping lists of the customer 102 and/or the customer 102's friends or family members (e.g., from the customer device 104), or combinations thereof. For example, the customer preferences and needs identification and tracking engine 156 can identify that a particular customer 102—John Smith—requires wheelchair-accessible ramps, enjoys cookies, prefers cappuccinos, dislikes espressos, has eggs and milk on his shopping list, looked at ice cream for an extended period of time during his shopping trip (e.g., indicating a preference for ice cream), and picked up a burrito before putting the burrito back down during his shopping trip (e.g., indicating a preference for and/or fascination by burritos).

In some cases, the customer preferences and needs identification and tracking engine 156 can identify information about a customer 102 based on information from sensors 124, local wireless transceivers 126, customer history information, previously stored preferences or needs information, or a combination thereof. For example, the customer preferences and needs identification and tracking engine 156 can estimate a clothing size of the customer 102 based on a representation of the customer 102 in sensor data captured by sensors 124 (e.g., image sensor data captured by image sensors, depth sensor data captured by depth sensors, pressure sensor data captured by pressure sensors). In some examples, the customer preferences and needs identification and tracking engine 156 can estimate a clothing size of the customer 102 based on a ratio of various body sizes, (e.g., chest, waist, leg length, torso length) relative to the relatively consistent inter-landmark distance for the customer 102, such as an inter-eye distance of the customer 102. The customer preferences and needs identification and tracking engine 156 can estimate a clothing size of the customer 102 based on a purchase history of the customer 102. For instance, if the purchase history of the customer 102 includes purchase of pants having a particular size, the customer preferences and needs identification and tracking engine 156 can estimate a shirt size based on the size of the pants, or vice versa. In some examples, the customer preferences and needs identification and tracking engine 156 can use the AI platform 196 to generate the clothing estimate. In some examples, the customer preferences and needs identification and tracking engine 156 can ask a representative of a merchant to confirm whether the estimate of the clothing size is correct. If it is, the estimate can be added to training data for the AI platform 196. If the estimate is not correct, the weights in the AI platform 196 can be adjusted.

In some cases, the preferences or needs information for a particular customer 102, as tracked by the customer preferences and needs identification and tracking engine 156, can be linked to a customer identifier and/or account for that customer 102, as managed by the customer identifier and account management engine 152. In some cases, the customer preferences and needs identification and tracking engine 156 can, for certain preferences or needs information (e.g., related to sensitive medical information) for a particular customer 102, intentionally not store the information, at least partially delete the information after using the information, at least partially delete the information after a predetermined period of time, at least partially delete the information after the customer 102 and/or customer device 104 exits the BAM store area or another geofence, or a combination thereof. The customer preferences and needs identification and tracking engine 156 may generate a hashed and/or encrypted version of certain preferences or needs information, and may keep the hashed and/or encrypted version of the information even after at least partially deleting the information.

In some cases, the customer preferences and needs identification and tracking engine 156 can identify preferences or needs information about a customer 102 based on online activity by the customer 102 and/or the customer device 104. In some cases, the customer identifier and account management engine 152 can link a real-world customer 102 to an online shopping account with one or more online merchants and/or or marketplaces. In some cases, the customer preferences and needs identification and tracking engine 156 can identify preferences or needs information about a customer 102 based on online purchases made by the customer 102 and/or the customer device 104, reviews posted by the customer 102 and/or the customer device 104, ratings posted by the customer 102 and/or the customer device 104, or combinations thereof.

In some embodiments, data from customer ID and account management engine 152 and customer preferences and needs identification and tracking engine 156 can be segmented by merchant so that data collected by any one merchant having an account with the BAM store control system 100 remains accessible only to that merchant. However, in some embodiments, data from customer ID and account management engine 152 and customer preferences and needs identification and tracking engine 156 can be shared, or can be used by BAM store control system 100 to present actionable insights to a merchant based on data obtained through the customer 102's interaction with another merchant.

Data from customer ID and account management engine 152 and customer preferences and needs identification and tracking engine 156 will be handled according to a suitable privacy policy. In that spirit, in some embodiments such data may only be keep as long as needed to provide an actionable insight, and/or such data may only be kept for a limited duration. In some embodiments, while data from customer ID and account management engine 152 and customer preferences and needs identification and tracking engine 156 might be stored by BAM store control system 100, such data might not be shared with merchants except in limited circumstances, and/or when shared, might be shared in an abstracted form so as to preserve customer privacy.

The application layer 130 may include a merchant preferences and needs identification and tracking engine 158. The merchant preferences and needs identification and tracking engine 158 can gather and store information about a merchant, a representative of the merchant 106, and/or the merchant device 108. The information may include the merchant's, or the representative of the merchant 106's, likes, dislikes, preferences, handicaps, accessibility requirements, need for glasses/contacts, need for hearing aids illnesses, allergies, dietary restrictions, brand preferences, manufacturer preferences, distributor preferences, supply chain preferences, work shift preferences, operating system preferences, device preferences, or combinations thereof. The merchant preferences and needs identification and tracking engine 158 can gather such preference/needs information based on previous purchases by customers 102 from the merchant and/or from the representative of the merchant 106, previous interactions between one or more representatives of the merchant 106 and one or more customers 102, information received from the merchant device 106 (e.g., through the local wireless transceivers 126, the web interface 128, and/or the software application interface 130), gaze tracking by the merchant pose identification and tracking engine 146, interactions with particular products/services 112 tracked by the merchant pose identification and tracking engine 146, social media posts by the representative of the merchant 106 and/or by the merchant device 108, work schedules of the representative of the merchant 106, product replenishment schedules associated with the representative of the merchant 106, a rank or position of the representative of the merchant 106, or combinations thereof. For example, the merchant preferences and needs identification and tracking engine 158 can identify that a particular representative of the merchant 106—Betty Brown—prefers to work the late shift, is deaf in her left ear, wears glasses, prefers to work with a first distributor over a second distributor, and often checks whether the tomatoes need to be restocked.

In some cases, the preferences or needs information for a particular merchant or representative of the merchant 106, as tracked by the merchant preferences and needs identification and tracking engine 158, can be linked to a merchant identifier and/or account for that particular merchant or representative of the merchant 106, as managed by the merchant identifier and account management engine 154. In some cases, the merchant preferences and needs identification and tracking engine 158 can, for certain preferences or needs information (e.g., related to sensitive medical information) for a particular merchant or representative of the merchant 106, intentionally not store the information, at least partially delete the information after using the information, at least partially delete the information after a predetermined period of time, at least partially delete the information after the representative of the merchant 106 and/or merchant device 108 exits the BAM store area or another geofence, or a combination thereof. The merchant preferences and needs identification and tracking engine 158 may generate a hashed and/or encrypted version of certain preferences or needs information, and may keep the hashed and/or encrypted version of the information even after at least partially deleting the information.

In some examples, the customer preferences and needs identification and tracking engine 156 can receive, identify, store, and/or track privacy preferences and/or security preferences and/or permissions of customers 102 and/or customer devices 104 with respect to the BAM store control system 100. For example, the customer preferences and needs identification and tracking engine 156 can receive, identify, store, and/or track opt in selections, opt out selections, permissions granted to store and/or track certain personal information (e.g., for up to a threshold time period), requests not to store and/or track certain personal information (e.g., for any longer than a threshold time period), that certain stored data about the customer 102 be encrypted, that certain stored data about the customer 102 be anonymized, that certain stored data about the customer 102 be hashed or tokenized, or combinations thereof. Different types of data may be associated with different privacy preferences and/or security preferences and/or permissions of customers 102 and/or customer devices 104. In some cases, different privacy preferences and/or security preferences and/or permissions of customers 102 and/or customer devices 104 may be associated with different uses of the same types of data. The privacy preferences and/or security preferences and/or permissions of customers 102 and/or customer devices 104 can be selected by the customers 102 and/or customer devices 104 before the customer 102 enters a BAM store area, while the customer 102 is in a BAM store area, after the customer 102 has exited a BAM store area, or a combination thereof. For instance, the customer 102 and/or customer device 104 can change their privacy preferences and/or security preferences and/or permissions after some data has already been stored and/or used in certain ways, which may drive the BAM store control system 100 to delete some of the data, store some of the data in different ways (e.g., encrypted, hashed, tokenized, and/or anonymized), stop using some of the data for certain purposes, or combinations thereof. In some examples, the customer 102 and/or customer device 104 can set their privacy preferences and/or security preferences and/or permissions on a per-merchant basis, on a per-BAM-store-area basis, on a per-region basis (e.g., per continent, country, state, county, city, zip code, area code, street, mall, and/or other region), on a per-merchant-type basis (e.g., grocery, retail, sports, restaurant, entertainment, fast food, service, any other merchant type identified herein, and/or any other merchant type having a merchant category classification/code (MCC)), globally (e.g., across all merchants and BAM store areas), or some combination thereof.

For example, a customer 102 may indicate to the customer preferences and needs identification and tracking engine 156 of the BAM store control system 100 (e.g., through a customer device 102, a BAM store area device 110, a merchant device 108, a web interface 128, and/or a software application interface 130), that the BAM store control system 100 has permission to store camera data depicting the customer 102 for up to 48 hours after capture, that the BAM store control system 100 has permission to use camera data depicting the customer 102 for up to 24 hours after capture for the purpose of tracking the customer 102's personal inventory, that the BAM store control system 100 does not have permission to use camera data depicting the customer 102 for gaze tracking for determining the customer 102's interests, that the BAM store control system 100 has permission to store payment instrument data read from the customer 102's payment instrument for up to 2 months after capture for use in cardless payments, that the BAM store control system 100 is requested to store the payment instrument data read from the customer 102's payment instrument in encrypted form, that the BAM store control system 100 has permission to store the customer 102's biometric data indefinitely but only in hashed or tokenized form, that the that the BAM store control system 100 has permission to store up to 8 months of the customer 102's purchase history data but only in anonymized form, that the BAM store control system 100 has permission to access a shopping list stored on the customer device 104, that the BAM store control system 100 has permission to activate indicator lights (or other BAM store area devices 110) to highlight products or services 112 identified in the shopping list stored on the customer device 104, and the like.

In some examples, a merchant, representative of a merchant 106, and/or merchant device 108 may indicate privacy preferences and/or security preferences and/or permissions of customers 102 and/or customer devices 104 to the to the customer preferences and needs identification and tracking engine 156 of the BAM store control system 100 on behalf of the customer 102 and/or customer devices 104 (e.g., through a merchant device 108, a BAM store area device 110, a customer device 102, a web interface 128, and/or a software application interface 130). For instance, a merchant, representative of a merchant 106, and/or merchant device 108 may indicate privacy preferences and/or security preferences and/or permissions of customers 102 and/or customer devices 104 to the to the customer preferences and needs identification and tracking engine 156 of the BAM store control system 100 on behalf of the customer 102 and/or customer devices 104 in response to a customer 102 having notified a representative of the merchant 106 and/or a merchant device 108 about one or more of the privacy preferences and/or security preferences and/or permissions verbally, through electronic message, or otherwise. A merchant, representative of a merchant 106, and/or merchant device 108 may indicate privacy preferences and/or security preferences and/or permissions of customers 102 and/or customer devices 104 to the to the customer preferences and needs identification and tracking engine 156 of the BAM store control system 100 on behalf of the customer 102 and/or customer devices 104 based on the merchant's own guidelines promoting a specific minimum or maximum or default level for certain privacy preferences and/or security preferences and/or permissions for customers 102 and/or customer devices 104. For instance, a merchant that promotes itself as particular privacy-conscious and/or security-conscious may implement guidelines that provide, as defaults for its customers 102 and/or their customer devices 104, strict privacy preferences and/or security preferences and/or permissions that restrict the BAM store control system 100 from storing data for long period of time or using data for certain uses.

Similarly, in some examples, the merchant preferences and needs identification and tracking engine 158 can receive, identify, store, and/or track privacy preferences and/or security preferences and/or permissions of merchants, representatives of merchants 106, and/or merchant devices 108 with respect to the BAM store control system 100. For example, the merchant preferences and needs identification and tracking engine 158 can receive, identify, store, and/or track opt in selections, opt out selections, permissions granted to store and/or track certain personal information (e.g., for up to a threshold time period), requests not to store and/or track certain personal information (e.g., for any longer than a threshold time period), that certain stored data about the representative of the merchant 106 be encrypted, that certain stored data about the representative of the merchant 106 be anonymized, that certain stored data about the representative of the merchant 106 be hashed or tokenized, or combinations thereof. Different types of data may be associated with different privacy preferences and/or security preferences and/or permissions of representatives of merchants 106 and/or merchant devices 108. In some cases, different privacy preferences and/or security preferences and/or permissions of representatives of merchants 106 and/or merchant devices 108 may be associated with different uses of the same types of data.

For example, a merchant or a representative of the merchant 106 may indicate to the merchant preferences and needs identification and tracking engine 158 of the BAM store control system 100 (e.g., through a merchant device 108, a BAM store area device 110, a customer device 102, a web interface 128, and/or a software application interface 130), that the BAM store control system 100 has permission to store camera data depicting the representative of the merchant 106 for up to 2 weeks after capture, that the BAM store control system 100 has permission to use camera data depicting the representative of the merchant 106 for up to 72 hours after capture for the purpose of tracking the representative of the merchant 106's personal inventory and work progress, that the BAM store control system 100 has permission to use camera data depicting the representative of the merchant 106 for up to 72 hours after capture for the purpose of developing training data for the learning management engine 178, that the BAM store control system 100 has permission to generate schedules on behalf of the representative of the merchant 106, that the BAM store control system 100 has permission to activate indicator lights (or other BAM store area devices 110) to highlight products or services 112 that the representative of the merchant 106 should restock or move or rearrange, that the BAM store control system 100 has permission to store badge data corresponding to representative of the merchant 106 for as long as the representative of the merchant 106 is employed at the merchant, that the that the BAM store control system 100 has permission to store a social security number of a representative of the merchant 106 for as long as the representative of the merchant 106 is employed at the merchant but only in hashed or tokenized or encrypted form, that the BAM store control system 100 has permission to store the customer 102's biometric data for as long as the representative of the merchant 106 is employed at the merchant but only in hashed or tokenized form, and the like.

In some cases, the BAM store control system 100 may store certain data in encrypted form, but the BAM store control system 100 may be decrypt the encrypted data to allow access upon a certain condition being met. For example, if the customer pose identification and tracking engine 144 identifies a change in mood and/or sentiment of a customer 102 from a positive mood to a negative mood, the BAM store control system 100 may decrypt data storing an identifier of the customer that the BAM store control system 100 previously stored in encrypted form, so that the BAM store control system 100 can identify the customer to a representative of the merchant 106 and/or to a merchant device 108 so that the representative of the merchant 106 can assist the customer 102.

The application layer 130 may include a customer history tracking engine 160. The customer history tracking engine 160 can track historical information about a customer 102 and/or a customer device 104. For example, the customer history tracking engine 160 can track a purchase history of the customer 102 with a particular merchant, a purchase history of the customer with a particular representative of the merchant 106, a purchase history of the customer from the merchant in a particular BAM store area, a purchase history of the customer with a particular set of merchants, a purchase history of the customer with merchants in a particular geographic region (e.g., city, zip code, area code, county, state, country, continent), a purchase history of the customer from merchants in brick-and-mortar BAM store areas, a purchase history of the customer from online merchants, a purchase history of the customer generally, or a combination thereof.

In some cases, the history information for a particular customer 102, as tracked by the customer history tracking engine 160, can be linked to a customer identifier and/or account for that customer 102, as managed by the customer identifier and account management engine 152. In some cases, the customer history tracking engine 160 can, for certain history information for a particular customer 102, intentionally not store the information, at least partially delete the information after using the information, at least partially delete the information after a predetermined period of time, at least partially delete the information after the customer 102 and/or customer device 104 exits the BAM store area or another geofence, or a combination thereof. The customer history tracking engine 160 may generate a hashed and/or encrypted version of certain history information, and may keep the hashed and/or encrypted version of the information even after at least partially deleting the information.

The application layer 130 may include a merchant history tracking engine 162. The merchant history tracking engine 162 can track historical information about a merchant, a representative of a merchant 106, a merchant device 108, and/or a BAM store area device 110. For example, the merchant history tracking engine 162 can track a sales history of the merchant to a particular customer 102, a sales history of the representative of the merchant 106 to the particular customer 102, a sales history of the merchant to a particular set of customers 102, a sales history of the representative of the merchant 106 to customers 102 in a particular BAM store area, a sales history of the merchant to customers 102 in a particular BAM store area, a sales history of the representative of the merchant 106 to the particular set of customers 102, a sales history of the merchant to customers 102 in a particular geographic region (e.g., city, zip code, area code, county, state, country, continent), a sales history of the representative of the merchant 106 to customers 102 in the particular geographic region (e.g., city, zip code, area code, county, state, country, continent), a sales history of the merchant to customers 102 in brick-and-mortar BAM store areas, a sales history of the representative of the merchant 106 to customers 102 in brick-and-mortar BAM store areas, a sales history of the merchant to customers 102 through online shopping, a sales history of the representative of the merchant 106 to customers 102 online shopping, or a combination thereof.

In some cases, the history information for a particular merchant or representative of the merchant 106, as tracked by the merchant history tracking engine 162, can be linked to a merchant identifier and/or account for that particular merchant or representative of the merchant 106, as managed by the merchant identifier and account management engine 154. In some cases, the merchant history tracking engine 162 can, for certain history information for a particular merchant or representative of the merchant 106, intentionally not store the information, at least partially delete the information after using the information, at least partially delete the information after a predetermined period of time, at least partially delete the information after the representative of the merchant 106 and/or merchant device 108 exits the BAM store area or another geofence, or a combination thereof. The merchant history tracking engine 162 may generate a hashed and/or encrypted version of certain history information, and may keep the hashed and/or encrypted version of the information even after at least partially deleting the information.

The application layer 130 may include a customer experience customization engine 164. The customer experience customization engine 164 can customize the customer 102's experience in a BAM store area, for instance using sensors 124, local wireless transceivers 126 interacting with the customer device 104, BAM store area devices 110, or a combination thereof. The customer experience customization engine 164 can customize the experience of the customer 102 in the BAM store area based on the pose of the customer 102 and/or of the customer device 104 (as determined by the customer pose identification and tracking engine 144), the poses of representatives of merchants 106 and/or merchant devices 108 (as determined by the merchant pose identification and tracking engine 146), the poses of objects corresponding to products and/or services 112 (as determined by the product/service pose identification and tracking engine 148), the map of the BAM store area (generated by the spatial mapping engine 150), customer identification and/or account information (managed by the customer identifier and account management engine 152), merchant identification and/or account information (managed by the merchant identifier and account management engine 154), customer preferences or needs information (determined by the customer preferences and needs identification and tracking engine 156), merchant preferences or needs information (determined by the merchant preferences and needs identification and tracking engine 158), customer history information (determined by the customer history tracking engine 160), merchant history information (determined by the merchant history tracking engine 162), merchant experience customization information (generated by the merchant experience customization engine 166), inventory information (determined by the inventory management engine 168), scheduling information (determined by the scheduling management engine 170), supply chain information (determined by the supply chain management engine 172), or a combination thereof.

In some examples, the customer experience customization engine 164 can automatically create and/or updating a personal inventory data structure (e.g., a virtual shopping cart or virtual basket) associated with a customer 102 in response to the BAM store control system 100 identifying that the customer 102 has picked up a particular object associated with a product or service 112 and/or placed the particular object associated with the product or service 112 into a container (e.g., a basket, a bag, or a cart). The BAM store control system 100 can identify the customer 102 picking up the object associated with the product or service 112 (e.g., from a merchantable inventory area) and/or placing the object into a container by tracking the pose of the customer 102 using the customer pose identification and tracking engine 144 and/or the by tracking the pose of the object associated with the product or service 112 using the product/service pose identification and tracking engine 148. In some examples, the BAM store control system 100 can identify a visual representation (e.g., depiction) in image data captured by image sensors (of the sensors 124) of the customer 102 picking up the object associated with the product or service 112 (e.g., from a merchantable inventory area) and/or placing the object into a container.

In some examples, the customer 102 can view their personal inventory data structure using an application interface 130 or website 128 on their customer device 104. In this way the customer 102 can view the contents of their physical cart in an electronic form which can provide advantages such as allowing customer 102 to see a current order total price, and/or to apply digital coupons to the cart while shopping. The contents of the personal inventory data structure can also be recorded in association with the customer's profile so that the customer can review previously purchased items and re-purchase them online with some certainty that they are purchasing the same item that they previously purchased in a physical retail environment. In some embodiments, items saved in association with the customer's profile can also be highlighted to the customer on future trips to the physical retail location as described elsewhere herein. In this way, items that were previously purchased online or in the physical environment can translate from the physical to the virtual world and vice versa.

In some examples, the container (e.g., the basket, the bag, or the cart) can be or can include a BAM store area device 110. The container can include sensors 124 and/or local wireless transceivers 126. The customer experience customization engine 164 can identify when the object has been placed in the container, for example, based on a receipt of a signal from a BAM store area device 110 associated with the container indicating that a pressure sensor in the container that detects pressure from the object, a camera in the container that captures image data depicting the object entering the container, an RFID reader in the container that reads an RFID tag on the object, an NFC reader in the container that reads an NFC tag on the object, or a combination thereof. The sensors 124 and/or local wireless transceivers 126 in the container can report detection of placement of the object in the container to the customer experience customization engine 164.

As discussed further below, the inventory management engine 168 can keep track of merchantable inventory of merchantable inventory areas within the BAM store area. The inventory management engine 168 can also keep track of personal inventories for customer 102 and/or representatives of merchants 106.

In some examples, if the customer experience customization engine 164 identifies future plans of a customer 102 based on the customer's purchase history, the contents of the customer's personal inventory data structure, the customer 102's gaze information, objects associated with products or services 112 that the customer 102 has picked up and put back down, or some combination thereof. For example, if the customer 102 has purchased or intends to purchase a time-specific and/or region-specific product or service 112, the customer experience customization engine 164 can identify a location that the customer 102 will be at during a particular time. For instance, the product or service 112 can be an airline ticket to a particular location at a particular time, a bus or train ticket to a particular location at a particular time, a rental car to be picked up at a particular location at a particular time, a hotel room at a particular location at a particular time, a concert ticket for a concert at a particular location at a particular time, a movie ticket for a movie at a particular location at a particular time, a theme park ticket for a theme part at a particular location at a particular time, a moving truck, a moving service, and the like. The customer experience customization engine 164 can output recommendations to the customer 102 and/or to a representative of the merchant 106 who is serving the customer 102 based on further products and/or services 112 relevant to the particular location and/or the particular time. For example, if the customer 102 has purchased a ski pass to Tahoe in December, the customer experience customization engine 164 can output recommendations to the customer 102 and/or to a representative of the merchant 106 who is serving the customer 102 in autumn for ski gear. Similarly, if the customer 102 has rented a rental car in Hawaii for April, the customer experience customization engine 164 can output recommendations to the customer 102 and/or to a representative of the merchant 106 who is serving the customer 102 for sunscreen and snorkeling gear.

In some examples, if the customer experience customization engine 164 can generate recommendations based on a shopping list obtained from a customer device 104, for examples through the web interface 128 and/or through the software application interface 130. In some cases, a recommendation can be used to notify a customer 102 and/or a representative of the merchant 106 through the customer device 104 and/or the merchant device 108 that a product or service 112 that the customer 102 has on their shopping list is not available from a particular merchant and/or in a particular BAM store area. The lack of the product or service 112 in the BAM store area may be determined using the inventory management engine 168, for instance. The customer 102 may then know to go to a different BAM store area rather than continuing to search for the missing product or service 112. The representative of the merchant 106 can help recommend a different BAM store area that may have the product or service 112 that the customer 102 has on their shopping list, such as a different store in the same merchant chain. In some cases, the customer experience customization engine 164 can generate directions or routes to another BAM store area that the customer 102 can go to that has the product or service 112 that the customer 102 has on their shopping list.

In some examples, if the customer experience customization engine 164 can generate recommendations based on information from devices that the customer 102 has at their home. For example, if the customer 102 has a smart refrigerator with sensors that can identify a quantity of a product (e.g., milk) inside the refrigerator, the customer experience customization engine 164 can query the smart refrigerator for the quantity of the product inside the refrigerator. If the quantity is less than a threshold, the customer experience customization engine 164 can generate a recommendation for the product. In some examples, if the customer experience customization engine 164 can generate recommendations based on history information from the customer history tracking engine 160, the merchant history tracking engine 162, or both. For example, the customer experience customization engine 164 can identify that a customer 102 usually buys a particular product (e.g., eggs) from the merchant at the BAM store area according to a particular pattern (e.g., once every two weeks). The customer experience customization engine 164 can generate a recommendation for the product based on the identified pattern (e.g., when two weeks elapse). The customer experience customization engine 164 can surface these recommendations to the customer by providing an alert in an application 130, or if the customer is in a store that sells the product it can utilize interface layer 120 to highlight the product or direct the customer to the product as described herein.

In some examples, the customer 102's shopping list may include a generic name for a product or service 112, and the customer experience customization engine 164 can generate recommendations for more specific versions of the product or service 112 based on what is important to the customer 102. For example, the customer 102's shopping list on the customer device 104 may list "toothpaste." The customer experience customization engine 164 can generate a recommendation for a toothpaste that is preferred by the customer 102, a toothpaste that is preferred by the customer 102's family and/or friends, a toothpaste that the customer 102 has historically purchased, a toothpaste that the customer 102's family and/or friends have historically purchased, a toothpaste recommended by a representative of the merchant 106, a toothpaste recommended by the merchant, a toothpaste recommended by the customer 102's doctor, a toothpaste recommended by another authority figure who is important to the customer 102, a toothpaste that is most popular among customers of the merchant, a toothpaste that is most popular in a geographic region that the customer 102 is in, a toothpaste that currently has the biggest discount from its normal price, a toothpaste that is currently least expensive, a toothpaste that is most expensive, a toothpaste that provides a feature (e.g., whitening, fluoride) that the customer 102 values, a toothpaste that is most sustainably produced, a toothpaste that is high in organic and/or healthy ingredients, a toothpaste that avoids or is low in unhealthy and/or undesirable ingredients, or a combination thereof.

In some examples, customer experience customization engine 164 can generate recommendations based on the AI platform 196. For instance, the customer 102 can select (e.g., through an interface of the customer device 104, the merchant device 108, or a BAM store area device 110) one or more ingredients that the customer 102 wants in their meal, and the AI platform 196 can generate a recipe based on those ingredients. The recipe can then be cooked by a human chef, a robotic chef, or a combination thereof. In some examples, the customer 102 can select (e.g., through an interface of the customer device 104, the merchant device 108, or a BAM store area device 110) one or more colors or fabrics of an outfit, and the AI platform 196 can generate a recommendation for an outfit based on these selections, knowledge of the inventory of the BAM store area (based on the inventory management engine 168), knowledge or estimates of the customer 102's clothing sizes, or a combination thereof. A representative of the merchant 108 can help the customer 102 then find, try on, and purchase component pieces of the outfit. In some examples, the customer 102 can select (e.g., through an interface of the customer device 104, the merchant device 108, or a BAM store area device 110) one or more drinks and/or meals that the customer 102 likes, but requests that the AI platform 196 generate something new based on those selections, which the AI platform 196 can do. The drinks and/or meals generated by the AI platform 196 can then be generated by a human chef, a human barista, a robotic chef, a robotic barista, or a combination thereof.

The recommendations can be output through the customer device 104, the merchant device 108, the BAM store area device 110, the web interface 128, the software application interface 130, the chat bot 134, or a combination thereof. The BAM store area device 110 which may, for example, display a recommended product or service 112 or guide the customer 112 and/or the representative of the merchant 106 to a location of the recommended product or service 112 in the BAM store area. The chat bot 134 may, for example, output a verbal hint to the representative of the merchant 106 who is serving the customer 102 that the customer 102 may be interested in ski gear. In some examples, such recommendations can also be generated by the merchant experience customization engine 166, for example if the recommendations are given to a representative of a merchant 106 rather than directly to a customer 102. In some examples, the representative of the merchant 106 can also ask the chat bot 134 questions about the customer and/or about the recommendation, verbally or textually, and the chat bot 134 provide a response as generated by the BAM store control system 100. In some examples, the BAM store control system 100 customer experience customization engine 164 and/or merchant experience customization engine 166 can use a microphone of the sensors 124 to listen to at least part of a conversation between the customer 102 and the representative of the merchant 106 in order to obtain more information about the customer 102 and/or in order to determine an optimal timing to give the recommendation to the representative of the merchant 106 using the chat bot 134. In order to respect privacy, any recorded audio can be immediately deleted after use.

In some examples, if the customer experience customization engine 164 can use BAM store area devices 110 to guide the customer 102, and/or a representative of the merchant 106 who is serving the customer 102, toward a location of a particular product or service 112 in the BAM store area. In an illustrative example, the customer preferences and needs identification and tracking engine 158 can identify, through the web interface 128 and/or the software application interface 130, that the customer device 104 lists milk and eggs on a shopping list on a software application and/or website. The BAM store area devices 110 may include lights, such as light emitting diodes (LEDs), positioned at various locations throughout the BAM store area such as various merchantable inventory areas (e.g., shelving units, tabletops, clothes racks, refrigerators). One or more lights that are closest to the locations of the products or services 112 in question (here, the milk and the eggs) in the BAM store area can be illuminated by the customer experience customization engine 164. The lights may be color-coded to illuminate in a specific color that corresponds to the customer 102 (e.g., a color selected by or for the customer 102). In some examples, the BAM store area devices 110 can include displays in place of, or in addition to, the lights. The customer experience customization engine 164 can display an icon that corresponds to the customer 102 (e.g., an icon selected by or for the customer 102) at one or more of the displays that are closest to the locations of the products or services 112 in question (here, the milk and the eggs) in the BAM store area. In some examples, the BAM store area devices 110 can include speakers (e.g., directional speakers) in place of, or in addition to, the lights. The customer experience customization engine 164 can output a sound that corresponds to the customer 102 (e.g., a sound selected by or for the customer 102) using the speakers that are closest to the locations of the products or services 112 in question (here, the milk and the eggs) in the BAM store area. The speakers can be directional speakers, so that the customer 102 can hear the sound clearly, and other individuals are unable to clearly hear the sound. The location of the products or services 112 in question (here, the milk and the eggs) can then be identifiable to the customer 102 based on the direction that the customer 102 hears the sound coming from. In some examples, customer experience customization engine 164 can output a sound that corresponds to the customer 102 using the speakers that are closest to the location of the customer 102, and can output a sound that helps guide the customer 102 to the location of the products or services 112 in question (here, the milk and the eggs). For example, the sound can tell the customer 102 that the milk is in aisle 4, while the eggs are in aisle 6.

In some examples, the customer experience customization engine 164 can use the customer device 104 to guide the customer 102 toward a location of a particular product or service 112 in the BAM store area. In the illustrative example provided above, the customer preferences and needs identification and tracking engine 158 can identify, through the web interface 128 and/or the software application interface 130, that the customer device 104 lists milk and eggs on a shopping list on a software application and/or website. The customer experience customization engine 164 can generate a message and send the message to the customer device 104. The message can guide the customer 102 toward the locations of the products or services 112 in question (here, the milk and the eggs) in the BAM store area, in some cases based on the current pose of the customer 102 (e.g., as identified using the customer device 104 and/or using the customer pose identification and tracking engine 144). For example, the customer pose identification and tracking engine 144 can identify that the customer 102 is in aisle 3 of the BAM store area, and is facing north. The product/service pose identification and tracking engine 148 can identify that the products or services 112 in question (here, the milk and the eggs) are in aisle 5 in the BAM store area. The customer experience customization engine 164 can generate a message with an arrow pointing toward the direction of the products or services 112 in question (here, the milk and the eggs), for example by pointing in the direction of aisle 5 in the BAM store area relative to the direction that the customer 102 is facing. The message may include a map of the BAM store area. The map may include a first marker overlaid over the map, the first marker indicating the pose (e.g., location and/or orientation) of the customer 102 and/or the customer device 104. The map may include a second marker, the second marker indicating the pose (e.g., location and/or orientation) of the products or services 112 in question (here, the milk and the eggs). The map may include a route from the first marker to the second marker. The message may include written or verbal instructions for the customer 102 to walk or otherwise move from the location of the customer 102 and/or customer device 104 to the location of the products or services 112 in question (here, the milk and the eggs).

In some examples, a customer 102 can provide a payment instrument and/or have the payment instrument read by the merchant device 108 before checking out to make a purchase. For example, in some cases, the customer 102 can provide a payment instrument and/or have the payment instrument read by the merchant device 108 upon entering the BAM store area as part of a check-in or badge-in process. In some cases, the customer 102 can provide a payment instrument and/or have the payment instrument read by the merchant device 108 once the customer 102 knows that they have intent to make at least one purchase, but while the customer 102 is still shopping. Even though the merchant device 108 reads the payment instrument information from the payment instrument before any transaction is initiated, the merchant device 108 can wait to use the payment instrument information for a transaction until the customer 102 requests a transaction (e.g., to purchase one or more products or services 112). In some examples, the customer 102 does not need to provide their payment instrument during the transaction because the merchant device 108 has already read the payment instrument information. This can allow a customer 102 to exit the store without checking out at a merchant device 108, for example if a personal inventory data structure is generated to keep track of the products and/or services 102 that the customer 102 has picked up. Instead, once the customer pose identification and tracking engine 144 identifies that the customer 102 and/or the customer device 104 has exited the BAM store area, the merchant device 108 and/or the BAM store control system 100 can automatically charge the customer 102 for the transactions using the payment instrument information. If the customer 102's payment instrument information is already stored in the customer identifier and account management engine 152, then in some examples the customer 102 may not need to have the payment instrument read at all while in the BAM store area. In some examples, the customer 102 may provide authorization for the merchant device 108 and/or the BAM store control system 100 to perform a cardless transaction without the payment instrument present, and/or to process the transaction automatically (e.g., automatically upon the customer 102's exit from the BAM store area).

In some examples, BAM store area device 110 may include robotic systems that perform automatic bagging of objects associated with products and/or services 112 that are purchased, or that are to be purchased, by the customer 102. A robotic system that performs automatic bagging of objects may include one or more robotic arms. In some examples, the robotic system may use one or more robotic arms to hold a bag open, and one or more robotic arms to place objects into the bag while the bag is open. In some examples, the robotic system may use one or more robotic systems that loop a bag around a frame that keeps the bag open, and one or more robotic arms to place objects into the bag while the bag is open. In some embodiments, the robotic system can be an inventory restocking robot and can both pick and package the order.

In some examples, the customer experience customization engine 164 can provide a virtual fitting room for the customer 102. Using the virtual fitting room, the customer 102 can simulate their own look in different clothing, for example where clothing is a product or service 112 offered by a merchant in a BAM store area supported by the BAM store control system 100. In some examples, the customer experience customization engine 164 can provide, for the customer 102, a virtual concierge that provides tips and/or recommendations for the customer 102 based on the preferences and/or needs of the customer determined by the customer preferences and needs identification and tracking engine 156.

In some examples, if the customer experience customization engine 164 can provide access to the customer 102 and/or the customer device 104 to additional information about a product or service 112. For example, a customer device 104 may scan a glyph 132 on or near an object associated with a product or service 112. The customer device 104 may decode a pointer from the glyph 132 to an interface with additional information about the product or service 132. The interface may be generated and/or hosted and/or served to the customer device 104 by the BAM store control system 100 through the web interface 128 and/or the software application interface 130. In some examples, the customer device 104 may take a picture of the object associated with the product or service 112. The BAM store control system 100 may apply the AI platform 196 to the image of the object to identify the object, for example using feature detection, feature recognition, feature tracking, object detection, object recognition, object tracking, another function of the AI platform 196, or a combination thereof. Upon identifying the object, the BAM store control system 100 may provide a pointer to the customer device 104 to the interface with additional information about the product or service 132. The pointer may identify a network location at which the additional information is stored, and can for example be a URL. The network location may be accessible by the customer device 104 through the web interface 128 and/or the software application interface 130. The additional information may include, for example, ingredients, nutrition information, manufacturer information, distributor information, expiration dates, origins of ingredients, images of the product or service 112, videos of the product or service 112, audio of the product or service 112, descriptions of the product or service 112, customer reviews, customer ratings, customer comments, or combinations thereof. In some examples, a customer 102 can point to, touch, pick up, or gaze at an object associated with a product or service 112, in some cases for at least a threshold period of time, which can be recognized by the customer pose identification and tracking engine 144 and/or the product/service pose identification and tracking engine 148. The BAM store control system 100 may provide pointer to the customer device 104 to the interface with additional information about the product or service 132 upon recognizing that the customer 102 has interacted with the product or service 102 in at least one of the listed ways.

In some examples, the customer experience customization engine 164 can modify what is output via BAM store area devices 110. For example, the customer experience customization engine 164 can modify what is displayed via display screens (BAM store area devices 110) in the BAM store area. The customer experience customization engine 164 can modify the display screen's output to recommend specific products and/or services, or specific versions (e.g., colors, brands, sizes, etc.) based on preferences and/or needs of the customer determined by the customer preferences and needs identification and tracking engine 156. In some cases, the customer pose identification and tracking engine 144 can also track mood and/or sentiment of a customer 102, for example based on facial expression and/or body language. In some cases, the customer pose identification and tracking engine 144 can track changes to mood and/or sentiment of a customer 102, for example based on changes to facial expression and/or body language. In the customer pose identification and tracking engine 144 can identify when the change occurred, where the change occurred, what the customer 102 was doing when the change occurred, the pose of the customer 102 when the change occurred (e.g., in response to the customer 102's gaze shifting to a price tag). Changes to mood and/or sentiment can include changes, for example, between happy, excited, sad, angry, upset, tired, and other moods or sentiments. In some cases, the customer experience customization engine 164 can modify the display screen's output to recommend specific products and/or services, or specific versions (e.g., colors, brands, sizes, etc.) based on the mood and/or sentiment of the customer 102. In some examples, the customer experience customization engine 164 can provide the customer 102 and/or customer device 104 with special promotions or other benefits to accommodate the customer 102 if the mood and/or sentiment of the customer 102 is identified to be negative (e.g., angry, sad, upset) and/or if the mood and/or sentiment of the customer 102 is identified to have changed from positive (e.g., happy, excited) to negative. In some cases, the customer identifier and account management engine 152 can also track demographic information about the customer 102, such as age, sex, gender, ethnicity, race, national origin, area of residence, political affiliations, and the like. In some cases, the customer experience customization engine 164 can modify the display screen's output to recommend specific products and/or services, or specific versions (e.g., colors, brands, sizes, etc.) based on the mood and/or sentiment of the customer 102. In some cases, the customer experience customization engine 164 and/or merchant experience customization engine 166 can instruct a representative of a merchant 106 to modify which products and/or services 112 are in a merchantable inventory area, or how they are arranged in the merchantable inventory area, based on the preferences, needs, moods, sentiments, and/or demographic information of one or more customers 102. In some examples, display screens or other BAM store area devices 110 can be customized based on the customer 102 for a period of time, such as while the customer 102 is in a queue, while the customer 102 is within a threshold range of the BAM store area device 110, while the customer 102 is in a BAM store area to pick up a pick-up or to-go order, or a combination thereof.

The application layer 130 may include a merchant experience customization engine 166. The merchant experience customization engine 166 can customize the experience of a representative of a merchant 106 in a BAM store area, for instance using sensors 124, local wireless transceivers 126 interacting with the merchant device 106, BAM store area devices 110, or a combination thereof. The merchant experience customization engine 166 can customize the experience of the representative of the merchant 106 in the BAM store area based on the pose of the representative of the merchant 106 and/or of the merchant device 108 (as determined by the merchant pose identification and tracking engine 146), the poses of customers 102 and/or customer devices 104 (as determined by the customer pose identification and tracking engine 144), the poses of objects corresponding to products and/or services 112 (as determined by the product/service pose identification and tracking engine 148), the map of the BAM store area (generated by the spatial mapping engine 150), customer identification and/or account information (managed by the customer identifier and account management engine 152), merchant identification and/or account information (managed by the merchant identifier and account management engine 154), customer preferences or needs information (determined by the customer preferences and needs identification and tracking engine 156), merchant preferences or needs information (determined by the merchant preferences and needs identification and tracking engine 158), customer history information (determined by the customer history tracking engine 160), merchant history information (determined by the merchant history tracking engine 162), customer experience customization information (generated by the customer experience customization engine 164), inventory information (determined by the inventory management engine 168), scheduling information (determined by the scheduling management engine 170), supply chain information (determined by the supply chain management engine 172), or a combination thereof.

Figure 9:
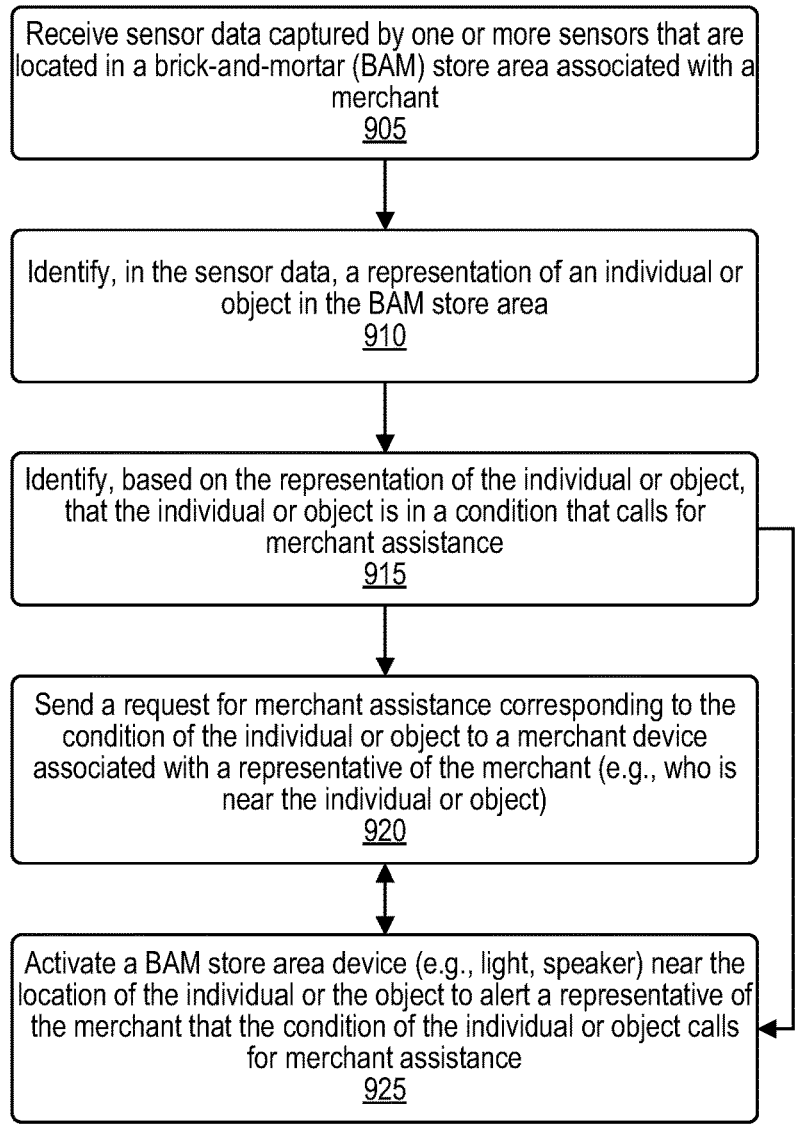
FIG. 9 is a flow diagram illustrating operations for automatically requesting merchant assistance.

In some examples, if the merchant experience customization engine 166 can use BAM store area devices 110 to guide a representative of the merchant 106 toward a location associated with a particular task for the representative of the merchant 106 to perform in the BAM store area (e.g., see FIG. 9). The location can be, for instance, a location in which a product or service 112 should be restocked, a location in which a product or service 112 should be rearranged, a location from which a product or service 112 should be moved, a location in which a new sensor 124 should be installed, a location in which an existing sensor 124 should be repaired or replaced, a location in which a new wireless transceiver 126 should be installed, a location in which an existing wireless transceiver 126 should be repaired or replaced, a location in which a new merchant device 108 should be installed, a location in which an existing merchant device 108 should be repaired or replaced, a location in which a new BAM store area device 110 should be installed, and/or a location in which an existing BAM store area device 110 should be repaired or replaced.

In some cases, the location can be associated with a particular product or service 112 in the BAM store area. In some examples, the merchant experience customization engine 166 can identify that a merchantable inventory area for a particular product or service 112 has less than a threshold quantity of the particular product or service 112, and/or the particular product or service 112 should be restocked by the representative of the merchant 106. In some examples, the merchant experience customization engine 166 can identify that objects in a merchantable inventory area for a particular product or service 112 are to be reorganized, for instance because one or more objects are in an area that corresponds to a different type of object, one or more objects in the back are to be brought forward to be more easily reached by customers or merchants, one or more older objects (e.g., with sooner expiration or "best by" dates) in the back are to be brought forward to sell before selling one or more newer objects (e.g., with later expiration or "best by" dates), one or more objects are organized in a manner that is inconsistent with merchant and/or manufacturer and/or distributor merchandising guidelines, one or more objects are disorganized or untidy, or a combination thereof. The BAM store area devices 110 may include lights, such as light emitting diodes (LEDs), positioned at various locations throughout the BAM store area such as various merchantable inventory areas (e.g., shelving units, tabletops, clothes racks, refrigerators). The lights that are closest to the locations of the one or more objects associated with the product or service 112 that is running low, that is to be restocked, and/or that is to be reorganized can be illuminated by the merchant experience customization engine 166. The lights may be color-coded to illuminate in a specific color that corresponds to the representative of the merchant 106 (e.g., a color selected by or for the representative of the merchant 106). In some examples, the BAM store area devices 110 can include displays in place of, or in addition to, the lights. The merchant experience customization engine 166 can display an icon that corresponds to the representative of the merchant 106 (e.g., an icon selected by or for the representative of the merchant 106) at the displays that are closest to the locations of the one or more objects associated with the product or service 112 that is running low, that is to be restocked, and/or that is to be reorganized in the BAM store area. In some examples, the BAM store area devices 110 can include speakers (e.g., directional speakers) in place of, or in addition to, the lights. The merchant experience customization engine 166 can output a sound that corresponds to the representative of the merchant 106 (e.g., a sound selected by or for the representative of the merchant 106) at the speakers that are closest to the locations of the one or more objects associated with the product or service 112 that is running low, that is to be restocked, and/or that is to be reorganized in the BAM store area. The speakers can be directional speakers, so that the representative of the merchant 106 can hear the sound clearly, and other individuals are unable to clearly hear the sound. The location can be identifiable to the representative of the merchant 106 based on the direction that the representative of the merchant 106 hears the sound coming from. In some examples, merchant experience customization engine 166 can output a sound that corresponds to the representative of the merchant 106 using the speakers that are closest to the location of the representative of the merchant 106, and can output a sound that helps guide the representative of the merchant 106 to the location. For example, the sound can tell the representative of the merchant 106 to repair a camera in aisle 6.

In some examples, the merchant experience customization engine 166 can also use the merchant device 108 to guide the representative of the merchant 106 toward a location associated with a task in the BAM store area. As discussed above, the location can be, for instance, a location in which a product or service 112 should be restocked, a location in which a product or service 112 should be reorganized, a location from which a product or service 112 should be moved, a location in which a new sensor 124 should be installed, a location in which an existing sensor 124 should be repaired or replaced, a location in which a new wireless transceiver 126 should be installed, a location in which an existing wireless transceiver 126 should be repaired or replaced, a location in which a new merchant device 108 should be installed, a location in which an existing merchant device 108 should be repaired or replaced, a location in which a new BAM store area device 110 should be installed, and/or a location in which an existing BAM store area device 110 should be repaired or replaced.

The merchant experience customization engine 166 can generate a message and send the message to the merchant device 108. The message can guide the representative of the merchant 106 toward the location associated with the task in question (e.g., a location in which a sensor 124 should be installed) in the BAM store area, in some cases based on the current pose of the representative of the merchant 106 (e.g., as identified using the merchant device 108 and/or using the merchant pose identification and tracking engine 146). For example, the merchant pose identification and tracking engine 146 can identify that the representative of the merchant 106 is in aisle 4 of the BAM store area, and is facing east. The product/service pose identification and tracking engine 148 can identify that the task in question (e.g. installing the sensor 124), is to be performed in are in aisle 7 in the BAM store area. The merchant experience customization engine 166 can generate a message with an arrow pointing toward the direction of the location at which the task is to be performed, for example by pointing in the direction of aisle 7 in the BAM store area relative to the direction that the representative of the merchant 106 is facing. The message may include a map of the BAM store area. The map may include a first marker overlaid over the map, the first marker indicating the pose (e.g., location and/or orientation) of the representative of the merchant 106 and/or the merchant device 108. The map may include a second marker, the second marker indicating the pose (e.g., location and/or orientation) at which task is to be performed (here, installing the sensor 124). The map may include a route from the first marker to the second marker. The message may include written or verbal instructions for the representative of the merchant 106 to walk or otherwise move from the location of the representative of the merchant 106 and/or merchant device 108 to the location of the task to be performed.

The merchant experience customization engine 166 can generate a variety of recommendations for merchants and/or for representatives of merchants 106. In some examples, the merchant experience customization engine 166 can generate recommendations for merchants and/or for representatives of merchants 106 based on what products or services 112 other merchants and/or other BAM store areas (e.g., of a similar type) have had success selling. For example, a BAM store control system 100 can service multiple merchants and/or multiple BAM store areas, and therefore can have access to data from those merchants and BAM store areas. The merchant experience customization engine 166 can recommend to a merchant and/or representative of the merchant 106 that offering a certain product or service 112 that other merchants of the same type offer could increase sales by an estimated amount. For example, if the merchant is a coffee shop, the merchant experience customization engine 166 can generate and provide a recommendation indicating "if you offer cold brew coffee like other coffee shops, you could increase sales by an estimated 20%." In some examples, the merchant experience customization engine 166 can generate recommendations for merchants and/or for representatives of merchants 106 based on which products or services 112 a threshold number of customers 102 are looking at for more than a threshold amount of time but not buying, and/or are picking up and putting back. For example, the merchant experience customization engine 166 can generate and provide a recommendation indicating "35% customers look at the soda for more than 10 seconds but to not buy it—try moving it to the 'impulse buy' section of the store, lowering its price, and/or stocking similar products."

In some examples, the merchant experience customization engine 166 can generate recommendations for merchants and/or for representatives of merchants 106 based on which products or services 112 sell well in other branches of the same merchant but do not sell well in this particular branch, indicating that perhaps the products or services 112 are not positioned well in the BAM store area and should be moved to a more prominent merchantable inventory area, or should be moved to a merchantable inventory area in this particular branch corresponding to the merchantable inventory area where the products are services are performing well in other branches. In some examples, the merchant experience customization engine 166 can suggest BAM store area configurations that minimize traffic bottlenecks, for example based on bottlenecks identified in the spatial mapping engine 150 and/or an analysis by the AI platform 196 of potential bottlenecks. In some examples, the merchant experience customization engine 166 can suggest BAM store area configurations that minimize "no-man's lands" in which customers 102 rarely or never go, for example based on "no-man's lands" identified in the spatial mapping engine 150 and/or an analysis by the AI platform 196 of potential "no-man's lands."

In some examples, the merchant experience customization engine 166 can suggest different BAM store area configurations for merchants to AB test, in one brick and mortar (BAM) store or in different branches, and can provide analytics for the different configurations to recommend one of the BAM store area configurations over the others. In some examples, the merchant experience customization engine 166 can generate recommendations for merchants and/or for representatives of merchants 106 based on geographical regions that are promising regions to open one or more new BAM store areas in. The geographical regions may be identified based on where customers 102 that shop in the BAM store area also shop, or where customers 102 with similar demographic information shop. For example, the merchant experience customization engine 166 can generate and provide a recommendation indicating "30% of your customers in the Mission also spend lots of time in the Marina—you should consider opening your next location in the Marina."

Figure 10:
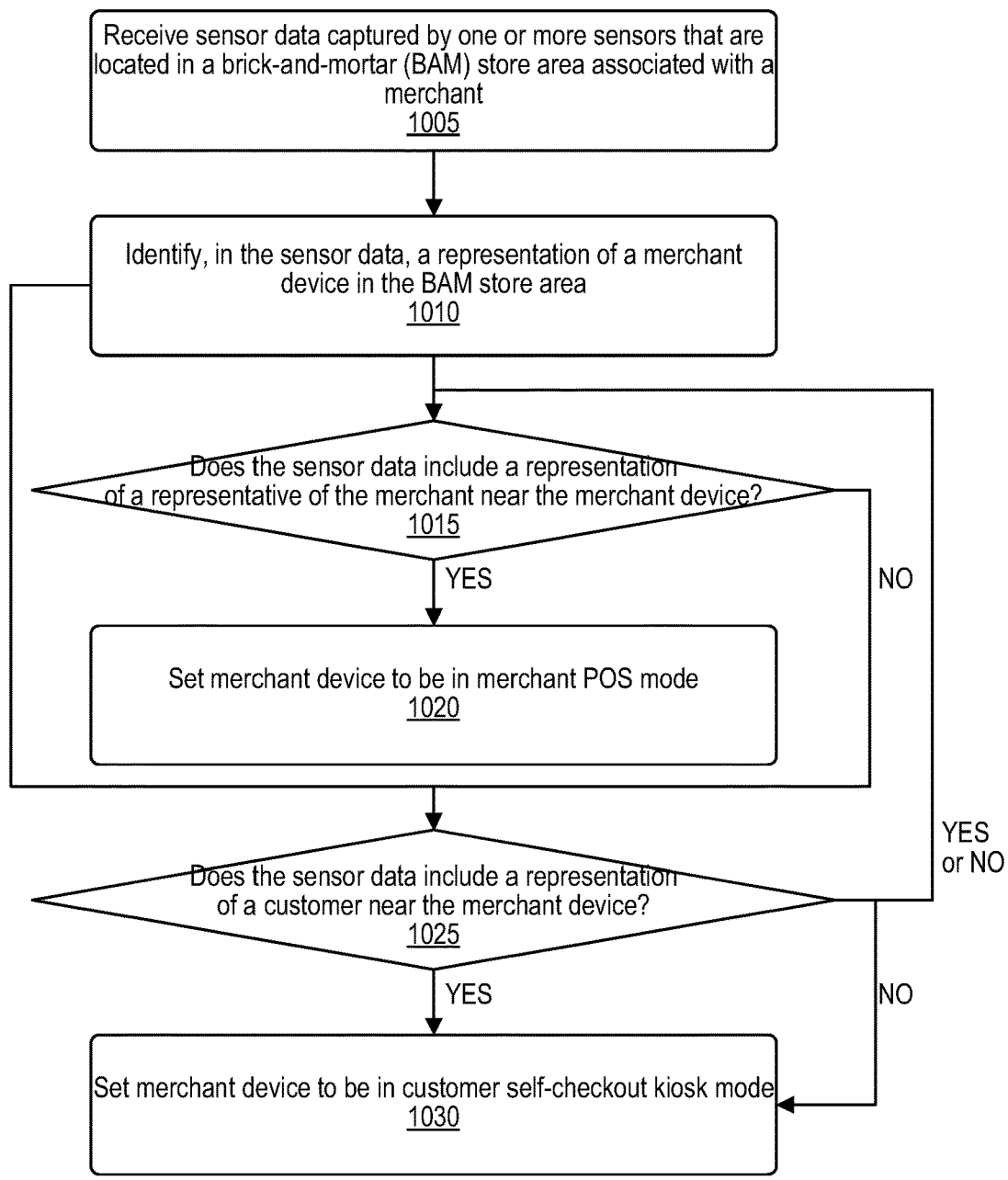
FIG. 10 is a flow diagram illustrating operations for automatically setting a mode of a merchant device.

In some examples, the merchant experience customization engine 166 can intelligently modify a functionality of a merchant device 108 and/or a BAM store area device 110. For example, if a merchant device 108 is set up to be a POS device, but the merchant pose identification and tracking engine 146 identifies that a representative of the merchant 106 has walked away from the merchant device 108, then the merchant experience customization engine 166 can automatically reconfigure the merchant device 108 to act as a shelf-checkout kiosk that customers 102 can use. In some examples, if a merchant device 108 is set up to be a POS device, but the customer pose identification and tracking engine 144 identifies that a customer 102 is approaching the merchant device 108 while the nearest representative of the merchant 106 to the merchant device 108 is at least a threshold distance away, then the merchant experience customization engine 166 can automatically reconfigure the merchant device 108 to act as a shelf-checkout kiosk that customers 102 can use. Examples of setting a mode of the merchant device 108 based on presence of the representative of the merchant 106 and/or the customer 102 are illustrated in FIG. 10. Examples of cameras that can be used to detect whether the representative of the merchant 106 and/or the customer 102 are at or near the merchant device 108 include the camera 215F near the POS 220E, the cameras 215G and 215H near the POS 220M, the cameras 215N and 215P near the POS 220P, the camera 215R near the POS 220V, and the camera 215M near the POS 220Q. In some examples, if a merchant device 108 is set up to be a POS device, and a representative of the merchant 106 using the merchant device 108 badges out, ends their shift, closes up, locks up, and/or exits the BAM store area, then the merchant experience customization engine 166 can automatically reconfigure the merchant device 108 to act as a shelf-checkout kiosk that customers 102 can use. In some examples, if a merchant device 108 is set up to be a POS device, and a representative of the merchant 106 does not interact with the merchant device 108 for at least a threshold amount of time, then the merchant experience customization engine 166 can automatically reconfigure the merchant device 108 to act as a shelf-checkout kiosk that customers 102 can use.

In some examples, the customer experience customization engine 164 and/or merchant experience customization engine 166 can customize a pick-up or to-go purchase experience. The customer experience customization engine 164 and/or merchant experience customization engine 166 can automatically package one or more objects associated with a product or service 112 according to the preferences and/or needs and/or mood and/or sentiment of the customer 102. The customer experience customization engine 164 and/or merchant experience customization engine 166 can automatically recommend packaging to a representative of the merchant 106 for the one or more objects associated with a product or service 112 according to the preferences and/or needs and/or mood and/or sentiment of the customer 102. The preferences and/or needs and/or mood and/or sentiment of the customer 102 can be as determined using the customer preferences and needs identification and tracking engine 156 and/or the customer pose identification and tracking engine 144. For instance, the BAM store area within which the customer pose identification and tracking engine 144 tracks the customer 102 and/or the customer device 104 can include an area outside of a store, which may include for example a sidewalk and/or a parking area. If the customer pose identification and tracking engine 144 (or another aspect of the BAM store control system 100) determines that the customer 102 walked, or is walking to, the BAM store area, then the customer experience customization engine 164 and/or merchant experience customization engine 166 can recommend packaging with handles, such as a bag with handles, to make it easy for the customer 102 to walk with the packaging. If the customer pose identification and tracking engine 144 (or another aspect of the BAM store control system 100) determines that the customer 102 drove, or is driving to, the BAM store area, then the customer experience customization engine 164 and/or merchant experience customization engine 166 can recommend stackable packaging, such as a box, to make it easy for the customer 102 to store along with other objects in the trunk or storage area of a vehicle. The customer experience customization engine 164 may print recommendations for the customer 102 on the packaging. The customer experience customization engine 164 and/or merchant experience customization engine 166 can automatically package the objects, or can suggest packaging for the objects to representatives of the merchant 106, that is colored based on the customer's preferences, needs, mood, sentiment, demographic information, or a combination thereof. For instance, if the customer pose identification and tracking engine 144 identifies that the customer 102's facial expression indicates that the customer 102 is sad, then a soothing color, such as green, can be automatically selected or recommended for the packaging. If the customer preferences and needs identification and tracking engine 156 indicates that the customer 102 is colorblind, then a color scheme can be automatically selected or recommended for the packaging that is easy for the customer to open and/or use.

While the customer 102 is on his/her way to the BAM store area for the pick-up or to-go order, the customer experience customization engine 164 and/or merchant experience customization engine 166 can send recommendations to the customer device 104 to update the order, for instance based on the customer 102's preferences, needs, purchase history, missing inventory, and/or possible errors. The recommendations to update the order can include additions, such as "add a croissant to your coffee order?" or "add soda to your pizza order?" The recommendations to update the order can include upgrades, such as "upgrade from medium drink to large drink?" or "upgrade to premium version of device?" The recommendations to update the order can include modifications, such as substitutions (e.g., based on inventory, allergies, preferences, and/or needs), such as "substitute chicken for turkey?" or "substitute noodles for rice?" The recommendations to update the order can include corrections to possible errors, such as "you ordered two identical outfits—update to just one?" or "you ordered this dish extra spicy and you usually order mild—update to mild?"

The application layer 130 may include an inventory management engine 168. The inventory management engine 168 can identify and/or track retail inventories of objects associated with products and/or services 112 within the BAM store area, within a warehouse that supplies the BAM store area, within personal inventories of customer 102 and/or representatives of merchants 106, or combinations thereof. As discussed previously, a merchantable inventory area (e.g., a shelving unit, a tabletop, a clothes rack, a refrigerator) can be or can include a BAM store area device 110. The merchantable inventory area can include sensors 124 and/or local wireless transceivers 126. The inventory management engine 168 can identify when the object associated with the product or service 112 has been moved relative to the merchantable inventory area based on a receipt of a signal from a BAM store area device 110 associated with the merchantable inventory area. For instance, the inventory management engine 168 can identify when the object associated with the product or service 112 has been removed from, placed into, or moved within the merchantable inventory area. The BAM store area device 110 associated with the merchantable inventory area can send the signal indicating that a pressure sensor in the merchantable inventory area detects pressure from the object when the pressure sensor previously did not detect pressure, that a pressure sensor in the merchantable inventory area no longer detects pressure from the object when the pressure sensor previously detected pressure, that a camera in the container that captures image data depicting the object moving or being moved relative to the merchantable inventory area, that an RFID reader in the merchantable inventory area reads an RFID tag associated with the object when the RFID reader previously did not read the RFID tag, that an RFID tag reader in the merchantable inventory area can no longer read an RFID tag associated with the object when the RFID reader previously read the RFID tag, that an NFC reader in the merchantable inventory area reads an NFC tag associated with the object when the NFC reader previously did not read the NFC tag, that an NFC tag reader in the merchantable inventory area can no longer read an NFC tag associated with the object when the NFC reader previously read the NFC tag, or a combination thereof. Tracking of inventory for a merchantable inventory area may be performed using sensors 124 and/or local wireless transceivers 126 that cover the entire BAM store area, or a large portion of the BAM store area. Tracking of inventory for a merchantable inventory area may be performed using sensors 124 and/or local wireless transceivers 126 that are specific to the merchantable inventory area. For example, a camera may be positioned in the back of shelving unit specifically to track movement of objects on the shelving unit.

The inventory management engine 168 can automatically adjust a merchantable inventory of an object in the merchantable inventory area by increasing or decreasing the merchantable inventory. For example, the inventory management engine 168 can identify, based on readings from sensors 124 that a particular merchantable inventory area (e.g., a particular shelving unit) includes a merchantable inventory of 15 backpacks in the merchantable inventory area. Based on detection that a customer 102 took one backpack (e.g., using the customer pose identification and tracking engine 144 and/or the product/service pose identification and tracking engine 148), the inventory management engine 168 can decrease the merchantable inventory of backpacks in the merchantable inventory area from 15 backpacks to 14 backpacks. Based on detection that the customer 102 went back 2 minutes later and put that backpack back in the merchantable inventory area (e.g., using the customer pose identification and tracking engine 144 and/or the product/service pose identification and tracking engine 148), the inventory management engine 168 can increase the merchantable inventory of backpacks in the merchantable inventory area from 14 backpacks back to 15 backpacks. Based on detection that a representative of the merchant 106 added 10 more backpacks to the merchantable inventory area from a storeroom (e.g., using the merchant pose identification and tracking engine 146 and/or the product/service pose identification and tracking engine 148), the inventory management engine 168 can increase the merchantable inventory of backpacks in the merchantable inventory area from 15 backpacks to 25 backpacks. In some examples, the merchantable inventory area that is tracked by the inventory management engine 168 can include an entire BAM store area.

If the inventory management engine 168 identifies that a customer 102 has taken an object from a merchantable inventory area (e.g., using the customer pose identification and tracking engine 144 and/or the product/service pose identification and tracking engine 148), the inventory management engine 168 can automatically add an object identifier corresponding to the object into a personal inventory data structure associated with the customer 102. If the inventory management engine 168 identifies that a customer 102 has put an object back into a merchantable inventory area or otherwise removed the object from their possession (e.g., using the customer pose identification and tracking engine 144 and/or the product/service pose identification and tracking engine 148), the inventory management engine 168 can automatically remove an object identifier corresponding to the object from the personal inventory data structure associated with the customer 102. By the time the customer 102 wishes to check out and leave the BAM store area, the personal inventory data structure can identify one or more objects associated with products and/or services 112. In some examples, the customer 102 can approach a merchant device 108, such as a POS device. The inventory management engine 168 can automatically transmit the personal inventory data structure of the customer 102 to the merchant device 108. In some examples, the inventory management engine 168 maintains the personal inventory data structure of the customer 102, or a copy thereof, on the merchant device 108. A representative of the merchant 106 can review the personal inventory data structure through the merchant device 108 to verify that the personal inventory data structure is accurate and complete in its identification of the object and/or products and/or services 112 that the customer 102 is purchasing. In some examples, the merchant device 108 can be a self-checkout POS device. The customer 102 can review the personal inventory data structure through the merchant device 108 to verify that the personal inventory data structure is accurate and complete in its identification of the object and/or products and/or services 112 that the customer 102 is purchasing. Once the merchant device 108 receives verification of the personal inventory data structure from the representative of the merchant 106 and/or from the customer 102, the merchant device 108 can proceed with processing the purchase.

In some examples, if the customer pose identification and tracking engine 144 identifies that the customer 102 and/or the customer device 104 have exited the BAM store area (e.g., have exited the inner BAM store area, have exited the outer BAM store area, or both), the inventory management engine 168 can automatically process the purchase of the object and/or products and/or services 112 identified in the personal inventory data structure by the customer 102 and from the merchant. In some cases, the customer 102 may authorize the merchant and/or the inventory management engine 168 to automatically charge the customer 102 for purchase of object and/or products and/or services 112 identified in the personal inventory data structure upon exit of the BAM store area by the customer 102 and/or the customer device 104.

In some examples, a first BAM store area may include a second BAM store area. An example of this is illustrated in the store-within-store area 255 within the first inner BAM store area 240 of FIGS. 2G-2H. For instance, a grocery store may include a coffee shop inside the grocery store. In some cases, the first BAM store area and the second BAM store area may be run by separate merchants. In some examples, if a customer pose identification and tracking engine 144 (associated with the first BAM store are and/or the second BAM store area) identifies that the customer 102 and/or the customer device 104 have exited the second BAM store area, the inventory management engine 168 can automatically process any products and/or services 112 picked up by the customer 102 from the second BAM store area. In some examples, if the customer pose identification and tracking engine 144 (associated with the first BAM store are and/or the second BAM store area) identifies that the customer 102 and/or the customer device 104 have exited the first BAM store area, the inventory management engine 168 can automatically process any products and/or services 112 picked up by the customer 102 from the first BAM store area, the second BAM store area, or both. In some examples, purchases of products and/or services 112 from the first BAM store area can be processed separately from purchases of products and/or services 112 from the second BAM store area. Funds for the products and/or services 112 from the first BAM store area can be transferred to a first merchant associated with the first BAM store area. Funds for the products and/or services 112 from the second BAM store area can be transferred to a second merchant associated with the second BAM store area. In some examples, purchases of products and/or services 112 from the first BAM store area can be processed together with purchases of products and/or services 112 from the second BAM store area. For example, a personal inventory data structure (or "cart" data structure) for a customer 102 making the purchase(s) may be shared between a BAM store control system 100 associated with the first BAM store area and a BAM store control system 100 associated with the second BAM store area. In some examples, the BAM store control system 100 associated with the first BAM store area can transfer a personal inventory data structure (or "cart" data structure) for a customer 102 making the purchase(s) to a BAM store control system 100 associated with the second BAM store area. In some examples, the first BAM store area and the second BAM store area can share a BAM store control system 100. Funds for the products and/or services 112 from the first BAM store area and for the products and/or services 112 from the second BAM store area can both be transferred between the first merchant associated with the first BAM store area and the second merchant associated with the second BAM store area. For example, the first merchant can transfer at least some of the funds for the products and/or services 112 from the second BAM store area to the second merchant, for instance based on an agreement (e.g., a profit sharing agreement) between the first merchant and the second merchant. In some examples, the BAM store control system 100 can use smart contracts running on a distributed ledger 184 to automatically transfer funds from the first merchant to the second merchant or vice versa.

In some examples, multiple merchants may share a single BAM store area at different times. For example, a BAM store area can be a bakery during the day, and can become a "ghost" restaurant or "pop-up" restaurant at night. In some examples, the two merchants can share a BAM store control system 100. In some examples, the two merchants can use different BAM store control systems 100, but can share data, components, and/or elements as described in the previous paragraph with respect to the first BAM store area and the second BAM store area. In some examples, a first merchant that uses the BAM store area during a first time period can sell a product or service on behalf of a second merchant that uses the BAM store area during a second time period, and the BAM store control system(s) 100 can transfer funds from the first merchant to the second merchant in doing so. In the previously-noted example, "ghost" restaurant or "pop-up" restaurant can still sell bread baked by the bakery that operates in the same BAM store area on behalf of the bakery, and can pay the bakery when (or after) the bread is sold to a customer 102 by the restaurant.

In some examples, the first merchant and the second merchant can even use the same BAM store area during a shared time period. Which merchant controls a BAM store area, or a portion thereof, at any given time can be based on which customer 102 is in the BAM store area. In one illustrative example, a BAM store area can be shared among multiple barbers who operate independently as independent merchants, and that each have loyal customers. If a particular barber's loyal customer 102 enters the BAM store area, that barber (that merchant) can control that BAM store area (or a portion thereof) during the time that that customer 102 is in the BAM store area. In another illustrative example, a BAM store area can be shared among multiple merchants who operate independently as independent merchants and who perform different tasks. For example, the BAM store area can be shared by one merchant that runs a bakery and sells baked goods to-go from the BAM store area, another merchant that offers a sit-down restaurant in a corner of the BAM store area, another merchant that sells t-shirts and other merchandise out of the BAM store area, another merchant that offers accounting services out of the BAM store area, and another merchant that offers deliveries from a storeroom in the BAM store area. Any merchants that share a BAM store area, whether time-separated or not, can also share data, components, and/or elements as described above with respect to the first BAM store area and the second BAM store area.

In some examples, data from (or otherwise associated with) sensors 124, local wireless transceivers 126, web interfaces 128, software application interfaces 130, glyphs 132, BAM store area devices 110, and/or chat bots 134 may be shared between a BAM store control system 100 associated with the first BAM store area and a BAM store control system 100 associated with the second BAM store area. For example, camera data from a camera (of the sensors 124) may be shared between a BAM store control system 100 associated with the first BAM store area and a BAM store control system 100 associated with the second BAM store area if the field of view of the camera includes one or more areas within (and/or proximate to) both the first BAM store area and the second BAM store area. Similarly, wireless transceiver data from a wireless transceiver 126 can be shared between a BAM store control system 100 associated with the first BAM store area and a BAM store control system 100 associated with the second BAM store area if the range of the wireless transceiver 126 reaches into (and/or proximate to) both the first BAM store area and the second BAM store area. In some examples, the first BAM store area and the second BAM store area may function as described above, with transactions being processed together, transfers of funds made, and/or devices in the interface layer 120 shared, if the second BAM store area is entirely separate from the first BAM store area. For instance, the first BAM store area and the second BAM store area may function as described above if the first BAM store area and the second BAM store area are neighboring BAM store areas, as in the first inner BAM store area 240 and second inner BAM store area 250 of FIGS. 2G-2H.

In some examples, the inventory management engine 168 can also identify and track personal inventories for representatives of merchants 106. For instance, if the inventory management engine 168 identifies that a representative of a merchant 106 has taken an object from a merchantable inventory area (e.g., using the merchant pose identification and tracking engine 146 and/or the product/service pose identification and tracking engine 148), the inventory management engine 168 can automatically add an object identifier corresponding to the object into a personal inventory data structure associated with the representative of the merchant 106. If the inventory management engine 168 identifies that the representative of the merchant 106 has added an object into a merchantable inventory area or otherwise removed the object from their possession (e.g., using the merchant pose identification and tracking engine 146 and/or the product/service pose identification and tracking engine 148), the inventory management engine 168 can automatically remove an object identifier corresponding to the object from the personal inventory data structure associated with the representative of the merchant 106. Personal inventory data structures for representatives of merchants 106 can be used to keep a thorough chain of custody of where different objects associated with products or services 112 are at any given time. In some cases, chain of custody of where different objects associated with products or services 112 are at any given time can be tracked in a distributed ledger 184.

In some examples, the inventory management engine 168 can also identify and track objects other than products or services 112 that are in, that are added to, and/or that leave the personal inventories of individuals (e.g., customers 102 and/or of representatives of merchants 106). For example, the inventory management engine 168 can also identify and track an individual's personal wallet, purse, glasses, sunglasses, hat, headband, hairpiece, jacket, sweater, scarf, clothing object, shoes, watch, jewelry, phone, mobile handset, tablet, laptop, ebook reader, audiobook player, media player device, book, portable gaming console, fitness tracker, watch, wearable device, camera, keys, backpack, lunchbox, headphones, passport, identification, badge, water bottle, coffee cup, beverage object, food object, face mask, gloves, mittens, pen, pencil, stationary item, checkbook, notebook, or other object. For example, the inventory management engine 168 can identify when an individual has left an object within a BAM store area and then left the BAM store area (and/or the vicinity of the object) without the object. The inventory management engine 168 can identify the object and automatically store an identifier of the object, in some cases along with an identifier of the individual that left the object, in a lost-and-found data structure. In some cases, the inventory management engine 168 can automatically send an alert to the individual to notify the individual that they have left their object behind, for example sending the alert to a device of the individual (e.g., customer device 104 or merchant device 108), sending the alert to a device of a nearby individual (e.g., customer device 104 or merchant device 108) who is near the individual (e.g., a representative of the merchant 106 who is near a customer 102 who has lost an object), a BOM store area device 110 that is near the individual (which may display or otherwise output an alert indicating to the individual that they have left the object behind), or a combination thereof. The inventory management engine 168 can identify the object, and movement of the object relative to the individual, using the customer pose identification and tracking engine 144, the merchant pose identification and tracking engine 146, and/or the product/service pose identification and tracking engine 148. The inventory management engine 168 can automatically remove an object identifier corresponding to the object from the lost-and-found data structure once the inventory management engine 168 identifies that the individual has picked up the object. The inventory management engine 168 can automatically add the object identifier corresponding to the object to the personal inventory data structure associated with the individual once the inventory management engine 168 identifies that the individual has picked up the object. Like the personal inventory data structures, the lost-and-found data structure can be used to keep a thorough chain of custody of where different objects are at any given time. In some cases, chain of custody of where different objects can be tracked in a distributed ledger 184.

In some examples, the inventory management engine 168 can also modify prices of products and/or services 112 dynamically, for example based on supply and demand and/or using the AI platform 196. In some cases, electronic price displays, for example using e-ink displays, can be used rather than paper price tags. The prices can change automatically as displayed on the price tags and within databases and/or other records kept by the inventory management engine 168 for pricing of products and/or services 112. The inventory management engine 168 can also automatically adjust electronic price displays when products are rearranged or moved. For instance, if the merchant decides to move a certain product from a first merchantable inventory area (e.g., a first shelf) to a second merchantable inventory area (e.g., a second shelf), the inventory management engine 168 can also automatically adjust electronic price displays at the second merchantable inventory area to reflect the prices for that moved product rather than the prices for another product that was previously at the second merchantable inventory area.

The application layer 130 may include a scheduling management engine 170. The scheduling management engine 170 can manage merchant representative work schedules, merchant representative shift schedules, inventory replenishment schedules, supply chain schedules, distribution schedules, or combinations thereof. In some examples, the scheduling management engine 170 can generate an inventory replenishment schedule based on an analysis of the merchantable inventory in the merchantable inventory area as tracked by the inventory management engine 168. The scheduling management engine 170 can use the AI platform 196 to generate the inventory replenishment schedule. For example, the scheduling management engine 170 can predict, based on an average, median, minimum, maximum, or other rate of inventory change, that inventory will run out on a certain day at a certain time, and can set the inventory replenishment schedule to replenish the inventory a predetermined period of time before the inventory is predicted to run out. Inventory replenishment schedules can also take into account times when a BAM store area is more busy and less busy, so that inventory replenishment can be scheduled during less busy times when more representatives of merchants 106 are likely to be available to help and fewer customers 102 are likely to interrupt or impede the replenishment process. Inventory replenishment schedules can refer to replenishing the inventory of a product or service 112 that is in a particular merchantable inventory area, such as a particular shelving unit. Such replenishing may replenish from a storeroom elsewhere in the BAM store area in some cases. This type of inventory replenishment schedule can task a representative of a merchant to replenish a particular product from the storeroom to a particular shelf, for example. Inventory replenishment schedules can refer to replenishing the inventory of a product or service 112 in the entire BAM store area, from an external distributor or supplier. This type of inventory replenishment schedule can be shared between the merchant corresponding to the BAM store area and a supplier or distributor for the merchant that supplies the merchant and the BAM store area with a particular product or service 112.

In some examples, the scheduling management engine 170 can generate and/or adjust an inventory replenishment schedule based on indications of future behavior from one or more customers 102 and/or customer devices 104. For example, in some cases, the scheduling management engine 170 can access one or more shopping lists via one or more customer devices 104. Based on the shopping lists, the scheduling management engine 170 can determine that one or more customers 102 are likely to buy a specific product or service 112 soon, and can adjust an inventory replenishment schedule to replenish the inventory of that product or service 112 sooner. On the other hand, if no or few customers 102 have another product or service 112 in their shopping lists, the scheduling management engine 170 can adjust an inventory replenishment schedule to replenish the inventory of that product or service 112 later. Similarly, the scheduling management engine 170 can generate and/or adjust an inventory replenishment schedule based on a customer 102 having a scheduled appointment to shop with a particular merchant and/or at a particular BAM store area. Even if the scheduling management engine 170 does not have access to a shopping list, if the scheduling management engine 170 knows that a particular customer 102—Bob Smith—has an appointment in his calendar to go shopping in the BAM store area on a particular date and/or at a particular time, the scheduling management engine 170 can ensure that the products and/or services 112 that that customer 102 buys most often from that BAM store area are replenished by the time the customer 102's appointment comes up.

In some examples, scheduling management engine 170 can provide automated inventory replenishment. This way, inventory of products and services 112 is efficiently and automatically replenished before the inventory runs out. The scheduling management engine 170 can also optimize work shift timing for representatives of merchants 106, for example based on preference or need information identified by the merchant preferences and needs identification and tracking engine 158. For example, representatives of merchants 106 use an interface to the scheduling management engine 170 to negotiate shifts. In some cases, busy or hard-to-fill shifts can pay higher or count as "time and a half."

In some examples, the scheduling management engine 170 can create, set, adjust, and/or cancel appointments and/or reservations for customers 102 with one or more merchants and/or at one or more BAM store areas. In some examples, the scheduling management engine 170 can create, set, adjust, and/or cancel appointments and/or reservations for customers 102 with one or more merchants and/or at one or more BAM store areas. The scheduling management engine 170 can receive requests from customers 102, customer devices 104, representatives of merchants 106 (e.g., that have spoken with customers 102), merchant devices 108 (e.g., of representatives of merchants 106 that have spoken with customers 102). The reservations and/or appointments can include, for example, restaurant reservations, hotel stay reservations, shopping reservations (e.g., for a personalized shopping assisted by a representative of the merchant 106), rental car pickup or dropoff appointments, dental appointments, medical appointments, flight appointments, train appointments, entertainment appointments (e.g., a movie ticket for a movie, a concert ticket for a concert), haircut appointments, hair styling appointments, device repair appointments, device maintenance appointments, device training/tutorial appointments, device setup appointments, or combinations thereof. The reservations and/or appointments can be part of the schedules generated by the scheduling management engine 170. The scheduling management engine 170 can, in some cases, automatically schedule the reservations and/or appointments based on detection of certain conditions, such as detection of an issue with customer's device that requires repair.

In some examples, the scheduling management engine 170 can automatically generate and provide schedules allowing multiple merchants to share a single BAM store area. For example the scheduling management engine 170 can automatically generate and provide schedules for different merchants to use the BAM store area at different times. For instance, a BAM store area can be a bakery during the day, and can become a "ghost" restaurant or "pop-up" restaurant at night. The scheduling management engine 170 can automatically allow multiple merchants to share a single BAM store area for any type of merchant—restaurants, grocery stores, retailers, services, any other merchant type identified herein, any other merchant type having a merchant category classification/code (MCC), and so forth. In some examples, the scheduling management engine 170 can automatically generate and provide schedules based on time of day and/or day of the week. In some examples, the scheduling management engine 170 can automatically generate and provide schedules based on delivery versus walk-in traffic. In some examples, the scheduling management engine 170 can automatically generate and provide schedules based on when different merchants are most popular, for example based on history information in the merchant history tracking engine 162 and/or customer tracking information from the customer pose identification and tracking engine 144.

In some cases, the scheduling management engine 170 can generate schedules for, and provide access to the schedules to, multiple BAM store areas and/or merchants. Where multiple merchants share a single BAM store area at different times, the scheduling management engine 170 can generate schedules for, and provide access to the schedules to, each of the one or more BAM store control systems 100 associated with the multiple merchants, for instance based on the times of day and days of the week during which those merchants have access to the BAM store area. Where a merchant has multiple branches associated with different BAM store areas, the scheduling management engine 170 can generate schedules for, and provide access to the schedules to, each of the one or more BAM store control systems 100 associated with the different branches and/or BAM store areas, for instance based on the locations of the different branches and/or BAM store areas. Where a BAM store area has another BAM store area within it (e.g., the store-within-store area 255 of FIG. 2H), the scheduling management engine 170 can generate schedules for, and provide access to the schedules to, each of the one or more BAM store control systems 100 associated with the two BAM store areas. Where a first BAM store area neighbors (e.g., is adjacent to) a second BAM store area (e.g., the first inner BAM store area 240 and the second inner BAM store area 250 of FIGS. 2G-2H), the scheduling management engine 170 can generate schedules for, and provide access to the schedules to, each of the one or more BAM store control systems 100 associated with the two BAM store areas.

The application layer 130 may include a supply chain management engine 172. The supply chain management engine 172 can contact suppliers, distributors, and/or manufacturers based on inventory replenishment schedules set by the scheduling management engine 170. In some cases, the supply chain management engine 172 can generate supply chain schedules for suppliers, distributors, and/or manufacturers based on inventory replenishment schedules set by the scheduling management engine 170. The supply chain management engine 172 generating supply chain schedules for suppliers, distributors, and/or manufacturers can help suppliers, distributors, and/or manufacturers anticipate merchant needs and optimize how much is stored in warehouses at any given time. The supply chain management engine 172 can use the AI platform 196 to generate the supply chain schedule, for example, with the inventory data over time from the inventory management engine 168 as an input.

In some cases, objects associated with products and/or services 112 may be tracked along the supply chain using a distributed ledger 184. For example, at each stop along a shipping route, and/or each time the object changes ownership, the supply chain management engine 172 can add a new entry can be added to the payload of one or more blocks of the distributed ledger 184.

In some examples, pallets, containers, and/or other bulk shipping units that carry many objects associated with product and/or services 112 can include glyphs 132, RFID tags, NFC tags, or other local wireless transceivers 126. Such glyphs 132 or local wireless transceivers 126 can be scanned for the supply chain management engine 172 to automatically track the product and/or services 112 carried by the pallets, containers, or bulk shipping units along the path, and/or to automatically identify the contents of a pallet, container, or bulk shipping unit. In some cases, each object in a pallet, container, or bulk shipping unit may include or be tagged with a local wireless transceiver 126. The supply chain management engine 172 can, in some cases, automatically identify how many of an object are stored in pallet, container, or bulk shipping unit based on a number of signals detectable from the local wireless transceivers 126 of the pallet, container, or bulk shipping unit.

In some examples, the supply chain management engine 172 can be used to interlink inventories between different merchants and/or different BAM store areas. For example, merchants and/or BAM store areas that are part of a joint program can become partners and reciprocally make their inventory transparent so that they can take care of each other's fulfillment and/or product replenishment as needed. When a customer 102 places an order in a partner's online shop, the supply chain management engine 172 can determine the closest, fastest, and/or least expensive possible distribution point. If one merchant's store is out of stock of an item, that merchant can replenish from another nearby merchant rather than waiting for replenishment from a faraway warehouse, distributor, manufacturer, or other supplier. In some examples, the supply chain management engine 172 can use smart contracts running on a distributed ledger 184 to automatically pay merchant partners who provide overstock, replenishment, or otherwise provide a product or service 112 to a customer on behalf of another merchant or BAM store area.

The application layer 130 may include a training management engine 174. The training management engine 174 can be used to train representatives of the merchant 106. The training management engine 174 can automatically train the representatives of the merchant 106 based on any of the recommendations discussed above. The training management engine 174 can automatically train the representatives of the merchant 106 based on inventory management using the inventory management engine 168. The training management engine 174 can automatically train the representatives of the merchant 106 based on schedule management using the scheduling management engine 170. The training management engine 174 can automatically train the representatives of the merchant 106 based on supply chain management using the supply chain management engine 172.

The training management engine 174 can automatically train the representatives of the merchant 106 to do a variety of tasks based on data from the BAM store control system 100, such as data indicating where customers 102 go and what customers 102 look at. The tasks that the training management engine 174 can automatically train the representatives of the merchant 106 to do can include training for stocking store shelves, for instance by checking shelves, replenish supplies of any products that are running low, rearranging products according to guidelines, replacing price labels, and the like. The tasks that the training management engine 174 can automatically train the representatives of the merchant 106 to do can include training for creating and maintaining merchandising displays, including arranging products and identifying promotional offers. The tasks that the training management engine 174 can automatically train the representatives of the merchant 106 to do can include training for providing customer assistance, including assisting customers in making purchasing decisions, demonstrating products, giving customers advice on the most suitable products for their needs, helping locate products, helping explain product features, and the like.

The tasks that the training management engine 174 can automatically train the representatives of the merchant 106 to do can include customer checkout assistance, including assisting customers with processing payments, identifying products or services 112 to be purchased by the customers 102, scanning objects associated with products or services 112 to be purchased by the customers 102, weighing objects associated with products or services 112 to be purchased by the customers 102, arranging for delivery of objects associated with products or services 112, and the like. The tasks that the training management engine 174 can automatically train the representatives of the merchant 106 to do can include customer service and education, including arranging for delivery of objects associated with products or services 112, dealing with customers 102 that want to return or exchange objects associated with products or services 112, applying company terms and conditions to products or services 112, dealing with customer 102's warranty claims, providing customer education to customers 102, educating customers 102 regarding how to use the products and services 112, and the like. The tasks that the training management engine 174 can automatically train the representatives of the merchant 106 to do can include facilitating store operations, including opening and/or unlocking the store, closing and/or locking the store, putting up signage without and/or outside of the store, scheduling and/or supervising deliveries to the store, dealing with suppliers of products and/or services 112 to the store, organizing the stockroom, keeping keys to the store and/or to secure areas safe, and the like.

Training can include onboarding, which can begin automatically for new hires of representatives of a merchant 106. Onboarding can begin automatically in response to generation of a new personnel record for a newly hired representative of a merchant 106. Onboarding can include training for basic tasks and merchant-specific guidelines. Training can include discoverable training, which can be triggered for a particular representative of a merchant 106 based on detection of the particular representative of a merchant 106 in a specific area, performing a specific task, or both, for instance based on the merchant pose identification and tracking engine 146. For instance, detection of a representative of a merchant 106 near a broken merchandising display or device can initiate training for repairing the broken merchandising display or device. Training can be learnable by a machine learning system of the training management engine 174. The machine learning system of the training management engine 174 may include an AI platform 196, and may learn using the learning management engine 178. The machine learning system of the training management engine 174 may learn to train representatives of the merchant 106 based on training data tracking how already-trained representatives of the merchant 106 perform certain tasks (e.g., using the merchant pose identification and tracking engine 146), such as the tasks listed above.

In some examples, the training management engine 174 and/or the scheduling management engine 170 can collaborate to perform automatic shift scheduling and/or team management in response to certain conditions. For example, the training management engine 174 and/or the scheduling management engine 170 can automatically schedule paid time during work hours and/or after work hours for a representative of the merchant 106 to train with the BAM store control system 100. The training management engine 174 and/or the scheduling management engine 170 can automatically interface with the representative of the merchant 106 merchant device 102 (e.g., in-store device or personal device) to schedule trainings and/or other work tasks. For example, the training management engine 174 and/or the scheduling management engine 170 can automatically schedule to pay a new representative of the merchant 106 if the representative of the merchant 106 runs through a particular training (e.g., on POS transaction flows) on the personal device of the representative of the merchant 106 before the representative of the merchant 106's first day on the job.

In some examples, the training management engine 174 and/or the scheduling management engine 170 can schedule when certain representatives of the merchant 106 can use certain merchant devices, for training or other purposes. For instance, the training management engine 174 and/or the scheduling management engine 170 can identify that a specific merchant device 108 (e.g., a POS device) is available for a certain period of time, and can automatically schedule training of one or more representatives of one or more merchants 106 associated with one or more BAM store areas using that specific merchant device 108 during that available period of time.

The application layer 130 may include a sensor and device onboarding engine 176. The sensor and device onboarding engine 176 can be used by representatives of merchants 106 to set up devices and connect the devices to the BAM store control system 100, for instance through the interface layer 120. The devices that the sensor and device onboarding engine 176 can help onboard can include sensors 126, local wireless transceivers 126, merchant devices 108, BAM store area devices 110, local servers 188, remote servers 190, and/or other devices and systems discussed herein. In some examples, a representative of a merchant 106 may take a picture of a new device to be onboarded, or may scan a glyph 132 on the new device to be onboarded, and the BAM store control system 100 can automatically onboard the new device and/or instruct the representative of a merchant 106 as to any information that the BAM store control system 100 requires to onboard the new device.

The application layer 130 may include a learning management engine 178. The learning management engine 178 can train one or more machine learning models of the AI platform 196 based on one or more machine learning algorithms. The machine learning algorithms may include convolutional neural networks (CNNs), neural networks (NNs), support vector machines (SVMs), other machine learning algorithms, or combinations thereof.

Figure 6:
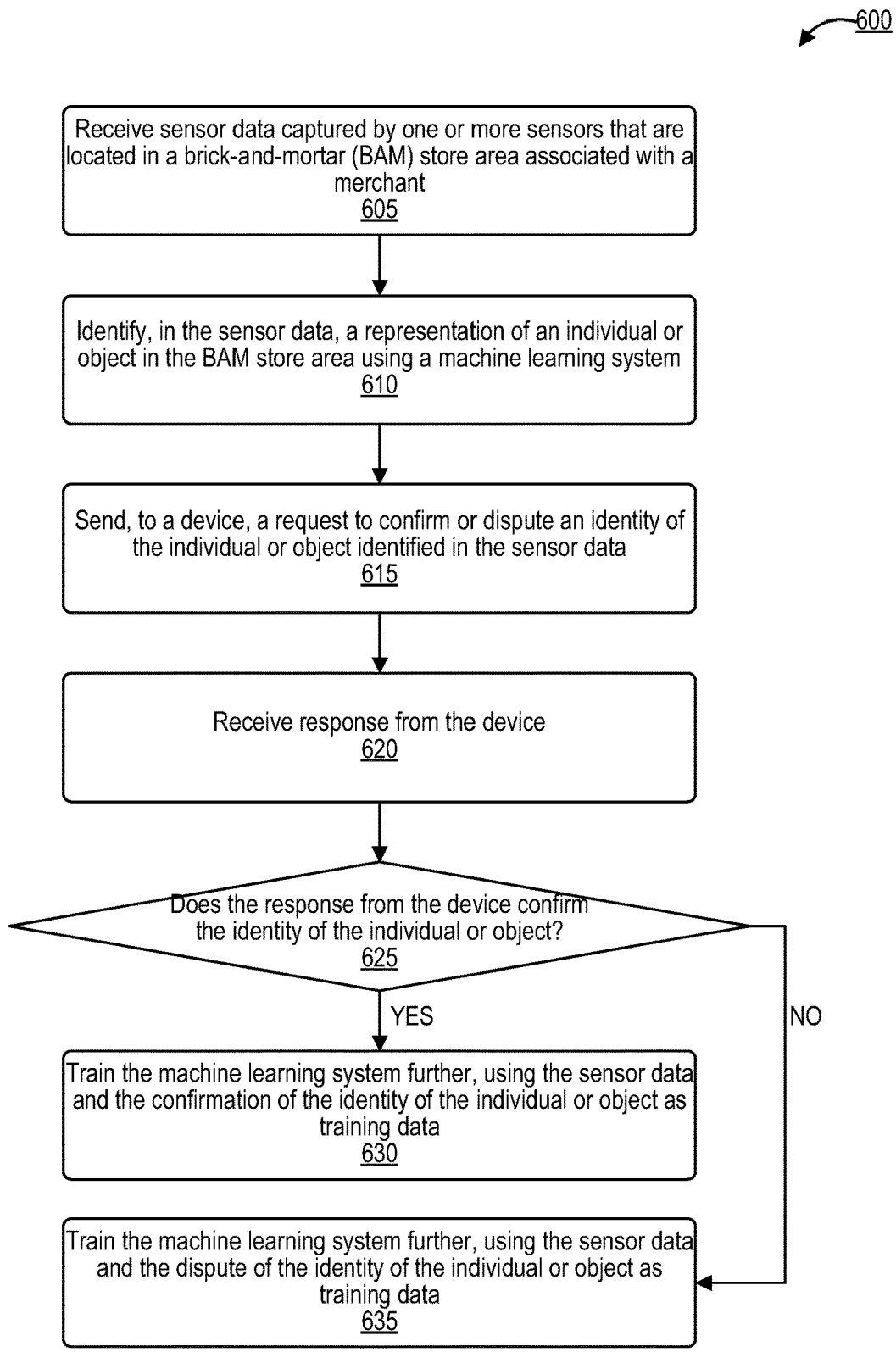
FIG. 6 is a flow diagram illustrating operations for training a machine learning system based on feedback.

In some examples, the learning management engine 178 can request confirmation or disputation from a representative of the merchant 106 as to whether a determination made using the AI platform 196 was accurate, and can use the confirmation or disputation as training data to the further train the AI platform 196. An example of such learning operations is illustrated in FIG. 6. In some cases, the learning management engine 178 can identify actions performed by representatives of merchants 106, and how the representatives of the merchants 106 perform those actions, using the merchant pose identification and tracking engine 146. The learning management engine 178 can generate trainings for the training management engine 174 based on the identification of the actions performed by the representatives of the merchants 106, and how the representatives of the merchants 106 perform those actions. The actions can include any of the actions described above for which the training management engine 174 can have trainings.

In some examples, the application layer 140 may include an API 142 that can trigger performance of an operation by the application layer 140 in response to being called by the interface layer 110, the infrastructure layer 180, the user device 105, the above-described web server associated with the web interface 128, another computing system 1300 that is remote from the BAM store control system 100, or another device or system described herein. The API 142 can define standardized protocol-based messaging and structure(s) for request and response messages to and/or from the application layer 140. Any of the operations described herein as performed by the application layer 140 may be performed in response to a call of the API 142 by one of the devices or systems listed above. For example, a call of the API 142 can trigger an operation to be performed by and/or performed at the customer pose identification and tracking engine 144, the merchant pose identification and tracking engine 146, the product/service pose identification and tracking engine 148, the spatial mapping engine 150, the customer identifier and account management engine 152, the merchant identifier and account management engine 154, the customer preferences and needs identification and tracking engine 156, the merchant preferences and needs identification and tracking engine 158, the customer history tracking engine 160, the merchant history tracking engine 162, the customer experience customization engine 164, the merchant experience customization engine 166, the inventory management engine 168, the scheduling management engine 170, the supply chain management engine 172, the training management engine 174, the sensor and device onboarding engine 176, the learning management engine 176, or a combination thereof.

In some examples, a merchant may have multiple branches (e.g., multiple BAM store areas). For example, a merchant may be a chain store, such as a grocery chain, a restaurant chain, a retail chain, a toy store chain, a big box store chain, an outlet store chain, a warehouse store chain, a franchise store, or combinations thereof. In some examples, some of the branches may be associated with the same branding, which may be owned by or licensed by the merchant. In some examples, some of the branches may be associated with different branding that are nonetheless owned by or licensed by the same merchant. In some examples, some of the branches may be associated with different branding that may be owned by or licensed by different merchants that have a partnership relationship or otherwise work together and/or share data. In some examples, a merchant with multiple branches may have a single centralized BAM store control system 100 that manages multiple branches. In some examples, a merchant with multiple branches may have separate BAM store control systems 100 that each manage one or more of the multiple branches, but that share data amongst one another.

Data may be shared among BAM store control systems 100 associated with multiple merchants and/or multiple BAM store areas for a variety of reasons and under a variety of situations. Where multiple merchants share a single BAM store area at different times, data may be shared between the one or more BAM store control systems 100 associated with the multiple merchants. Where a merchant has multiple branches associated with different BAM store areas, data may be shared between the one or more BAM store control systems 100 associated with the different branches and/or BAM store areas. Where a BAM store area has another BAM store area within it (e.g., the store-within-store area 255 of FIG. 2H), data may be shared the one or more BAM store control systems 100 associated with the two BAM store areas. Where a first BAM store area neighbors (e.g., is adjacent to) a second BAM store area (e.g., the first inner BAM store area 240 and the second inner BAM store area 250 of FIGS. 2G-2H), data may be shared between the one or more BAM store control systems 100 associated with the two BAM store areas.

The shared data can include data received through the interface layer 120, such as sensor data captured by sensors 124, wireless signal data from the wireless transceivers 126, web interface data from the web interface 128, software application data from the software application interface 130, glyph data associated with scanning of the glyphs 132, and/or chat bot data associated with the chat bots 134. The shared data can include data generated by and/or stored using the application layer 140 and/or the infrastructure layer 180, such as customer pose data associated with the customer pose identification and tracking engine 144, merchant pose data associated with the merchant pose identification and tracking engine 146, product/service pose data associated with the product/service pose identification and tracking engine 148, spatial mapping data associated with the spatial mapping engine 150, customer identifier data and/or customer account data associated with the customer identifier and account management engine 152, merchant identifier data and/or merchant account data associated with the merchant identifier and account management engine 154, customer preferences and/or needs data associated with the customer preferences and needs identification and tracking engine 156, merchant preferences and/or needs data associated with the merchant preferences and needs identification and tracking engine 158, customer history data associated with the customer history tracking engine 160, merchant history data associated with the merchant history tracking engine 162, customer experience customization data associated with the customer experience customization engine 164, merchant experience customization data associated with the merchant experience customization engine 166, inventory data associated with the inventory management engine 168, schedule data associated with the scheduling management engine 170, supply chain data associated with the supply chain management engine 172, representative training data associated with the training management engine 174, sensor data and/or device data and/or onboarding data associated with the sensor and device onboarding engine 176, machine learning training data and/or machine learning models and/or other machine learning data associated with the learning management engine 176, data stored in or to be stored in the distributed ledger(s) 184, data stored in or to be stored in the data structure(s) 186, data stored in or generated by the local server(s) 188, data stored in or generated by the remote server(s) 190, data stored by or generated by the account management platform 192, data sent or received over the connection 194 with one or more transaction institutions or financial institutions, machine learning training data and/or machine learning models and/ or other machine learning data associated with the AI platform(s) 196, or combinations thereof.

In some examples, multiple merchants and/or multiple BAM store areas may share certain elements, components, aspects, or subsets of BAM store control systems 100 for a variety of reasons and under a variety of situations. A merchant with multiple branches may have separate BAM store control systems 100 that each manage one or more of the multiple branches, but that share certain elements, components, aspects, or subsets. Multiple merchants that share a single BAM store area at different times may have separate BAM store control systems 100 that each manage one or more of the multiple branches, but that share certain elements, components, aspects, or subsets. Two BAM store areas where one BAM store area has another BAM store area within it (e.g., the store-within-store area 255 of FIG. 2H) may have separate BAM store control systems 100 that each manage one or more of the multiple branches, but that share certain elements, components, aspects, or subsets. Two BAM store areas that neighbor one another (e.g., are adjacent to one another) (e.g., the first inner BAM store area 240 and the second inner BAM store area 250 of FIGS. 2G-2H) may have separate BAM store control systems 100 that each manage one or more of the multiple branches, but that share certain elements, components, aspects, or subsets.

For example, the separate BAM store control systems 100 can share the distributed ledger 184, the data structure(s) 186, the local server(s) 188, the remote server(s) 190, the account management platform 192, the connection 194 with one or more transaction institutions or financial institutions, the AI platform(s) 196, the customer pose identification and tracking engine 144, the merchant pose identification and tracking engine 146, the product/service pose identification and tracking engine 148, the spatial mapping engine 150, the customer identifier and account management engine 152, the merchant identifier and account management engine 154, the customer preferences and needs identification and tracking engine 156, the merchant preferences and needs identification and tracking engine 158, the customer history tracking engine 160, the merchant history tracking engine 162, the customer experience customization engine 164, the merchant experience customization engine 166, the inventory management engine 168, the scheduling management engine 170, the supply chain management engine 172, the training management engine 174, the sensor and device onboarding engine 176, the learning management engine 176, the sensors 124, the local wireless transceivers 126, the web interfaces 128, the software application interfaces 130, the glyphs 132, the BAM store area devices 110, the chat bots 134, or a combination thereof.

In some example, a BAM store control system 100 for one or more merchants and/or BAM store areas can set up limitations or restrictions on sharing of certain data, elements, components, aspects, or subsets of the BAM control system 100 with one or more BAM store control systems 100 associated with one or more different merchants and/or BAM store areas. For example, certain merchants and/or BAM store areas can limit or restrict another merchant and/or BAM store area's access to certain data, elements, components, aspects, or subsets of the BAM control system 100 for a maximum threshold period of time (e.g., can only use for 12 hours), to a limited or restricted set of uses (e.g., can only use to identify customers' identities but not customer purchase histories or payment information), to a limited or restricted format (e.g., can only use in anonymized, hashed, tokenized, and/or encrypted format), or a combination thereof. In some examples, certain merchants and/or BAM store areas can limit or restrict another merchant and/or BAM store area's access to certain data, elements, components, aspects, or subsets of the BAM store control system 100 on a per-merchant basis, a per-BAM-store-area basis, a per-merchant-type basis (e.g., to enact more stringent limitations or restrictions to access for merchants of the same or similar merchant type and/or that may be competitors), on a per-region basis, or globally. In some examples, one or more BAM store control system 100 can handle conflicts (e.g., by deconflicting) between requests and responses regarding sharing of certain data, elements, components, aspects, or subsets of the BAM control system 100 between one or more BAM store control systems 100 associated with one or more different merchants and/or BAM store areas. For example, a BAM store control system 100 associated with a first merchant may request access to a dataset (e.g., camera data) from another BAM store control system 100 associated with a second merchant, but may receive in response a more limited or restricted dataset (e.g., anonymized or censored camera data) by respecting the wishes of the second merchant not to share the full dataset (e.g., because the first merchant and the second merchant are competitors and/or the second merchant does not trust the first merchant). In some examples, one or more BAM store control system 100 can handle ambiguities (e.g., by disambiguating) between requests and responses regarding sharing of certain data, elements, components, aspects, or subsets of the BAM control system 100 between one or more BAM store control systems 100 associated with one or more different merchants and/or BAM store areas. For example, a BAM store control system 100 associated with a first merchant may send funds for a purchase made by the first merchant on behalf of a second merchant to another BAM store control system 100 associated with the second merchant, and the BAM store control system 100 associated with the second merchant may automatically request clarifying information from the BAM store control system 100 associated with the first merchant on what the first merchant sold on behalf of the second merchant, if that is ambiguous.

In some examples, the web interface 128 and/or software application interface 130 can include intelligent interfaces such as search engines, automated assistants (e.g., Apple® Siri®, Amazon® Alexa®, Google® OK Google®), natural language processing interfaces, and/or chat bots 134 that may receive queries or requests from customers 102 and/or representatives of merchants 106. Such intelligence interfaces may receive queries or requests through the customer device 104, the merchant device 108, and/or the BAM store area device 110. Queries made using the intelligent interfaces can be pushed from the customer device 104, the merchant device 108, and/or the BAM store area device 110 to the BAM store control system 100 to answer the queries, for instance based on data collected by and/or generated by the BAM store control system 100, and/or additional requests to representatives of merchants 106 and/or merchant devices 108 and/or BAM store area devices 110 and/or sensors 124 and/or local wireless transceivers 126 and/or chat bots 134 and/or other parts of the BAM store control system 100 for the data. Requests made using the intelligent interfaces can be pushed from the customer device 104, the merchant device 108, and/or the BAM store area device 110 to the BAM store control system 100 to fulfill the requests, for instance by requesting that one or more representatives of merchants 106 and/or merchant devices 108 and/or BAM store area devices 110 perform one or more actions that fulfill the requests. In an illustrative example, a customer 102 can ask a query of an intelligent interface about a product or service 112 in a BAM store area of a merchant, for instance asking what the quantity of the product or service 112 is in stock in the BAM store area. The intelligent interface can transfer the query over to the BAM store control system 100. If the BAM store control system 100 can answer the query with the data it already has, then the BAM store control system 100 can provide the answer to the query to the intelligent interface to provide to the customer 102. If the BAM store control system 100 cannot answer the query with the data it already has, or has a lower-than-threshold confidence level in an answer to the query that the BAM store control system 100 can provide with the data it already has, then the BAM store control system 100 can send the query (or a subsidiary query for just the information that the BAM store control system 100 is missing to answer the query with confidence) to a merchant device 108 and/or a BAM store area device 110 so that a representative of the merchant 106 can provide a response to the query and/or to the subsidiary query. In some examples, the BAM store control system 100 can send the query (or a subsidiary query) to a merchant device 108 and/or a BAM store area device 110 within a threshold distance of the customer 102, of the customer device 104, of any products or services 112 that the query concerns, of any other aspect of the BAM store area that the query concerns, or a combination thereof. In some cases, queries or requests can also be heard and/or recorded over sensors 124, such as microphones or video cameras that include microphones, that are within the BAM store area. For example, a customer 102 or representative of a merchant 106 can ask a query or make a request of a microphone-including sensor 124 or BAM store area device 110 having a microphone in the BAM store area, such as sensor 215D.

Figure 2A:
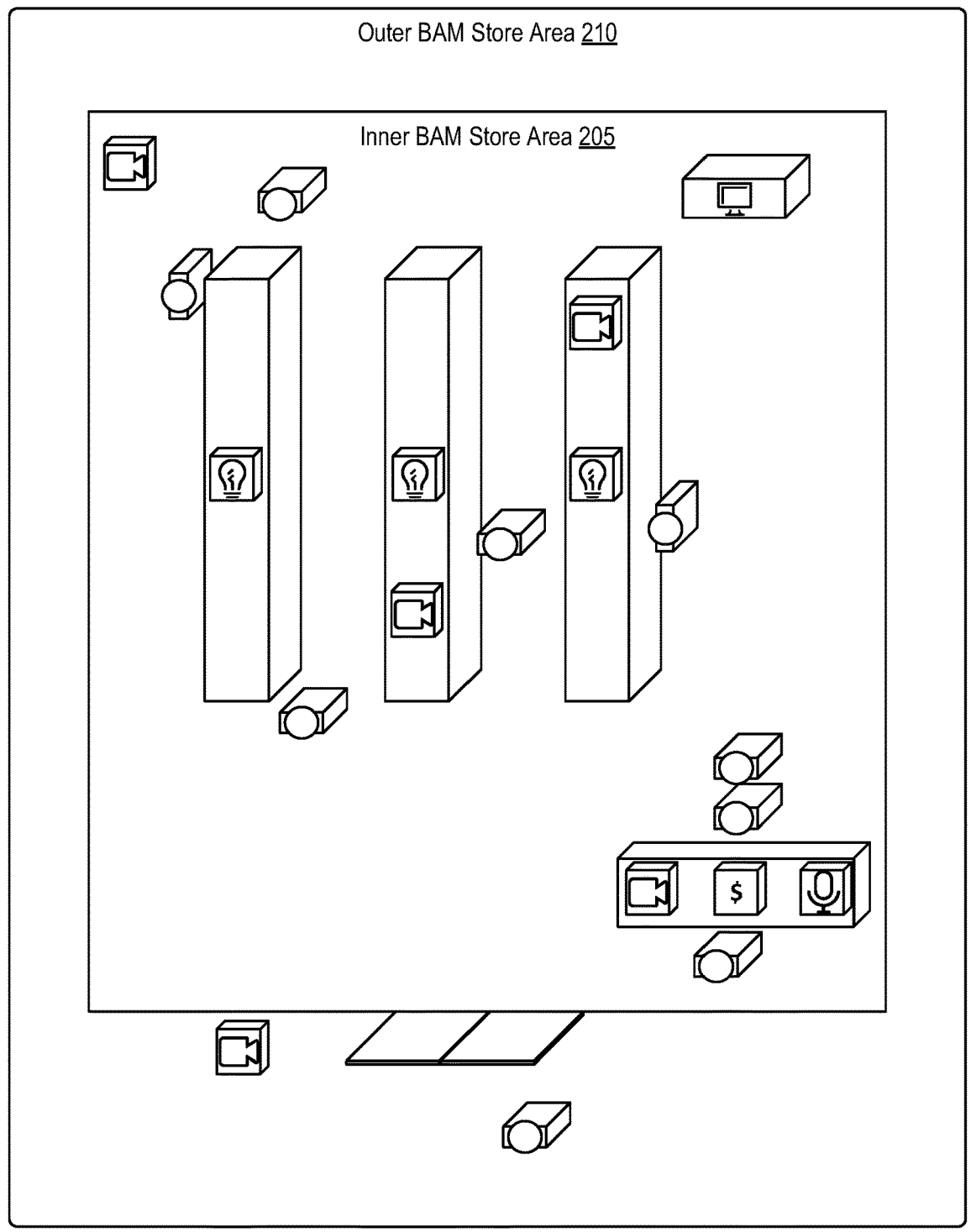
FIG. 2A is a conceptual diagram illustrating a representation of a first example brick and mortar (BAM) store area.

FIG. 2A is a conceptual diagram 200A illustrating a representation of a first example BAM store area. The first example BAM store area of FIG. 2A includes an inner BAM store area 205, which corresponds to an interior of a store. The first example BAM store area of FIG. 2A includes an outer BAM store area 210, which represents an area that is outside of, but still related to, an inner BAM store area 205. The outer retail 210 area may include, for example, a sidewalk adjacent to the inner BAM store area 205, a parking lot adjacent to the inner BAM store area 205, a parking lot for the inner BAM store area 205, a parking garage adjacent to the inner BAM store area 205, a parking garage for the inner BAM store area 205, a street adjacent to the inner BAM store area 205, a hallway adjacent to the inner BAM store area 205 (e.g., if the inner BAM store area 205 is within a shopping mall or other larger indoor structure), a queue area in which a queue can form to enter the inner BAM store area 205, an area in which sensors 124 (e.g., cameras) associated with the inner BAM store area 205 can see or otherwise sense, an area in which a range of one or more local wireless transceivers 126 associated with the inner BAM store area 205 reaches, or a combination thereof. The inner BAM store area 205 of FIG. 2A includes shelving units with various products set up thereon, and a checkout counter where customers line up to purchase products taken from the shelving units.

Figure 2B:
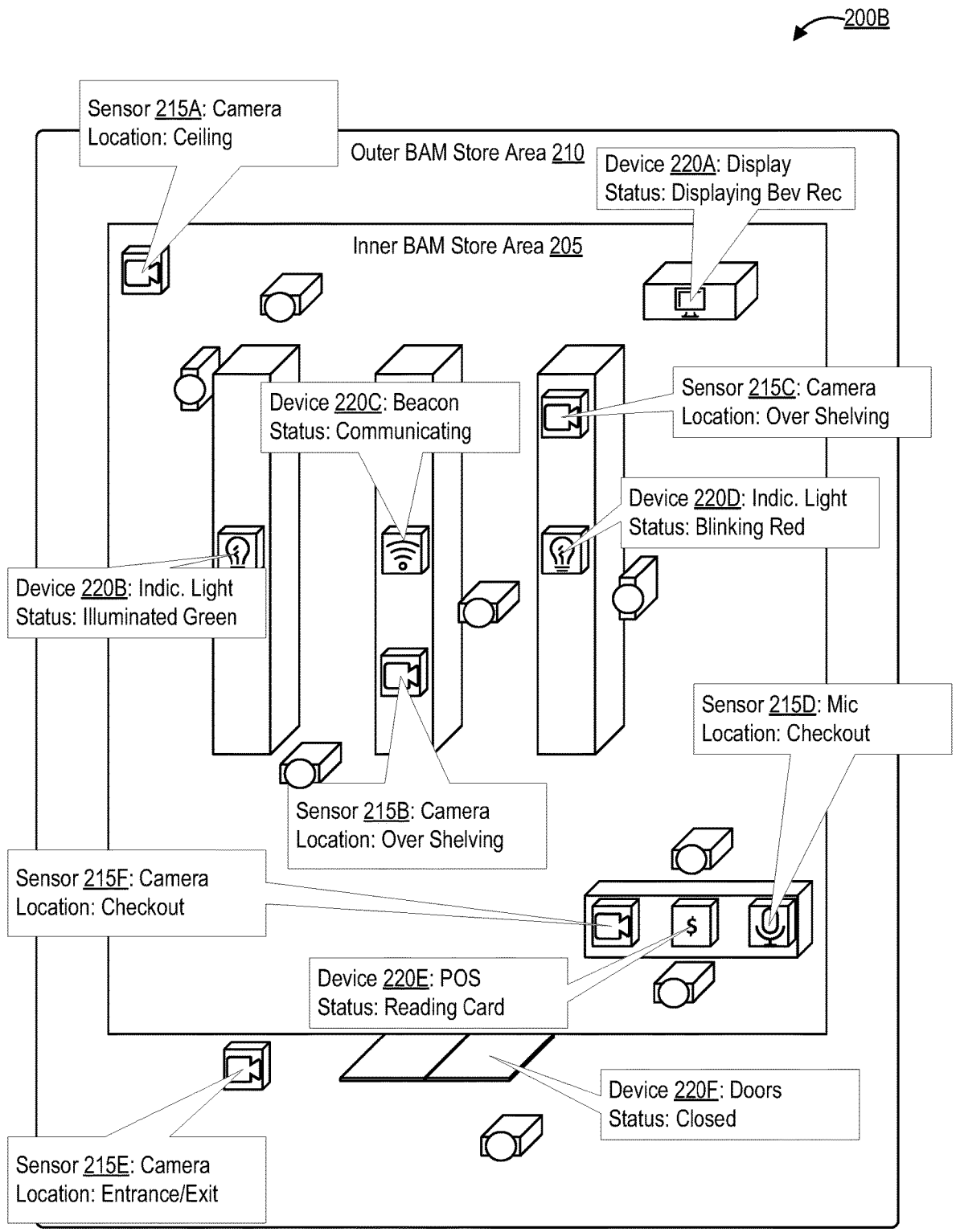
FIG. 2B is a conceptual diagram illustrating a representation of the first example brick and mortar (BAM) store area of FIG. 2A with on-location sensors and devices identified.

FIG. 2B is a conceptual diagram 200B illustrating a representation of the first example BAM store area of FIG. 2A with on-location sensors 215A-215F and devices 220A-220F identified. The BAM store area includes a number of sensors 215A-215F, which are examples of the sensors 124 of FIG. 1. The inner BAM store area 205 includes a first sensor 215A, which is a camera located on the ceiling of the inner BAM store area 205. The inner BAM store area 205 includes a second sensor 215B, which is a camera located over a shelving unit of the inner BAM store area 205. The inner BAM store area 205 includes a third sensor 215C, which is a camera located over a shelving unit of the inner BAM store area 205. The inner BAM store area 205 includes a fourth sensor 215D, which is a microphone located on or next to a POS device at a checkout table area of the inner BAM store area 205. The outer BAM store area 210 includes a fifth sensor 215E, which is a camera coupled to an exterior wall of inner BAM store area 205, and facing an entrance and/or exit of the inner BAM store area 205. The inner BAM store area 205 includes a sixth sensor 215F, which is a camera located on or next to the POS device at the checkout table area of the inner BAM store area 205.

The BAM store area includes a number of devices 220A-220F, which are examples of the merchant devices 108, the BAM store area devices 110, and/or the local wireless transceivers 126. The inner BAM store area 205 includes a first device 220A, which is a BAM store area device 110—a display—that is displaying a beverage recommendation, for example related to a specific customer 102's preferences. The inner BAM store area 205 includes a second device 220B, which is a BAM store area device 110—an indicator light (e.g., an LED)—that is atop a shelving unit and illuminated green, for example to indicate to a customer 102 that a product or service 112 that the customer 102 has on their shopping list is in that shelving unit. The inner BAM store area 205 includes a third device 220C, which is a local wireless transceiver 126—a beacon (e.g., Bluetooth or BLE)—that is atop a shelving unit and is communicating, for example to identify locations of various customer devices 104 and/or merchant devices 108. The inner BAM store area 205 includes a fourth device 220D, which is a BAM store area device 110—an indicator light (e.g., an LED)—that is atop a shelving unit and blinking red, for example to indicate to a representative of a merchant 106 that an inventory of a product or service 112 in a merchantable inventory area (e.g., the shelving unit) is almost out and needs to be replenished. The inner BAM store area 205 includes a fifth device 220E, which is a merchant device 108—a POS device that is currently reading a credit card. The inner BAM store area 205 includes a sixth device 220F, which is a BAM store area device 110—a set of doors that are the entrance and exit of the inner BAM store area 205, and that are currently closed.

Figure 2C:
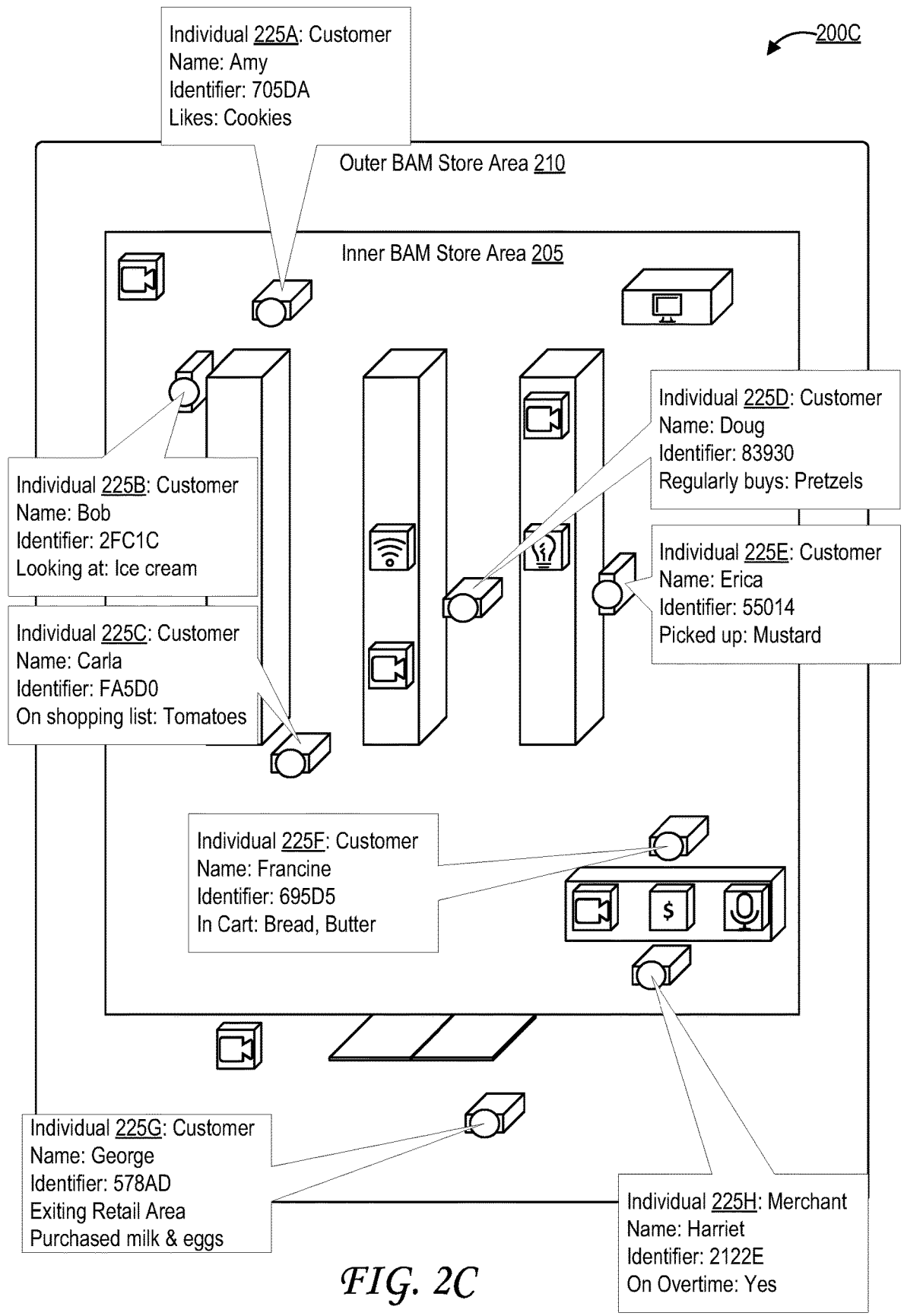
FIG. 2C is a conceptual diagram illustrating a representation of the first example brick and mortar (BAM) store area of FIG. 2A with identifiers indicating individuals detected in the BAM store area.

FIG. 2C is a conceptual diagram 200C illustrating a representation of the first example BAM store area of FIG. 2A with identifiers indicating individuals 225A-225H detected in the BAM store area. The poses of the individuals 225A-225H may be identified and tracked by the customer pose identification and tracking engine 144 and/or the merchant pose identification and tracking engine 146, for instance based on data from the sensors 215A-215F and devices 220A-220F. Information is identified about the individuals, for example based on the customer pose identification and tracking engine 144, the merchant pose identification and tracking engine 146, the customer identifier and account management engine 152, the merchant identifier and account management engine 154, the customer preferences and needs identification and tracking engine 156, the merchant preferences and needs identification and tracking engine 158, the customer history tracking engine 160, the merchant history tracking engine 162, or a combination thereof.

The inner BAM store area 205 includes a first individual 225A, who is a customer 102 named Amy with a unique identifier of 705DA, whose preferences include liking cookies. The inner BAM store area 205 includes a second individual 225B, who is a customer 102 named Bob with a unique identifier of 2FC1C, whose tracked gaze indicates that he is looking at ice cream. The inner BAM store area 205 includes a third individual 225C, who is a customer 102 named Carla with a unique identifier of FA5D0, whose customer device 104 indicates that her shopping list includes tomatoes. The inner BAM store area 205 includes a fourth individual 225D, who is a customer 102 named Doug with a unique identifier of 83930, whose customer history information indicates that he regularly buys pretzels. The inner BAM store area 205 includes a fifth individual 225E, who is a customer 102 named Erica with a unique identifier of 55014, whose pose tracking indicates that she picked up a container of mustard. The inner BAM store area 205 includes a sixth individual 225F, who is a customer 102 named Francine with a unique identifier of 695D5, whose personal inventory data structure indicates that she has bread and butter in her cart. The outer BAM store area 210 includes a seventh individual 225G, who is a customer 102 named George with a unique identifier of 578AD, whose pose tracking indicates that he just exited the inner BAM store area 205 and whose history information indicates that he purchased milk and eggs. The inner BAM store area 205 includes an eight individual 225H, who is a representative of the merchant 106 named Harriet with a unique identifier of 2122E, whose schedule information indicates that she is currently working overtime.

Figure 2D:
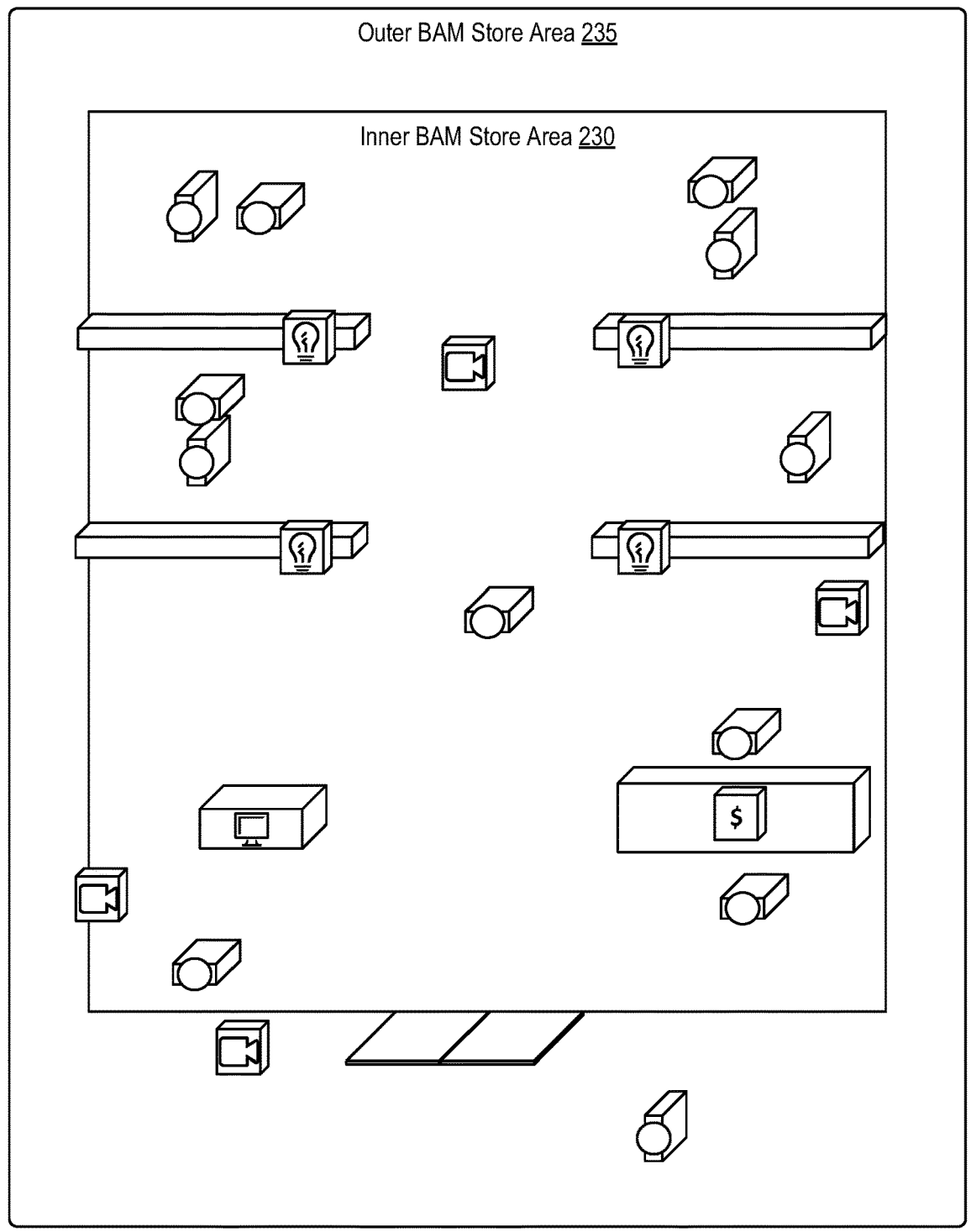
FIG. 2D is a conceptual diagram illustrating a representation of a second example brick and mortar (BAM) store area.

FIG. 2D is a conceptual diagram 200D illustrating a representation of a second example BAM store area. The second example BAM store area of FIG. 2D includes an inner BAM store area 230, which corresponds to an interior of a store. The second example BAM store area of FIG. 2D includes an outer BAM store area 235, which represents an area that outside of, but still related to, an inner BAM store area 230. The outer retail 235 area may include any of the types of areas discussed with respect to the outer BAM store area 210 of FIG. 2A. The inner BAM store area 230 of FIG. 2D is a hair salon, with booths set up at which customers 102 receive services (e.g., haircuts and/or hair styling) from representatives of merchants 106. The inner BAM store area 230 of FIG. 2D also includes a checkout counter where customers 102 can line up to pay for the services before or after receiving them, schedule future services, and so on.

Figure 2E:
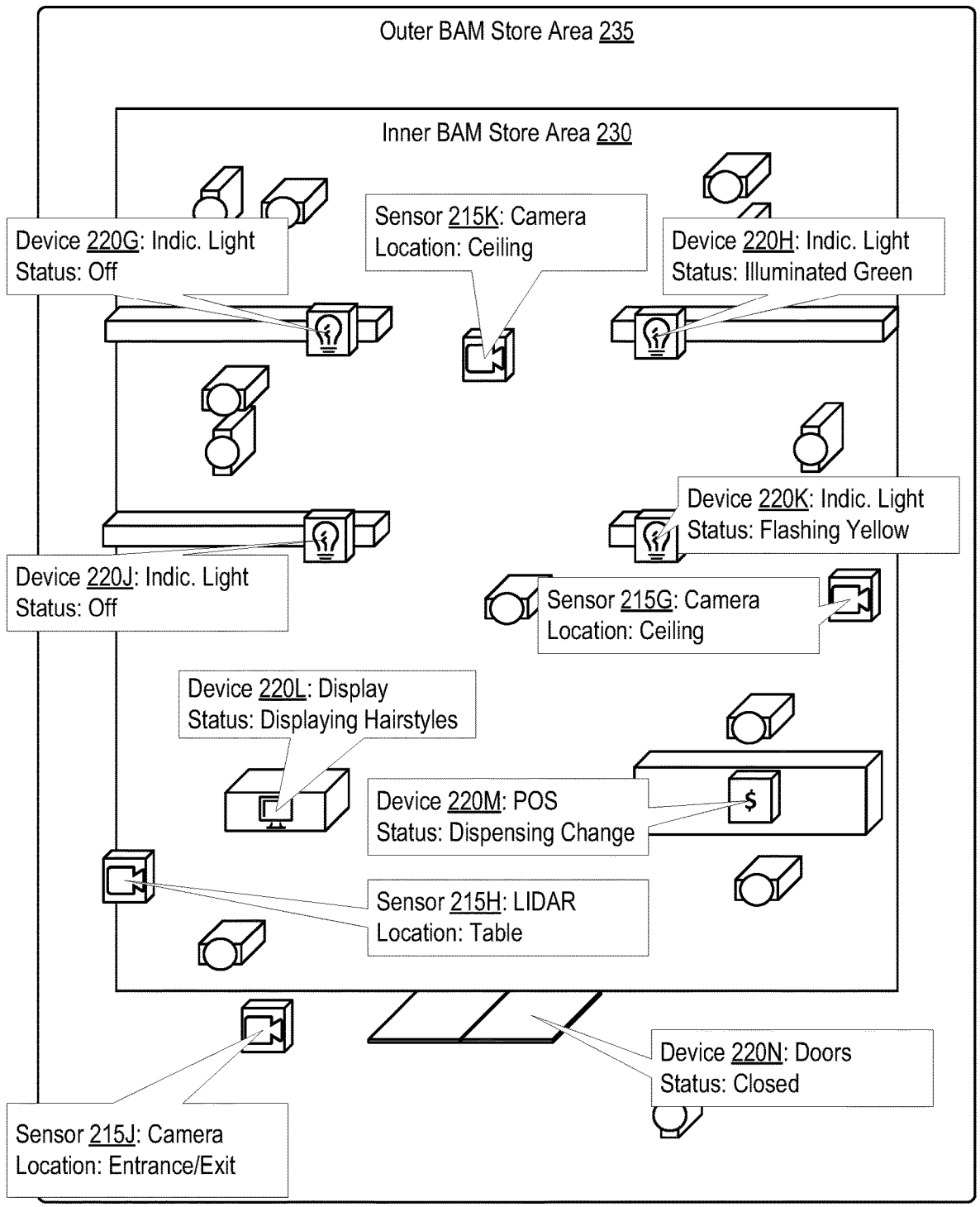
FIG. 2E is a conceptual diagram illustrating a representation of the second example brick and mortar (BAM) store area of FIG. 2D with on-location sensors and devices identified.

FIG. 2E is a conceptual diagram illustrating a representation of the second example BAM store area of FIG. 2D with on-location sensors 215G-215K and devices 220G-220N identified. The BAM store area includes a number of sensors 215G-215K, which are examples of the sensors 124 of FIG. 1. The inner BAM store area 230 includes a first sensor 215K, which is a camera located on the ceiling of the inner BAM store area 230 between all of the hair service booths. The inner BAM store area 230 includes a second sensor 215G, which is another camera located on the ceiling of the inner BAM store area 230 near the checkout counter. The inner BAM store area 230 includes a third sensor 215H, which is a LIDAR sensor located on a table of the inner BAM store area 230 near a waiting area. The outer BAM store area 235 includes a fourth sensor 215J, which is a camera coupled to an exterior wall inner BAM store area 230, and facing an entrance and/or exit of the inner BAM store area 230.

The BAM store area includes a number of devices 220G-220N, which are examples of the merchant devices 108, the BAM store area devices 110, and/or the local wireless transceivers 126. The inner BAM store area 230 includes a first device 220G, which is a BAM store area device 110—an indicator light (e.g., an LED) corresponding to a hair service booth—that is turned off, for example to indicate a service in progress. The inner BAM store area 230 includes a second device 220H, which is a BAM store area device 110—an indicator light (e.g., an LED) corresponding to a hair service booth—that is illuminated green, for example to indicate a service that has just completed. The inner BAM store area 230 includes a third device 220J, which is a BAM store area device 110—an indicator light (e.g., an LED) corresponding to a hair service booth—that is turned off, for example to indicate a service in progress. The inner BAM store area 230 includes a fourth device 220K, which is a BAM store area device 110—an indicator light (e.g., an LED) corresponding to a hair service booth—that is flashing yellow, for example to indicate that the representative of the merchant 106 in that hair service booth is free to perform a service. The inner BAM store area 230 includes a fifth device 220L, which is a BAM store area device 110—an display corresponding to a waiting area—that is displaying hairstyles, for example based on preferences and/or needs of a customer 102 in the waiting area (individual 225U in FIG. 2F). The inner BAM store area 230 includes a sixth device 220M, which is a merchant device 108—a POS device that is currently dispensing change. The inner BAM store area 230 includes a seventh device 220N, which is a BAM store area device 110—a set of doors that are the entrance and exit of the inner BAM store area 230, and that are currently closed.

Figure 2F:
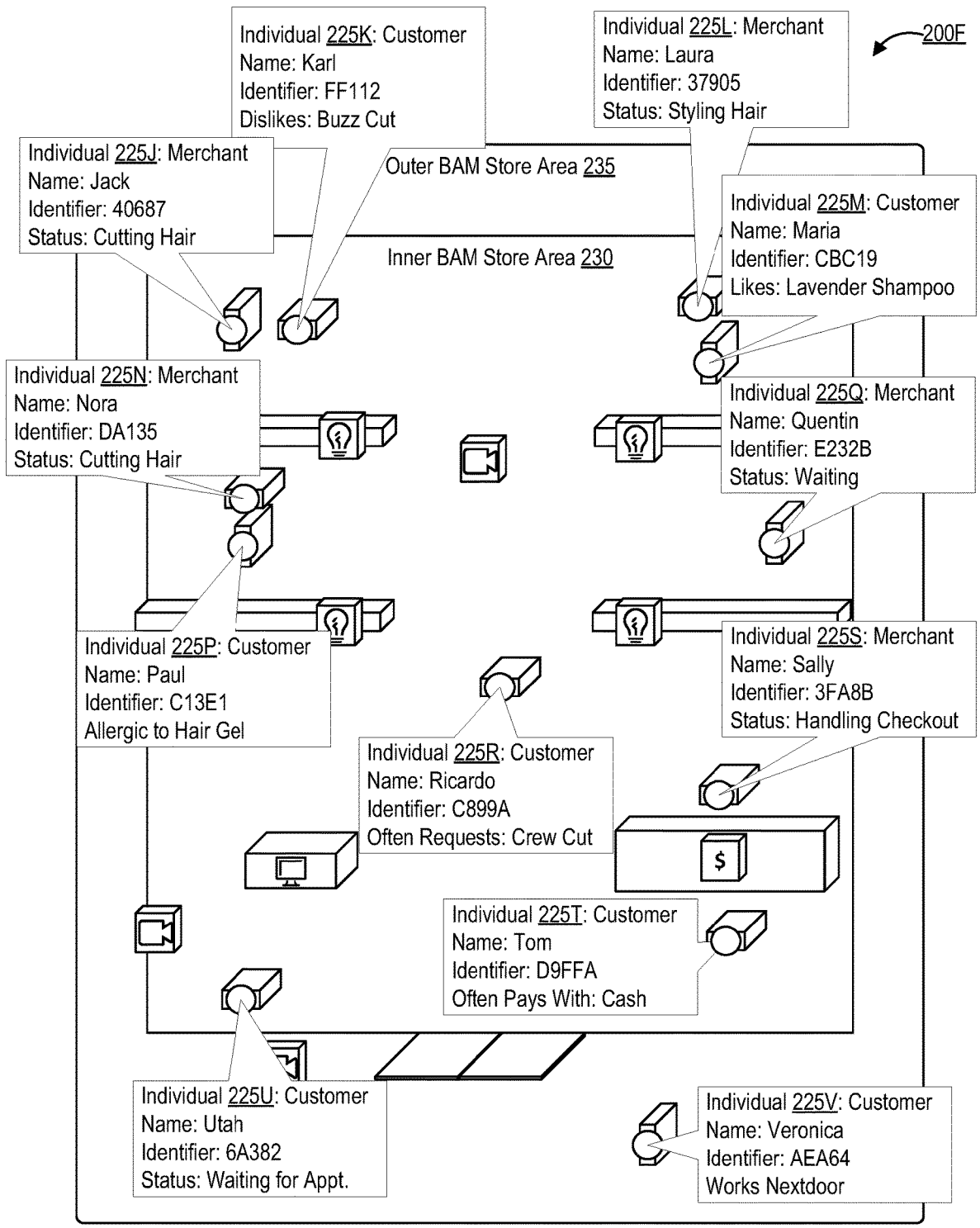
FIG. 2F is a conceptual diagram illustrating a representation of the second example brick and mortar (BAM) store area of FIG. 2D with identifiers indicating individuals detected in the BAM store area.

FIG. 2F is a conceptual diagram illustrating a representation of the second example BAM store area of FIG. 2D with identifiers indicating individuals detected in the BAM store area. The poses of the individuals 225J-225V may be identified and tracked by the customer pose identification and tracking engine 144 and/or the merchant pose identification and tracking engine 146, for instance based on data from the sensors 215G-215K and devices 220G-220N. Information is identified about the individuals, for example based on the customer pose identification and tracking engine 144, the merchant pose identification and tracking engine 146, the customer identifier and account management engine 152, the merchant identifier and account management engine 154, the customer preferences and needs identification and tracking engine 156, the merchant preferences and needs identification and tracking engine 158, the customer history tracking engine 160, the merchant history tracking engine 162, or a combination thereof.

The inner BAM store area 230 includes a first individual 225J, who is a representative of the merchant 106 named Jack with a unique identifier of 40687, whose current status indicates that he is cutting hair. The inner BAM store area 230 includes a second individual 225K, who is a customer 102 named Karl with a unique identifier of FF112, whose preferences indicate that he dislikes buzz cuts. The inner BAM store area 230 includes a third individual 225L, who is a representative of the merchant 106 named Laura with a unique identifier of 37905, whose status indicates she is styling hair. The inner BAM store area 230 includes a fourth individual 225M, who is a customer 102 named Maria with a unique identifier of CBC19, whose preferences indicate that she likes lavender shampoo. The inner BAM store area 230 includes a fifth individual 225N, who is a representative of the merchant 106 named Nora with a unique identifier of DA135, whose status indicates she is cutting hair. The inner BAM store area 230 includes a sixth individual 225P, who is a customer 102 named Paul with a unique identifier of C13E1, whose preferences and needs information indicates that he is allergic to hair gel. The inner BAM store area 230 includes a seventh individual 225Q, who is a representative of the merchant 106 named Quentin with a unique identifier of E232B, whose status indicates that he is waiting for a customer 102. The inner BAM store area 230 includes an eight individual 225R, who is a customer 102 named Ricardo with a unique identifier of C899A, whose history information indicates that he often requests a crew cut. The inner BAM store area 230 includes a ninth individual 225S, who is a representative of the merchant 106 named Sally with a unique identifier of 3FA8B, whose status indicates she is handling a checkout. The inner BAM store area 230 includes a tenth individual 225T, who is a customer 102 named Tom with a unique identifier of D9FFA, whose history information indicates that he often pays with cash. The inner BAM store area 230 includes an eleventh individual 225U, who is a customer 102 named Utah with a unique identifier of 6A382, whose status indicates that they are waiting for an appointment. The outer BAM store area 235 includes a twelfth individual 225V, who is a customer 102 named Veronica with a unique identifier of AEA64, whose demographic information indicates that she works next door to the inner BAM store area 230.

Figure 2G:
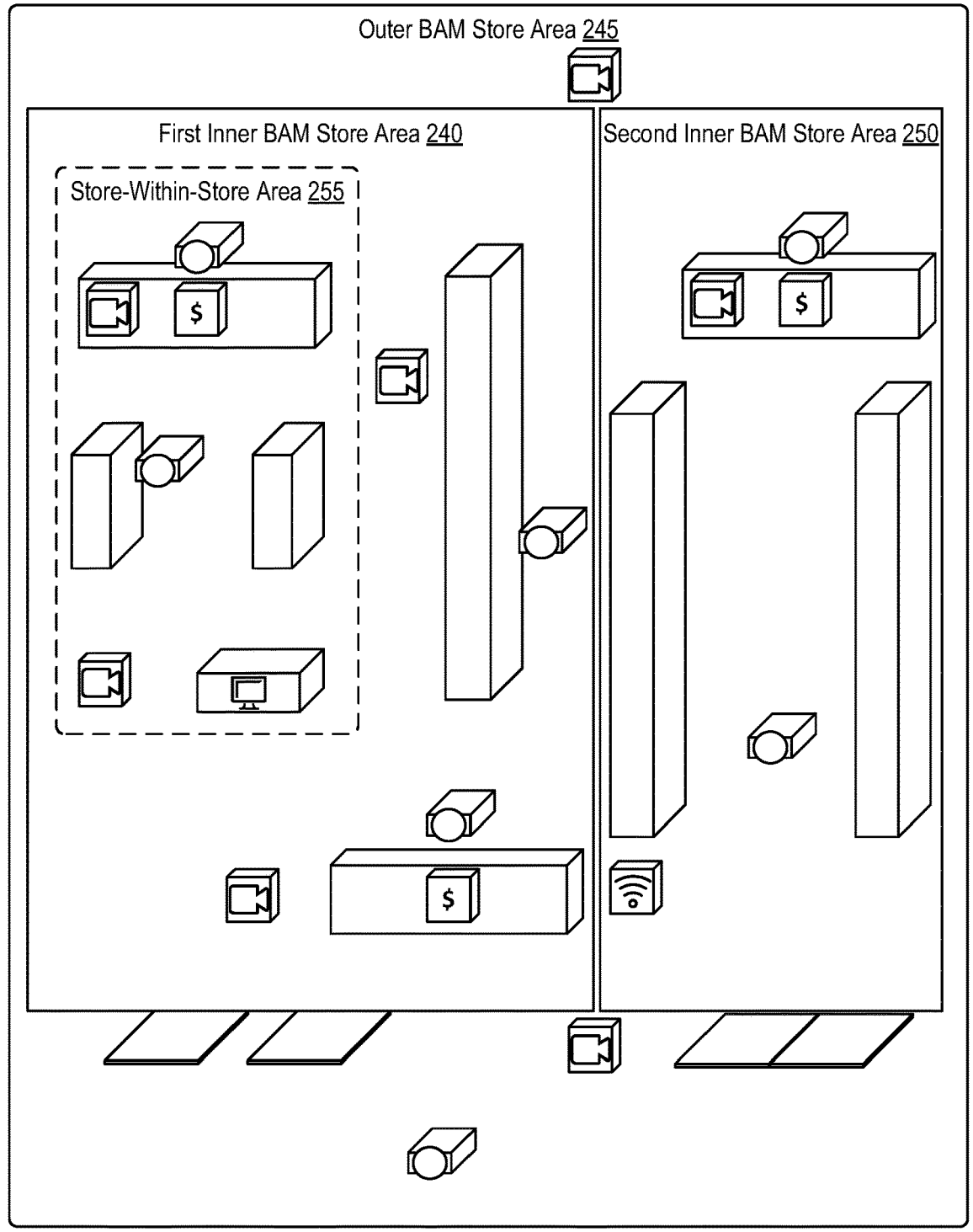
FIG. 2G is a conceptual diagram illustrating a representation of a group of brick and mortar (BAM) stores.

FIG. 2G is a conceptual diagram illustrating a representation of a group of brick and mortar (BAM) stores. The group of BAM stores of FIG. 2G includes a first inner BAM store area 240, which corresponds to an interior of a first store. The group of BAM stores of FIG. 2G includes a second inner BAM store area 250, which corresponds to an interior of a second store that neighbors (is adjacent to) the first store (that corresponds to the first inner BAM store area 240). The group of BAM stores of FIG. 2G includes a store-within-store area 255, which corresponds to a third store within the first inner BAM store area 240 and therefore within the first store (that corresponds to the first inner BAM store area 240). The boundary of the store-within-store area 255 is illustrated using a dashed line. The store-within-store area 255 may be considered its own BAM store area, part of the first inner BAM store area 240, or both. An outer BAM store area 245 of FIG. 2G represents an area that outside of, but still related to, the first inner BAM store area 240, the second inner BAM store area 250, and/or the store-within-store area 255.

The outer retail 245 area may include, for example, a sidewalk adjacent to one or more of the store areas 240/250/255, a parking lot adjacent to one or more of the store areas 240/250/255, a parking lot for one or more of the store areas 240/250/255, a parking garage adjacent to one or more of the store areas 240/250/255, a parking garage for one or more of the store areas 240/250/255, a street adjacent to one or more of the store areas 240/250/255, a hallway adjacent to one or more of the store areas 240/250/255 (e.g., if one or more of the store areas 240/250/255 is within a shopping mall or other larger indoor structure), a queue area in which a queue can form to enter one or more of the store areas 240/250/255, an area in which sensors 124 (e.g., cameras) associated with one or more of the store areas 240/250/255 can see or otherwise sense, an area in which a range of one or more local wireless transceivers 126 associated with one or more of the store areas 240/250/255 reaches, or a combination thereof.

The stores in the first inner BAM store area 240, the second inner BAM store area 250, and/or the store-within-store area 255 may each be any type of store associated with any type of merchant. In some examples, the store-within-store area 255 may be a coffee shop, and the first inner BAM store area 240 may be a grocery store or retail store. The stores in the first inner BAM store area 240, the second inner BAM store area 250, and/or the store-within-store area 255 are illustrated each with their own POS devices, cameras, and other devices.

Figure 2H:
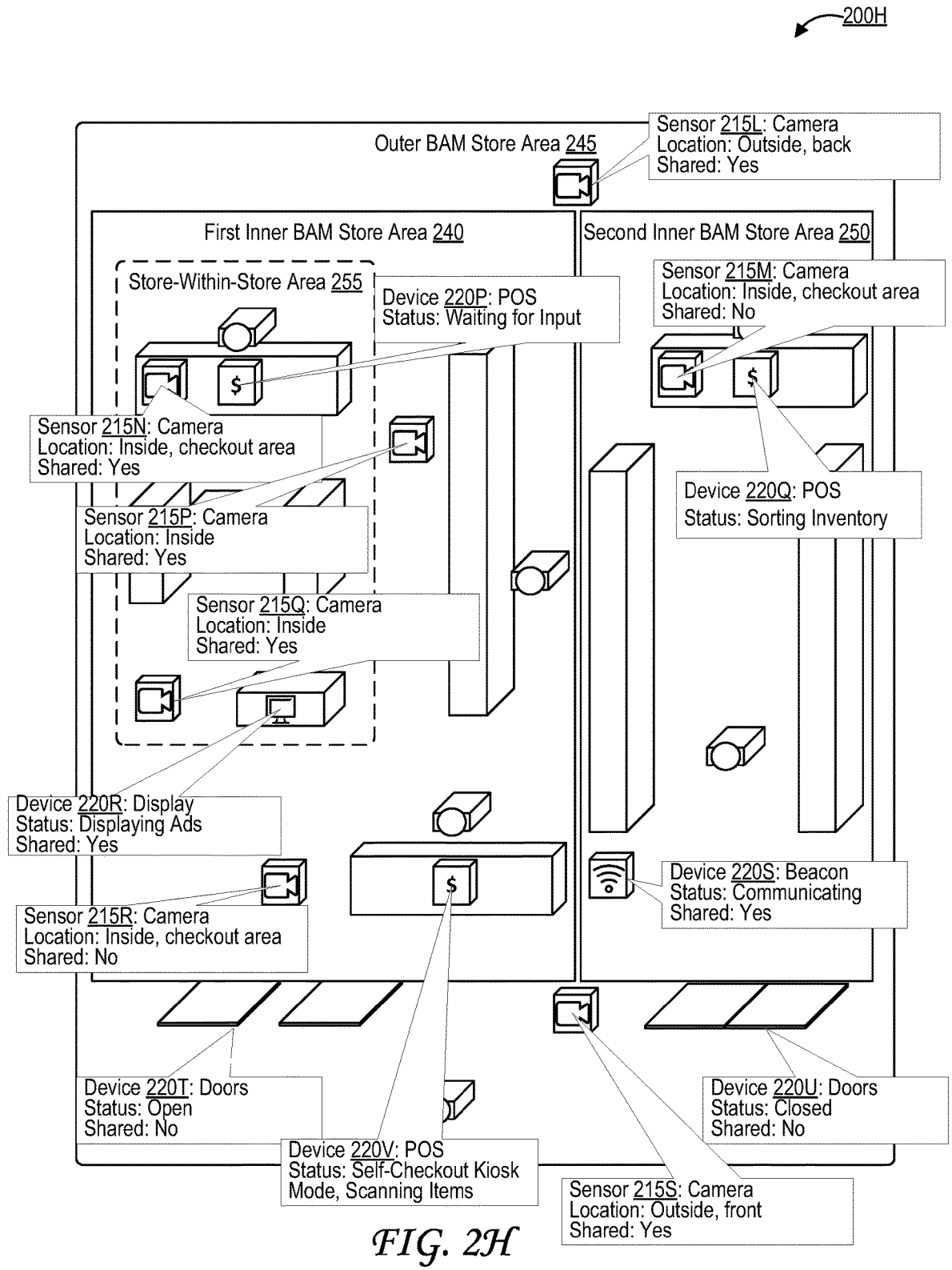
FIG. 2H is a conceptual diagram illustrating a representation of the group of brick and mortar (BAM) stores of FIG. 2G with on-location sensors and devices identified.

FIG. 2H is a conceptual diagram illustrating a representation of the group of brick and mortar (BAM) stores of FIG. 2G with on-location sensors 215L-215S and devices 220P-220V identified. The group of BAM stores includes a number of sensors 215L-215S, which are examples of the sensors 124 of FIG. 1. The outer BAM store area 245 includes a first sensor 215L, which is a camera located outside of, and behind, both the first inner BAM store area 240 and the second inner BAM store area 250. A shared status of "yes" for the first sensor 215L indicates that the camera data from the camera is shared among the BAM store control system(s) associated with one or more of the store areas 240/250/255, for instance because the outer BAM store area 245 is shared among the merchants associated with the three store areas 240/250/255. The second inner BAM store area 250 includes a second sensor 215M, which is a camera located inside the second inner BAM store area 250 with a field of view that includes the checkout counter and the POS device 220Q. A shared status of "no" for the second sensor 215M indicates that the camera data from the camera is not shared among the BAM store control system(s) associated with the store areas 240/250/255, for instance so as not to share sensitive information associated with transactions made at the POS device 220Q. The first inner BAM store area 240 and the store-within-store area 255 include a third sensor 215N, which is a camera located inside the first inner BAM store area 250 and the store-within-store area 255 with a field of view that includes the checkout counter and the POS device 220P. A shared status of "yes" for the third sensor 215M indicates that the camera data from the camera is shared among the BAM store control system(s) associated with one or more of the store areas 240/250/255, for instance because the field of the view of the third sensor 215M may also include other parts of the first inner BAM store area 240 outside of the store-within-store area 255.

The first inner BAM store area 240 includes a fourth sensor 215P, which is a camera located inside the first inner BAM store area 250 with a field of view that includes parts of the first inner BAM store area 250 and/or the store-within-store area 255. A shared status of "yes" for the fourth sensor 215P indicates that the camera data from the camera is shared among the BAM store control system(s) associated with one or more of the store areas 240/250/255, for instance because the field of the view of the fourth sensor 215P may include parts of the first inner BAM store area 250 and/or the store-within-store area 255. The first inner BAM store area 240 and the store-within-store area 255 include a fifth sensor 215Q, which is a camera located inside the first inner BAM store area 250 and the store-within-store area 255 with a field of view that includes parts of the first inner BAM store area 250 and/or the store-within-store area 255. A shared status of "yes" for the fifth sensor 215Q indicates that the camera data from the camera is shared among the BAM store control system(s) associated with one or more of the store areas 240/250/255, for instance because the field of the view of the fifth sensor 215Q may include parts of the first inner BAM store area 250 and/or the store-within-store area 255. The first inner BAM store area 240 includes a sixth sensor 215R, which is a camera located inside the first inner BAM store area 250 with a field of view that includes the checkout counter with the POS device 220V, and may include parts of the first inner BAM store area 250 and/or the store-within-store area 255. A shared status of "no" for the sixth sensor 215R indicates that the camera data from the camera is not shared among the BAM store control system(s) associated with the store areas 240/250/255, for instance so as not to share sensitive information associated with transactions made at the POS device 220V. The outer BAM store area 245 includes a seventh sensor 215S, which is a camera located outside of, and in front of, both the first inner BAM store area 240 and the second inner BAM store area 250. A shared status of "yes" for the seventh sensor 215S indicates that the camera data from the camera is shared among the BAM store control system(s) associated with one or more of the store areas 240/250/255, for instance because the outer BAM store area 245 is shared among the merchants associated with the three store areas 240/250/255.

The group of BAM stores includes a number of devices 220P-220V, which are examples of the merchant devices 108, the BAM store area devices 110, and/or the local wireless transceivers 126. The first inner BAM store area 240 and the store-within-store area 255 include a first device 220P, which is a POS device for the store-within-store area 255 that is currently waiting for input. The second inner BAM store area 250 includes a second device 220Q, which is a POS device for the second inner BAM store area 250 that is currently sorting inventory in association with a BAM store control system 100 associated with the second inner BAM store area 250 (e.g., the inventory management engine 168). The first inner BAM store area 240 and the store-within-store area 255 include a third device 220R, which is a display screen located inside the first inner BAM store area 250 and the store-within-store area 255, and which is displaying ads. A shared status of "yes" for the third device 220R indicates control over the third device 220R can be shared among the BAM store control system(s) associated with one or more of the store areas 240/250/255, for instance because the third device 220R is within both the first inner BAM store area 250 and the store-within-store area 255. The second inner BAM store area 250 includes a fourth device 220S, which is a beacon device that is communicating (e.g., with one or more customer devices 104, one or more merchant devices 108, and/or one or more BAM store area devices 110). A shared status of "yes" for the fourth device 220S that communication data from the fourth device 220S can be shared among the BAM store control system(s) associated with one or more of the store areas 240/250/255, for instance because the range of the beacon of the fourth device 220S can cover at least portions of the second inner BAM store area 250, the first inner BAM store area 250, and/or the store-within-store area 255. The first inner BAM store area 240 includes a fifth device 220T, which is a set of doors to the first inner BAM store area 240 that are currently open. A shared status of "no" for the fifth device 220T indicates control over the fifth device 220T is not shared among BAM store control system(s) associated with the store areas 240/250/255. The second inner BAM store area 250 includes a sixth device 220U, which is a set of doors to the second inner BAM store area 250 that are currently closed. A shared status of "no" for the sixth device 220U indicates control over the sixth device 220U is not shared among BAM store control system(s) associated with the store areas 240/250/255. The first inner BAM store area 240 includes a seventh device 220V, which is a POS device for the first inner BAM store area 240 that is currently in self-checkout kiosk mode (e.g., as in operation 1030 of FIG. 10) and that is currently scanning items (e.g., products and/or services 112).

A map, or virtual twin, of one or more BAM store area can include the types of details illustrated in FIGS. 2A-2H, and can be generated by the spatial mapping engine 150. A virtual walk-through of the BAM store area, for example, can help a user see where different sensors (e.g., sensors 215A-215S), devices (e.g., devices 220A-220V), individuals (e.g., individuals 225A-225U), and objects associated with products or services 112 are located. In some examples, the map can be updated in real-time. In some examples, the map can be updated with a delay. In some examples, the map can be updated periodically (e.g., every N seconds and/or minutes). In some examples, the map can be updated upon detecting a change.

Figure 3:
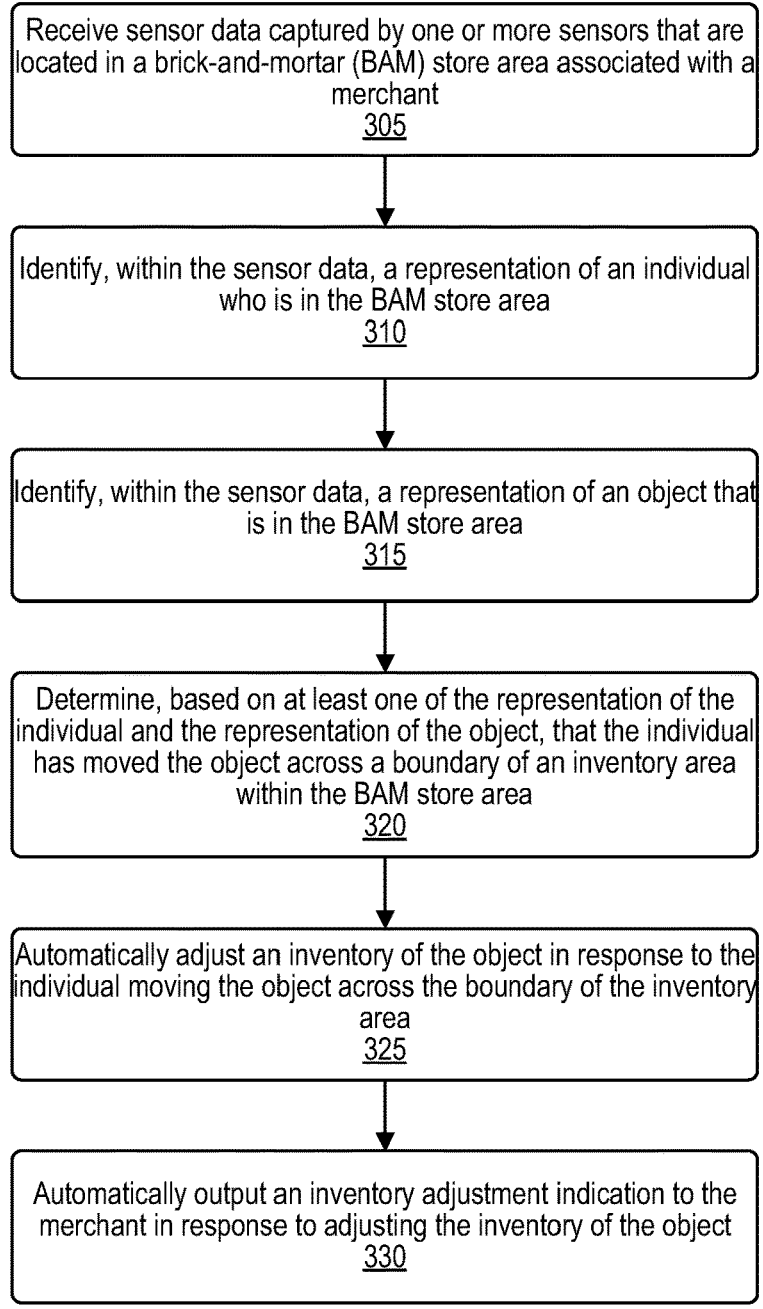
FIG. 3 is a flow diagram illustrating operations for identifying an interaction in a brick and mortar (BAM) store environment.

FIG. 3 is a flow diagram illustrating operations 300 for identifying an interaction in a brick and mortar (BAM) store environment. The operations 300 can refer to a system and/or process for automatic inventory tracking in a BAM store based on sensor data. The operations 300 can be performed by a BAM store control system. The BAM store control system that performs the operations 300 can include, for example, at least a portion of the BAM store control system 100 of FIG. 1, the server computing devices 1302, the server computing devices 1310, the POS application 1318, the user device 1402, the servers 1404, the data store 1444, the BAM store control system that performs the operations 400, the BAM store control system that performs the operations 500, the BAM store control system that performs the operations 600, the BAM store control system that performs the operations 700, the BAM store control system that performs the operations 300, the BAM store control system that performs the operations 800, the BAM store control system that performs the operations 1000, the BAM store control system that performs the operations 1100, the BAM store control system that performs the operations 1200, the computing system 1500, or a combination thereof.

At operation 305, the BAM store control system receives sensor data captured by one or more sensors that are located in a BAM store area associated with a merchant. Examples of the sensors include the sensors 124 of FIG. 1, the one or more local wireless transceivers 126 of FIG. 1, some BAM store area devices 110 of FIG. 1, the sensors 215A-215K of FIGS. 2A-2H, and the devices 220C and 220S of FIGS. 2A-2C and 2G-2H. Examples of the BAM store area of operation 305 include the inner BAM store area 205 of FIGS. 2A-2C, the outer BAM store area 210 of FIGS. 2A-2C, or a combination of both. Examples of the BAM store area of operation 305 include the inner BAM store area 230 of FIGS. 2D-2F, the outer BAM store area 235 of FIGS. 2D-2F, or a combination of both. Examples of the BAM store area of operation 305 include the first inner BAM store area 240 of FIGS. 2G-2H, the second inner BAM store area 250 of FIGS. 2G-2H, the store-within-store area 255 of FIGS. 2G-2H, the outer BAM store area 245 of FIGS. 2G-2H, or a combination thereof. In some examples, the sensor data can be received over one or more sensor connectors through which the BAM store control system is coupled to the one or more sensors. In some examples, the one or more sensors are located in the BAM store area. In some examples, the one or more sensors that located outside of the BAM store area, but include a field of view (FOV) or range that includes at least a portion of the BAM store area.

At operation 310, the BAM store control system identifies, in the sensor data, a representation of an individual who is in the BAM store area. In some examples, the identification of the representation of an individual in the sensor data can be performed by the customer pose identification and tracking engine 144 and/or the merchant pose identification and tracking engine 146. In some examples, the identification of the representation of an individual in the sensor data can be performed using the AI platform 196. At operation 315, the BAM store control system identifies, in the sensor data, a representation of an object that is in the BAM store area. The object may be, for example, an object associated with a product and/or service 112. In some examples, the identification of the representation of the object in the sensor data can be performed by the product/service pose identification and tracking engine 148. In some examples, the identification of the representation of an object in the sensor data can be performed using the AI platform 196.

In some examples, the one or more sensors include one or more image sensors (e.g., of one or more cameras). The sensor data can include one or more images captured by the one or more image sensors. Identifying the representation of the individual and identifying the representation of the object can be performed using one or more object detection algorithms. Identifying the representation of the individual who is in the BAM store area can include identifying one or more visual representations (e.g., depictions) of the individual who is in the BAM store area in one or more images of the BAM store area captured by the one or more image sensors. Identifying the representation of the object that is in the BAM store area can include identifying one or more visual representations (e.g., depictions) of the object that is in the BAM store area in one or more images of the BAM store area captured by the one or more image sensors.

In some examples, the one or more sensors include one or more local wireless signal transceivers 126. The sensor data can include one or more local wireless communications between the one or more local wireless signal transceivers 126 and one or more wireless communication devices within wireless communication range of the one or more local wireless signal transceivers. Identifying the representation of the individual can include identifying a first wireless communication device of the one or more wireless communication devices based on the one or more local wireless communications. The first wireless communication device can be associated with the individual. For instance, if the individual is a customer 102, the first wireless communication device can be a customer device 104 associated with the customer 102. If the individual is a representative of the merchant 106, the first wireless communication device can be a merchant device 106 associated with the representative of the merchant 106.

At operation 320, the BAM store control system determines, based on at least one of the representation of the individual and the representation of the object, that the individual has moved the object across a boundary of an inventory area within the BAM store area. An example of an inventory area may include a shelving unit, a tabletop, a clothes rack, a refrigerator, or a combination thereof. An example of an inventory area may include the shelving units of FIGS. 2A-2C.

At operation 325, the BAM store control system automatically adjusts a merchantable inventory of the object in response to the individual moving the object across the boundary of the inventory area. The merchantable inventory of the object may identify the quantity of the object in the inventory area. The merchantable inventory of the object may be identified and tracked using the inventory management engine 168.

At operation 330, the BAM store control system automatically outputs a merchantable inventory adjustment indication to the merchant in response to adjusting the merchantable inventory of the object. The merchantable inventory adjustment indication can, for example, be a notification that the merchantable inventory has increased or decreased, and by a specific quantity.

In some examples, the BAM store control system determines, based on the representation of the individual, that the individual is a representative of the merchant 106. For example, the merchant pose identification and tracking engine 146 may recognize the face, body, clothing, name tag, badge, merchant device 108, personal device, and/or gait of the individual in comparison to stored images and/or other data about known representatives of the merchant 106. The merchant pose identification and tracking engine 146 may recognize the merchant device 108 of the individual based on a device identifier of the merchant device 108 matching a list of known device identifiers of merchant devices 108 of representatives of the merchant 106.

In some examples, the BAM store control system determines, based on the representation of the individual, that the individual is a customer 102. For example, the customer pose identification and tracking engine 144 may recognize the face, body, clothing, name tag, badge, customer device 104, and/or gait of the individual in comparison to stored images and/or other data about known customers 102. The customer pose identification and tracking engine 144 may recognize the customer device 104 of the individual based on a device identifier of the customer device 104 matching a list of known device identifiers of known customers 102. The merchant pose identification and tracking engine 146 may identify, for instance based on the face, body, clothing, or gait of the individual in comparison to stored images and/or other data about known representatives of the merchant 106, that the individual is not a representative of the merchant 106 and is therefore likely a customer 102. The merchant pose identification and tracking engine 146 may identify that a device identifier of the customer device 104 does not match a list of known device identifiers of merchant devices 108 of representatives of the merchant 106, and therefore is likely to be a customer device 104.

In some examples, to determine that the individual has moved the object across the boundary of the inventory area, the BAM store control system determines that the individual has moved the object into the inventory area. In some examples, to automatically adjust the merchantable inventory of the object, the one or more processors automatically increase the merchantable inventory of the object. In some examples, the BAM store control system automatically removes an object identifier associated with the object from a personal inventory data structure associated with the individual in response to determining that the individual has moved the object into the inventory area. The personal inventory data structure can be referred to as the personal inventory.

In some examples, to determine that the individual has moved the object across the boundary of the inventory area, the BAM store control system determines that the individual has moved the object out of the inventory area. In some examples, to automatically adjust the merchantable inventory of the object, the one or more processors automatically decrease the merchantable inventory of the object. In some examples, the BAM store control system identifies that the merchantable inventory of the object has fallen below a minimum threshold quantity in response to decreasing the merchantable inventory of the object. The merchantable inventory adjustment indication can be indicative of the merchantable inventory of the object having fallen below the minimum threshold quantity. In some examples, the BAM store control system generates a schedule to replenish the merchantable inventory of the object in response to decreasing the merchantable inventory of the object. The merchantable inventory adjustment indication is indicative of the schedule to replenish the merchantable inventory of the object. Generation of the schedule can be performed as discussed with respect to the operations 400, for example.

In some examples, the BAM store control system automatically adds an object identifier associated with the object to a personal inventory data structure associated with the individual in response to determining that the individual has moved the object out of the inventory area. In an illustrative example, the BAM store control system can transmit the personal inventory data structure to a point of sale (POS) device. The BAM store control system can receive verification from the POS device that the personal inventory data structure accurately identifies at least the object. The BAM store control system can initiate processing of one or more transactions for at least the object identified by the personal inventory data structure using payment information associated with the individual in response to receipt of the verification. In some examples, to automatically adjust the personal inventory of the individual, the one or more processors automatically decrease a quantity of the object identified in the personal inventory (e.g., corresponding to an increase in the merchantable inventory of the object). In some examples, to automatically adjust the personal inventory of the individual, the one or more processors automatically increase a quantity of the object identified in the personal inventory (e.g., corresponding to a decrease in the merchantable inventory of the object).

In some embodiments, a customer 102 does not need any application or user profile specific to the merchant. The minimum requirements to achieve a fully automated checkout is that the customer is recognized by BAM store control system 100 and that customer has a profile that is associated with a payment card. It is not necessary that the BAM store control system 100 know any identifying information about the customer other than a payment method. For example, customer 102 can have been recorded in the past at a first merchant that has an account with the BAM store control system 100. The customer 102 paid at the first merchant by presenting a payment card. The payment card can be associated with personal identifying information associated with the customer and recorded by the first merchant, such as a name, email, phone number address, username, biometric sensor readings, camera data from cameras, other information from other sensors 124, and the like. Thereafter, whenever the BAM store control system 100 recognizes customer 102 with a sufficient confidence, customer 102 can be eligible for fully automatic check out. In some embodiments, the customer 102 can have opted-in to using fully automatic check out when the user makes their initial purchase at the first merchant.

In some embodiments, when the customer 102 later enters a merchant retail location that is integrated with BAM store control system 100, the customer 102 can be notified that they are eligible for fully automatic check out. Such notification can occur once the customer 102 is recognized with sufficient confidence. Such notification can be provided to a BAM store area device 110 (e.g., a display or speaker at the BAM store area) near the location of the customer 102, to a customer device 104, to a merchant device 108 of a representative of a merchant 106 who is helping the customer 102 (or who is near the customer 102 and can help the customer 102), or a combination thereof. In some examples, the merchant or representative of a merchant 106 may be notified that the customer 102 is eligible for fully automatic check out, for example so that the merchant or representative of a merchant 106 knows that the customer 102 can leave the BAM store area, and does not misinterpret the customer 102's leaving the BAM store area as an attempt to shoplift or otherwise steal from the merchant. Such notification can be provided to a merchant device 108 of the representative of the merchant 106, to a BAM store area device 110 (e.g., a display or speaker at the BAM store area) near the location of the representative of the merchant 106 and/or the customer 102, to a customer device 104 of the customer 102 that the representative of the merchant 106 is helping (or otherwise interacting with or near), or a combination thereof.

Customers 102 that do not permit BAM store control system 100 to record their biometric data, or that have never been to a merchant associated with BAM store control system 100, can take advantage of fully automatic check out if they provide their payment mechanism as they enter the merchant BAM store area, or before they leave the merchant BAM store area. Provided the unknown customer does so, BAM store control system 100 can track the unknown customer throughout the merchant BAM store area and process the payment mechanism when a condition for check out is achieved. Alternatively, the customer can proceed to a point of sale merchant system 108 to check out at the point of sale system merchant 108.

In an illustrative example of a condition for check out, the BAM store control system identifies, in the sensor data, a second representation of the individual. The BAM store control system determines, based on the second representation of the individual, that the individual has exited the BAM store area. The BAM store control system initiates processing of one or more transactions for the one or more objects identified by the personal inventory data structure using payment information associated with the individual in response to receipt of the verification.

In another illustrative example of a condition for check out, the BAM store control system identifies, in the sensor data, a second representation of the individual. The BAM store control system determines, based on the second representation of the individual, that the individual has entered a second BAM store area associated with a second merchant. The BAM store control system initiates processing of one or more transactions for the one or more objects identified by the personal inventory data structure using payment information associated with the individual in response to receipt of the verification. Processing of the one or more transactions includes transferring funds for the object to the merchant and transferring funds for a second object of the one or more objects to the second merchant.

Figure 4:
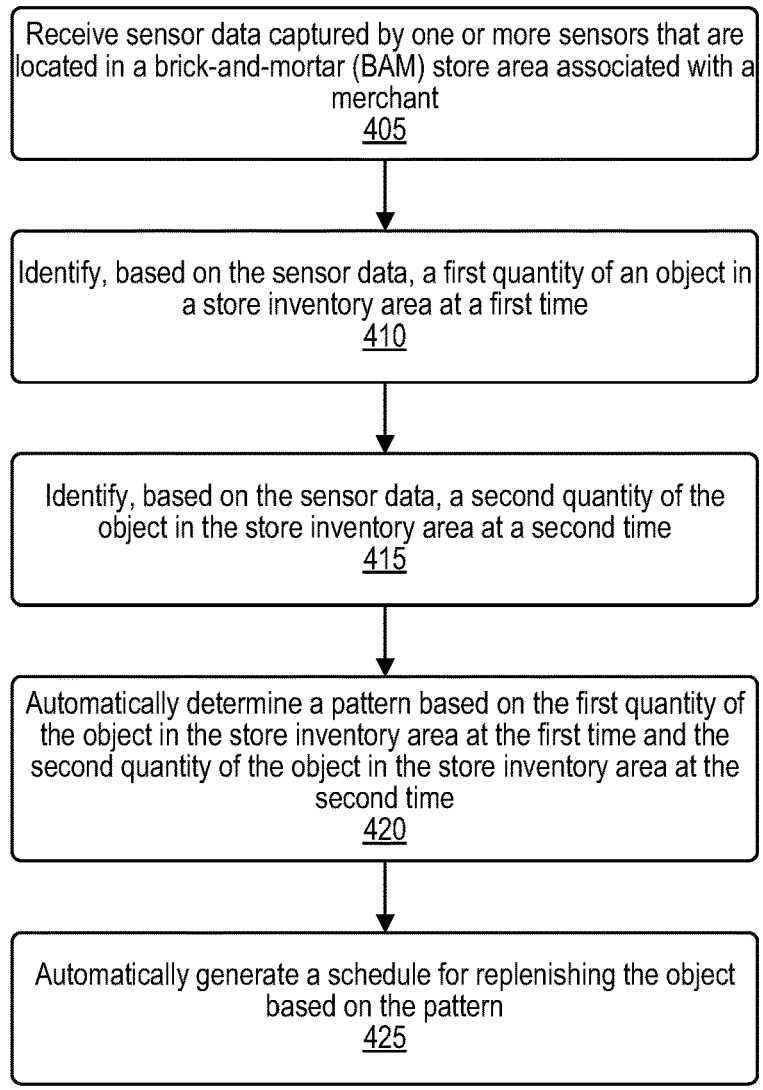
FIG. 4 is a flow diagram illustrating operations for automatic scheduling.

FIG. 4 is a flow diagram illustrating operations 400 for automatic scheduling. The operations 400 can be performed by a BAM store control system. The operations 400 can refer to a system and/or process for automatic BAM store schedule replenishment based on sensor data. The BAM store control system that performs the operations 400 can include, for example, at least a portion of the BAM store control system 100 of FIG. 1, the server computing devices 1302, the server computing devices 1310, the POS application 1318, the user device 1402, the servers 1404, the data store 1444, the BAM store control system that performs the operations 300, the BAM store control system that performs the operations 500, the BAM store control system that performs the operations 600, the BAM store control system that performs the operations 700, the BAM store control system that performs the operations 800, the BAM store control system that performs the operations 900, the BAM store control system that performs the operations 1000, the BAM store control system that performs the operations 1100, the BAM store control system that performs the operations 1200, the computing system 1500, or a combination thereof.

At operation 405, the BAM store control system receives sensor data captured by one or more sensors that are located in a BAM store area associated with a merchant. Examples of the sensors include the sensors 124 of FIG. 1, the one or more local wireless transceivers 126 of FIG. 1, some BAM store area devices 110 of FIG. 1, the sensors 215A-215K of FIGS. 2A-2H, and the devices 220C and 220S of FIGS. 2A-2C and 2G-2H. Examples of the BAM store area of operation 405 include the inner BAM store area 205 of FIGS. 2A-2C, the outer BAM store area 210 of FIGS. 2A-2C, or a combination of both. Examples of the BAM store area of operation 405 include the inner BAM store area 230 of FIGS. 2D-2F, the outer BAM store area 235 of FIGS. 2D-2F, or a combination of both. Examples of the BAM store area of operation 405 include the first inner BAM store area 240 of FIGS. 2G-2H, the second inner BAM store area 250 of FIGS. 2G-2H, the store-within-store area 255 of FIGS. 2G-2H, the outer BAM store area 245 of FIGS. 2G-2H, or a combination thereof. In some examples, the sensor data can be received over one or more sensor connectors through which the BAM store control system is coupled to the one or more sensors. In some examples, the one or more sensors are located in the BAM store area. In some examples, the one or more sensors that located outside of the BAM store area, but include a field of view (FOV) or range that includes at least a portion of the BAM store area.

At operation 410, the BAM store control system identifies, based on the sensor data, a first quantity of an object in a merchantable inventory area at a first time. In some examples, identifying the first quantity of the object in the merchantable inventory area at the first time can be performed by, and/or using information from, the product/service pose identification and tracking engine 148, the inventory management engine 168, or a combination thereof. The store inventory area may be referred to as the merchantable inventory.

In some examples, the one or more sensors include an image sensor. The sensor data includes one or more images captured by the image sensor. Identifying the first quantity of the object in the merchantable inventory area at the first time includes identifying the first quantity of visual representations (e.g., depictions) of the object in a first image of the merchantable inventory area captured by the image sensor at the first time. Identifying the second quantity of the object in the merchantable inventory area at the second time includes identifying the second quantity of visual representations (e.g., depictions) of the object in a second image of the merchantable inventory area captured by the image sensor at the second time.

At operation 415, the BAM store control system identifies, based on the sensor data, a second quantity of the object in the merchantable inventory area at a second time. In some examples, identifying the second quantity of the object in the merchantable inventory area at the second time can be performed by, and/or using information from, the product/service pose identification and tracking engine 148, the inventory management engine 168, or a combination thereof.

At operation 420, the BAM store control system automatically determines a pattern based on the first quantity of the object in the merchantable inventory area at the first time and the second quantity of the object in the merchantable inventory area at the second time. In some examples, determining the pattern can be performed by, and/or using information from, the product/service pose identification and tracking engine 148, the inventory management engine 168, the scheduling management engine 170, or a combination thereof. In some examples, determining the pattern includes determining an average rate at which the object decreases in quantity over time.

In some examples, the BAM store control system identifies, based on the sensor data, a third quantity of the object in the merchantable inventory area at a third time. Determining the pattern can include identifying one or more variations in a rate at which the object decreases in quantity over time based at least on the first quantity, the second quantity, and the third quantity.

At operation 425, the BAM store control system automatically generates a schedule for replenishing the object based on the pattern. In some examples, generating the schedule can be performed by, and/or using information from, the product/service pose identification and tracking engine 148, the inventory management engine 168, the scheduling management engine 170, or a combination thereof.

In some examples, the BAM store control system identifies, based on the sensor data, one or more high-traffic time periods during which the BAM store area has more than a threshold number of customers. Generating the schedule for replenishing the object can also be based on the one or more high-traffic time periods. For instance, the schedule for replenishing the object can avoid overlap between time period scheduled for replenishing the object and the one or more high-traffic time periods.

In some examples, the BAM store control system can identify that interface with one or more providers in a representative supply chain on behalf of its network of merchants. In such embodiments, the merchant 106 is available at a time corresponding to the schedule. The BAM store control system can send a notification to a merchant device 108 associated with the representative of the merchant 106. The notification can indicate that the representative of the merchant 106 has been assigned to replenish the object at a time that is based on the schedule.

In some examples, the BAM store control system can send a request to a supplier device associated with a supplier based on the schedule. The request can request that the supplier supply a replenishment quantity of the object to the merchant at a time that is based on the schedule. The replenishment quantity of the object can be a quantity to be used further adjust schedules for replenishing the object.

In some examples, the BAM store control system generates a supplier schedule for a supplier based on the schedule. The supplier schedule indicates periodic requests for the supplier to supply replenishment quantities of the object to the merchant at times that are based on the schedule. The replenishment quantities of the object are quantities to be used for replenishing the object. The BAM store control system can send the supplier schedule to a supplier device associated with the supply chain data.

Figure 5:
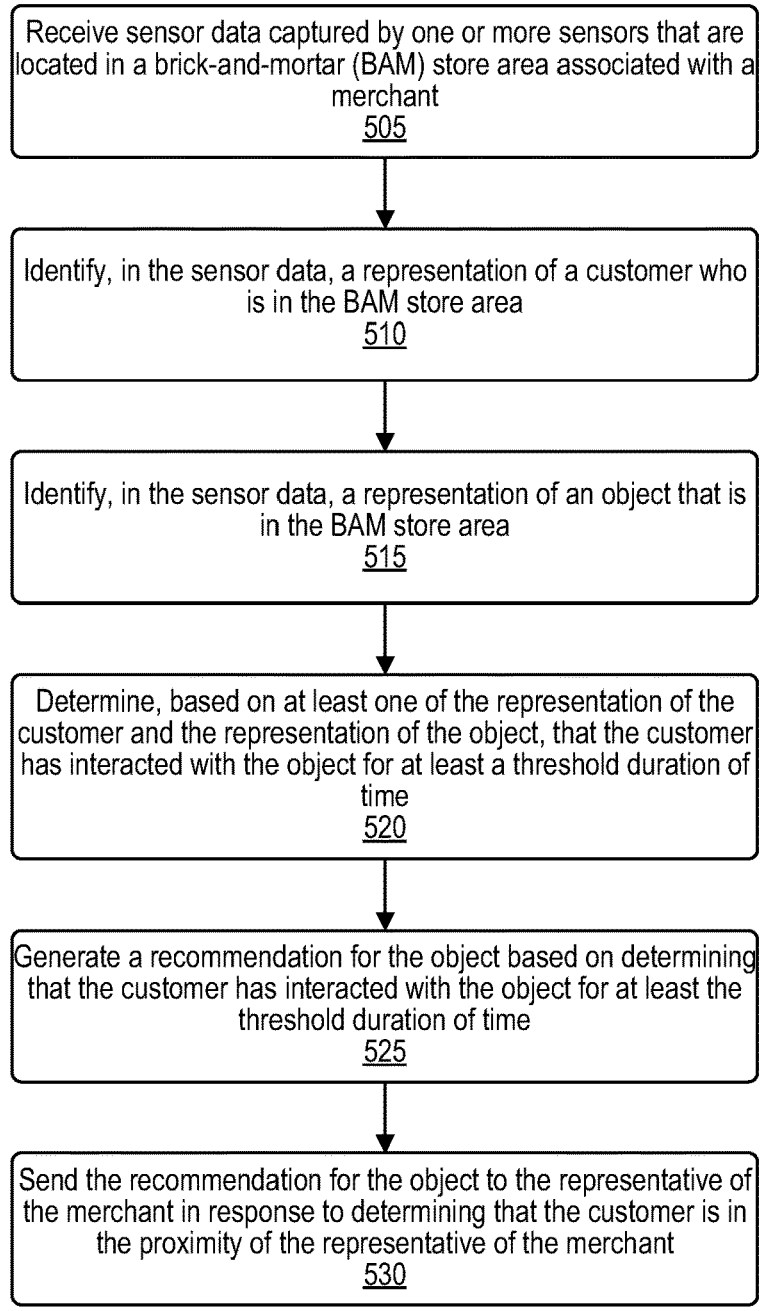
FIG. 5 is a flow diagram illustrating operations for automated recommendations.

FIG. 5 is a flow diagram illustrating operations 500 for automated recommendations. The operations 500 can refer to a system and/or process for automatic merchant recommendations in a BAM store based on sensor data. The operations 500 can be performed by a BAM store control system. The BAM store control system that performs the operations 500 can include, for example, at least a portion of the BAM store control system 100 of FIG. 1, the server computing devices 1302, the server computing devices 1310, the POS application 1318, the user device 1402, the servers 1404, the data store 1444, the BAM store control system that performs the operations 300, the BAM store control system that performs the operations 400, the BAM store control system that performs the operations 600, the BAM store control system that performs the operations 700, the BAM store control system that performs the operations 800, the BAM store control system that performs the operations 900, the BAM store control system that performs the operations 1000, the BAM store control system that performs the operations 1100, the BAM store control system that performs the operations 1200, the computing system 1500, or a combination thereof.

At operation 505, the BAM store control system receives sensor data captured by one or more sensors that are located in a BAM store area associated with a merchant. Examples of the sensors include the sensors 124 of FIG. 1, the one or more local wireless transceivers 126 of FIG. 1, some BAM store area devices 110 of FIG. 1, the sensors 215A-215K of FIGS. 2A-2H, and the device 220C and 220S of FIGS. 2A-2C and 2G-2H. Examples of the BAM store area of operation 505 include the inner BAM store area 205 of FIGS. 2A-2C, the outer BAM store area 210 of FIGS. 2A-2C, or a combination of both. Examples of the BAM store area of operation 505 include the inner BAM store area 230 of FIGS. 2D-2F, the outer BAM store area 235 of FIGS. 2D-2F, or a combination of both. Examples of the BAM store area of operation 505 include the first inner BAM store area 240 of FIGS. 2G-2H, the second inner BAM store area 250 of FIGS. 2G-2H, the store-within-store area 255 of FIGS. 2G-2H, the outer BAM store area 245 of FIGS. 2G-2H, or a combination thereof. In some examples, the sensor data can be received over one or more sensor connectors through which the BAM store control system is coupled to the one or more sensors. In some examples, the one or more sensors are located in the BAM store area. In some examples, the one or more sensors that located outside of the BAM store area, but include a field of view (FOV) or range that includes at least a portion of the BAM store area.

At operation 510, the BAM store control system identifies, in the sensor data, a representation of a customer 102 who is in the BAM store area. In some examples, the identification of the representation of the customer 102 in the sensor data can be performed by the customer pose identification and tracking engine 144 and/or the merchant pose identification and tracking engine 146. In some examples, the identification of the representation of the customer 102 in the sensor data can be performed using the AI platform 196.

At operation 515, the BAM store control system identifies, in the sensor data, a representation of an object that is in the BAM store area. The object may be, for example, an object associated with a product and/or service 112. In some examples, the identification of the representation of the object in the sensor data can be performed by the product/service pose identification and tracking engine 148. In some examples, the identification of the representation of an object in the sensor data can be performed using the AI platform 196.

In some examples, the one or more sensors include one or more image sensors. The sensor data can include one or more images captured by the one or more image sensors. Identifying the representation of the customer 102 and identifying the representation of the object can be performed using one or more object detection algorithms. Identifying the representation of the customer in the sensor data includes identifying a visual representation (e.g., depiction) of the customer in at least a first subset of the one or more images. Identifying the representation of the object in the sensor data includes identifying a visual representation (e.g., depiction) of the object in at least a second subset of the one or more images.

At operation 520, the BAM store control system determines, based on at least one of the representation of the customer and the representation of the object, that the customer has interacted with the object for at least a threshold duration of time. In some examples, determining that the customer has interacted with the object for at least the threshold duration of time is performed by the customer pose identification and tracking engine 144, the product/service pose identification and tracking engine 148, or a combination thereof.

In some examples, determining that the customer has interacted with the object for at least a threshold duration of time includes determining that the gaze of the customer 102 is trained in a direction of the object for at least the threshold duration of time.

In some examples, determining that the customer has interacted with the object for at least a threshold duration of time includes determining that the customer held the object for at least the threshold duration of time. In some examples, determining that the customer has interacted with the object for at least a threshold duration of time includes determining that the customer carried the object in hand or in a container for at least the threshold duration of time.

At operation 525, the BAM store control system generates a recommendation for the object based on determining that the customer has interacted with the object for at least the threshold duration of time. In some examples, the recommendation is generated using, and/or based on information from, the customer preferences and needs identification and tracking engine 156, the merchant preferences and needs identification and tracking engine 158, the customer history tracking engine 160, the merchant history tracking engine 162, the customer experience customization engine 164, the merchant experience customization engine 166, the inventory management engine 168, the scheduling management engine 170, or a combination thereof.

At operation 530, the BAM store control system sends the recommendation for the object to the representative of the merchant in response to determining that the customer is in the proximity of the representative of the merchant. In some examples, determining that the customer is in the proximity of the representative of the merchant can be based on determining that the customer device 104 is in proximity of the merchant device 108. In some examples, determining that the customer is in the proximity of the representative of the merchant is performed by the customer pose identification and tracking engine 144 and/or the merchant pose identification and tracking engine 146.

In some examples, determining that the customer is in the proximity of the representative of the merchant includes determining that a customer device associated with the customer is in wireless communication range of the merchant device associated with the merchant using one or more local wireless communications.

In some examples, the BAM store control system identifies, in the sensor data, a representation of the representative of the merchant in the BAM store area. The BAM store control system determines that the customer is in the proximity of the representative of the merchant is based on the representation of the customer and the representation of the representative of the merchant in the sensor data.

In some examples, the recommendation is text-based, wherein sending the recommendation to the merchant device causes the merchant device to display the recommendation. In some examples, the recommendation is audio-based, wherein sending the recommendation to the merchant device causes the merchant device to play the recommendation through an audio output device of the merchant device.

FIG. 6 is a flow diagram illustrating operations 600 for training a machine learning system based on feedback. The operations 600 can refer to a system and/or process for learning for object detection in a BAM store based on sensor data and feedback. The operations 600 can be performed by a BAM store control system. The BAM store control system that performs the operations 600 can include, for example, at least a portion of the BAM store control system 100 of FIG. 1, the server computing devices 1302, the server computing devices 1310, the POS application 1318, the user device 1402, the servers 1404, the data store 1444, the BAM store control system that performs the operations 300, the BAM store control system that performs the operations 400, the BAM store control system that performs the operations 500, the BAM store control system that performs the operations 700, the BAM store control system that performs the operations 800, the BAM store control system that performs the operations 900, the BAM store control system that performs the operations 1000, the BAM store control system that performs the operations 1100, the BAM store control system that performs the operations 1200, the computing system 1500, or a combination thereof.

At operation 605, the BAM store control system receives sensor data captured by one or more sensors that are located in a BAM store area associated with a merchant. Examples of the sensors include the sensors 124 of FIG. 1, the one or more local wireless transceivers 126 of FIG. 1, some BAM store area devices 110 of FIG. 1, the sensors 215A-215K of FIGS. 2A-2H, and the device 220C and 220S of FIGS. 2A-2C and 2G-2H. Examples of the BAM store area of operation 605 include the inner BAM store area 205 of FIGS. 2A-2C, the outer BAM store area 210 of FIGS. 2A-2C, or a combination of both. Examples of the BAM store area of operation 605 include the inner BAM store area 230 of FIGS. 2D-2F, the outer BAM store area 235 of FIGS. 2D-2F, or a combination of both. Examples of the BAM store area of operation 605 include the first inner BAM store area 240 of FIGS. 2G-2H, the second inner BAM store area 250 of FIGS. 2G-2H, the store-within-store area 255 of FIGS. 2G-2H, the outer BAM store area 245 of FIGS. 2G-2H, or a combination thereof. In some examples, the sensor data can be received over one or more sensor connectors through which the BAM store control system is coupled to the one or more sensors. In some examples, the one or more sensors are located in the BAM store area. In some examples, the one or more sensors that located outside of the BAM store area, but include a field of view (FOV) or range that includes at least a portion of the BAM store area.

In some examples, the one or more sensors include one or more image sensors. The sensor data can include one or more images captured by the one or more image sensors. Identifying the representation of the individual or object can be performed using one or more object detection algorithms. Identifying the representation of the individual or object in the sensor data includes identifying a visual representation (e.g., depiction) of the individual or object in at least a subset of the one or more images.

At operation 610, the BAM store control system identifies, in the sensor data, a representation of an individual or object in the BAM store area, in some cases using a machine learning (ML) system. The BAM store control system can determine an identity of the object based on the representation of the object in the sensor data, in some cases using the ML system. The individual may be a customer 102, a merchant, or a representative of a merchant 106. The object may be a product or service 102. The object may be an individual, such as a customer 102, a merchant, or a representative of a merchant 106. The identity of the object can include an identifier of the individual, such as a name, a status, a phone number, an address, an email address, payment information, other identifying information, or a combination thereof. The identifier of the individual can indicate that the individual is a representative of the merchant 106 and/or that the individual is a customer 102. The object may be a personal object of a customer 102, a merchant, or a representative of a merchant 106. The identity of the object can include an identifier of (or associated with) the product or service 112 to which the object pertains.

In some examples, the BAM store control system receives, from a merchant device, payment instrument information read from a payment instrument using a payment instrument reader of the merchant device. The BAM store control system can associate the payment instrument information with the identifier of the individual. In some examples, the BAM store control system can also identify a position of the object in the BAM area based on the representation of the object.

The machine learning system may include the AI platform 196 or an element thereof. The machine learning system may be part of the AI platform 196. The machine learning system may learn or be trained based on training data as discussed herein with respect to the learning management engine 178. The machine learning system may include one or more trained CNNs, one or more trained NNs, one or more trained SVMs, one or more other trained machine learning models, or a combination thereof. In some examples, the machine learning system can identify the representation of the individual or object in the sensor data using the customer pose identification and tracking engine 144 and/or the merchant pose identification and tracking engine 146 and/or the product/service pose identification and tracking engine 148. Identifying the representation of an individual or object in the BAM store area in the sensor data in operation 610 can include determining an identity of the individual or object based on the sensor data.

At operation 615, the BAM store control system sends, to a device, a request to confirm or dispute an identity of the individual or object identified in the sensor data. The device may be referred to as a feedback device. The request may be referred to as a feedback request or as a request for feedback. Confirmation and/or disputation of the identity of the individual or object (as in operations 615, 620, 625, 630, and/or 635) can be referred to as feedback. The device can be a customer device 104, a merchant device 108, a BAM store area device 110, a local server 188, a remote server 190, or a combination thereof.

At operation 620, the BAM store control system receives a response from the device. The response may include feedback, or may itself be referred to as feedback. In some examples, the response may be at least partially written by a customer 102, a representative of a merchant 106, a merchant, or another person. In some examples, the response may be generated based on a user interface interaction (e.g., pressing a confirm button or a dispute button) by a customer 102, a representative of a merchant 106, a merchant, or another person. In some examples, the response may be at least partially automatically generated based on sensor data from another sensor (other than the one or more sensors of operation 605) and/or based on the device's own analysis of the sensor data of operation 605 (separate from the identification of operation 610).

At operation 625, the BAM store control system determines whether the response from the device (received in operation 620) confirms the identity of the individual or object (identified in operation 610) or disputes the identity of the individual or object. If the BAM store control system determines that the response from the device confirms the identity of the individual or object, then operation 625 is followed by operation 630. If the BAM store control system determines that the response from the device disputes the identity of the individual or object, then operation 625 is followed by operation 635. Disputing the identity of the individual or object can include identifying that the identity of the individual or object is incorrect, identifying an alternate identity for the individual or object, identifying that the sensor data does not include any representation of the individual or object, or some combination thereof.

At operation 630, the BAM store control system trains the machine learning system further, using the sensor data and the confirmation of the identity of the individual or object as training data. Training the machine learning system further using the training data may include training the AI platform 196 using the training data. Training the machine learning system further using the training data may be performed using the learning management engine 178.

At operation 635, the BAM store control system trains the machine learning system further, using the sensor data and the dispute of the identity of the individual or object as training data. Training the machine learning system further using the training data may include training the AI platform 196 using the training data. Training the machine learning system further using the training data may be performed using the learning management engine 178.

In an illustrative example of the operations 600, the BAM store control system can identify, from camera data and using a machine learning system, that a specific customer 102 has entered the BAM store area, and can send a request to a merchant device 108 requesting that a representative of the merchant 106 confirm or dispute the BAM store control system's identification of the specific customer 102. The BAM store control system can train its using a machine learning system to better identify the specific customer 102 and/or other individuals or objects based on whether the representative of the merchant 106 confirms or disputes the BAM store control system's identification of the specific customer 102.

In another illustrative example of the operations 600, the BAM store control system can identify, from camera data and using a machine learning system, that a particular product (e.g., peanut butter) is running low on a merchantable area, and can send a request to a nearby customer device 104 requesting that a customer 102 confirm or dispute the BAM store control system's identification that the product is peanut butter and/or to confirm or dispute that the product is running low in the merchantable area. The BAM store control system can train its using a machine learning system to better identify the specific product and/or whether the product is running low and/or other individuals or objects based on whether the representative of the merchant 106 confirms or disputes the BAM store control system's identification of the product and/or of whether the product is running low.

Figure 7:
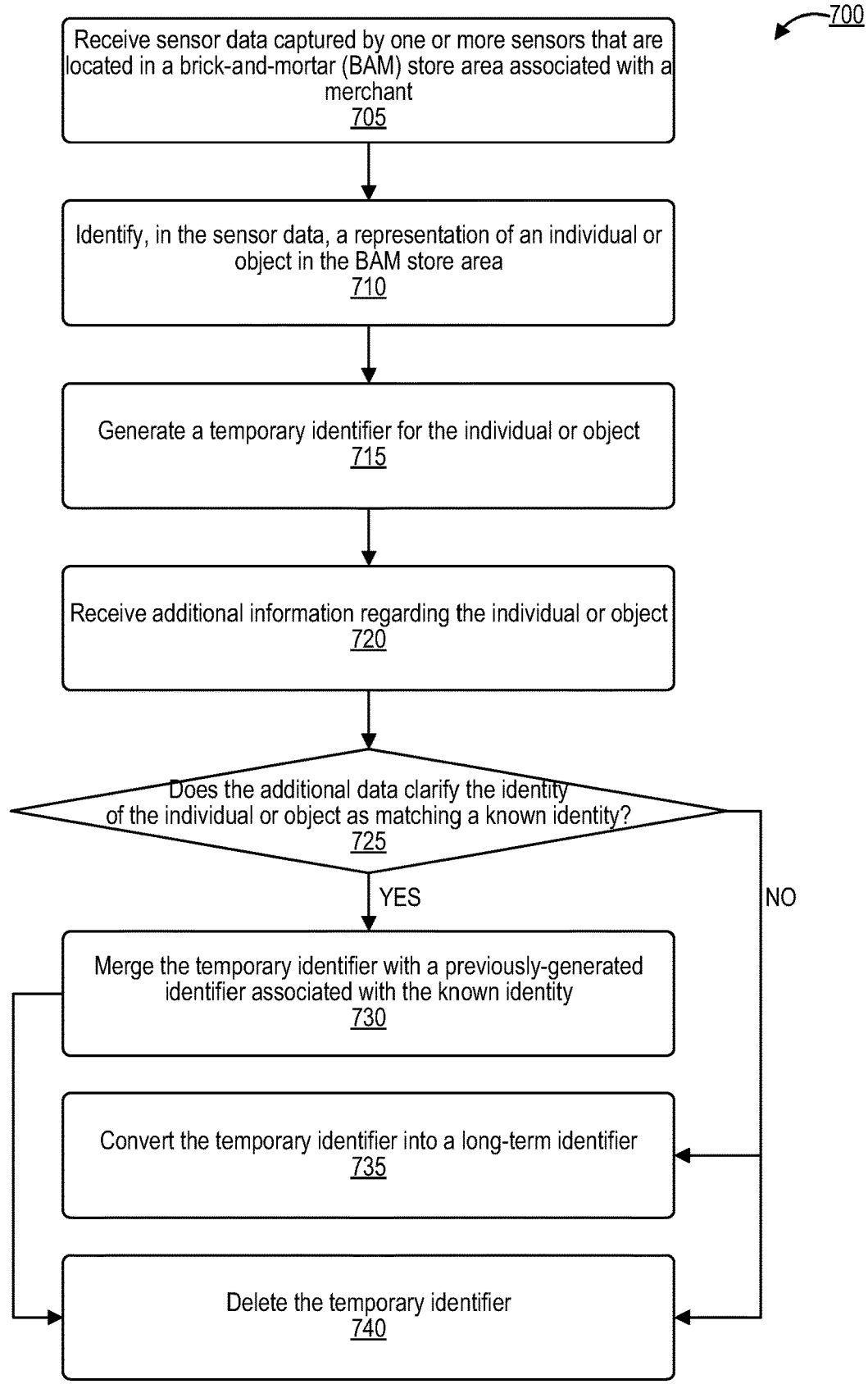
FIG. 7 is a flow diagram illustrating operations for generating and managing a temporary identifier for an individual or object.

FIG. 7 is a flow diagram illustrating operations 700 for generating and managing a temporary identifier for an individual or object. The operations 700 can refer to a system and/or process for automatic tracking of unrecognized objects in a BAM store based on sensor data. The operations 700 can be performed by a BAM store control system. The BAM store control system that performs the operations 700 can include, for example, at least a portion of the BAM store control system 100 of FIG. 1, the server computing devices 1302, the server computing devices 1310, the POS application 1318, the user device 1402, the servers 1404, the data store 1444, the BAM store control system that performs the operations 300, the BAM store control system that performs the operations 400, the BAM store control system that performs the operations 500, the BAM store control system that performs the operations 600, the BAM store control system that performs the operations 800, the BAM store control system that performs the operations 900, the BAM store control system that performs the operations 1000, the BAM store control system that performs the operations 1100, the BAM store control system that performs the operations 1200, the computing system 1500, or a combination thereof.

At operation 705, the BAM store control system receives sensor data captured by one or more sensors that are located in a BAM store area associated with a merchant. Examples of the sensors include the sensors 124 of FIG. 1, the one or more local wireless transceivers 126 of FIG. 1, some BAM store area devices 110 of FIG. 1, the sensors 215A-215K of FIGS. 2A-2H, and the device 220C and 220S of FIGS. 2A-2C and 2G-2H. Examples of the BAM store area of operation 705 include the inner BAM store area 205 of FIGS. 2A-2C, the outer BAM store area 210 of FIGS. 2A-2C, or a combination of both. Examples of the BAM store area of operation 705 include the inner BAM store area 230 of FIGS. 2D-2F, the outer BAM store area 235 of FIGS. 2D-2F, or a combination of both. Examples of the BAM store area of operation 705 include the first inner BAM store area 240 of FIGS. 2G-2H, the second inner BAM store area 250 of FIGS. 2G-2H, the store-within-store area 255 of FIGS. 2G-2H, the outer BAM store area 245 of FIGS. 2G-2H, or a combination thereof. In some examples, the sensor data can be received over one or more sensor connectors through which the BAM store control system is coupled to the one or more sensors. In some examples, the one or more sensors are located in the BAM store area. In some examples, the one or more sensors that located outside of the BAM store area, but include a field of view (FOV) or range that includes at least a portion of the BAM store area.

At operation 710, the BAM store control system identifies, in the sensor data, a representation of an individual or object in the BAM store area using a machine learning system. The individual or object may be referred to as an unrecognized and/or unknown individual or object. The individual may be a customer 102, a merchant, or a representative of a merchant 106. The object may be a product or service 102. The object may be a personal object of a customer 102, a merchant, or a representative of a merchant 106. In some examples, the identification of the representation of the individual or object in the sensor data can be performed by the customer pose identification and tracking engine 144 and/or the merchant pose identification and tracking engine 146 and/or the product/service identification and tracking engine 148. In some examples, the identification of the representation of the individual or object in the sensor data can be performed using the AI platform 196.

In some examples, the one or more sensors include one or more image sensors. The sensor data can include one or more images captured by the one or more image sensors. Identifying the representation of the individual or object can be performed using one or more object detection algorithms. Identifying the representation of the individual or object in the sensor data includes identifying a visual representation (e.g., depiction) of the individual or object in at least a subset of the one or more images.

At operation 715, the BAM store control system generates a temporary identifier for the individual or object. The temporary identifier can include a temporary name, number, code, or other identifier for the individual or object. The temporary identifier can be stored along with the representation of the individual or object in the sensor data (and/or other portions of the sensor data) and/or a pointer thereto.

At operation 720, the BAM store control system receives additional information regarding the individual or object. The additional information may be payment information. For example, the BAM store control system can receive payment information corresponding to the individual when the BAM store control system identifies, based on in the sensor data, that the individual is checking out and paying. The additional information may include secondary sensor data captured by one or more secondary sensors 124 and/or communication data from one or more wireless transceivers 126. The secondary sensor data may provide an alternate field of view of the individual or object and/or an alternate type of representation of the individual or object from a different type of sensor. The secondary sensors can include one or more scanners that scan one or more visual glyph on or associated with the object. The visual glyphs can include any type of glyphs 132 and can encode the additional information and/or a pointer (e.g., URI and/or URL) to the additional information. Each visual glyph can include a barcode, a quick response (QR) code, an Aztec code, a data matrix, and/or another type of glyph 132.

The communication data from one or more wireless transceivers 126 may include details of communications between the one or more wireless transceivers 126 and a device associated with the individual or object, such as a customer device 104, a merchant device 108, a BAM store area device 110, another set of one or more wireless transceivers 126 (e.g., an NFC tag or RFID tag), or a combination thereof. The additional information can be information provided from a customer device 102 and/or merchant device 108 that is input by a customer 102 or a representative of a merchant 106, or read or scanned by the customer device 102 and/or merchant device 108, that provides information (e.g., a name) of the individual or object.

At operation 725, the BAM store control system determines whether or not the additional data (received in operation 720) clarifies the identity of the individual or object as matching a known identity. If the BAM store control system determines that the additional data clarifies the identity of the individual or object as matching a known identity, then operation 725 is followed by operation 730. For example, payment data corresponding to the individual can clarify the identity of the individual or object as matching an identity of an owner of a payment instrument associated with the payment data. Additional sensor data may provide a field of view of the individual or object that clarifies the identity of the individual or object by providing a clearer or higher-quality view of one or more distinguishing features of the individual or object, such as a face of an individual or a label of an object. Communication data from one or more wireless transceivers 126 may clarify the identity of the individual or object by as matching an identity of an individual or object that owns or is coupled to a device (e.g., a merchant device 108, a BAM store area device 110, another set of one or more wireless transceivers 126) that the communication data indicates that the one or more wireless transceivers 126 have communicated with. Information provided by a customer 102 or representative of the merchant 106 via customer device 104 or merchant device 108 can identify the individual or object, or some attribute of the individual or object. Information read or scanned by the customer device 104 or merchant device 108 (e.g., a read or scanned membership card, payment card, or identification card) can identify the individual or object, or some attribute of the individual or object.

At operation 730, the BAM store control system merges the temporary identifier with a previously-generated identifier associated with the known identity matched in operation 725. Any data associated with the temporary identifier, such as the representation of the individual or object, the sensor data that includes the representation of the individual or object, the additional information, and/or any other information or data collected about the individual or object may be added to, appended to, and/or merged with information associated with the previously-generated identifier.

At operation 735, the BAM store control system converts the temporary identifier into a long-term identifier, for instance because the individual or object was is a new individual or object not matching any previously-known identity. The long-term identifier may stay in the BAM store control system and continue to accumulate more and more information about the individual or object over time.

At operation 740, the BAM store control system deletes the temporary identifier. In some examples, the BAM store control system may be set up, for instance based on privacy preferences, security preferences, and/or permissions, to delete temporary identifiers if the temporary identifiers are not found to match a known identifier within a predetermined duration of time.

In some examples, the BAM store control system can automatically identify a long-term identifier for the object based on the representation of an object in the sensor data and based on the additional information about the object. Identifying the long-term identifier can include identifying the long-term identifier that the temporary identifier is to be merged into in operation 730. Identifying the long-term identifier can include generating the long-term identifier and/or converting the temporary identifier into the long-term identifier as in operation 735.

In an illustrative example of the operations 700, a BAM store control system may identify "blob" in camera data, the "blob" being a representation of an individual or object having an unknown or uncertain identity. The BAM store control system can create a temporary identifier for the "blob." The BAM store control system may track the "blob" as it moves throughout the BAM store area, until the "blob" checks out at a merchant device 108. The BAM store control system may receive additional information from the merchant device 108, for instance from payment information read by the merchant device 108 or identification information read and/or input into the merchant device 108 (e.g., by customer 102 or representative of a merchant 106). The additional information may clarify that the "blob" is a known customer 102, who perhaps was not initially recognized in the sensor data because of a new hairstyle or outfit or an unusual angle or lighting conditions. The temporary identifier may then be merged into a previously-generated identifier for the known customer 102.

FIG. 8 is a flow diagram illustrating operations 800 for securely identifying whether matching data is stored in a data storage. The operations 800 can refer to a system and/or process for automatic recognition of sensitive information based on secure identifier(s). The operations 800 can be performed by a BAM store control system. The BAM store control system that performs the operations 800 can include, for example, at least a portion of the BAM store control system 100 of FIG. 1, the server computing devices 1302, the server computing devices 1310, the POS application 1318, the user device 1402, the servers 1404, the data store 1444, the BAM store control system that performs the operations 300, the BAM store control system that performs the operations 400, the BAM store control system that performs the operations 500, the BAM store control system that performs the operations 600, the BAM store control system that performs the operations 700, the BAM store control system that performs the operations 900, the BAM store control system that performs the operations 1000, the BAM store control system that performs the operations 1100, the BAM store control system that performs the operations 1200, the computing system 1500, or a combination thereof.

At operation 805, the BAM store control system receives first data from a device. The first data is associated with an individual. The device may be a customer device 102, a merchant device 108, a BAM store area device 110, a sensor 124, a wireless transceiver 126, or a combination thereof. The individual may be customer 102, a merchant, or a representative of a merchant 106.

At operation 810, the BAM store control system identifies first sensitive information in the first data. At operation 815, the BAM store control system generates and stores a first secure identifier for the first sensitive information at least in part by hashing, tokenizing, and/or encrypting the first sensitive information. Thus, the first secure identifier may be a hash of, a token of, and/or an encrypted form of the first sensitive information. In some cases, generation of the first secure identifier from the first sensitive information may be a one-way operation, in that it is difficult or impossible to recreate the first sensitive information from the first secure identifier. In some examples, the device includes a payment instrument reader, and the first sensitive information includes payment instrument information that the payment instrument reader reads from a payment instrument associated with the individual.

In some examples, the device includes one or more sensors and the first data includes sensor data captured by the one or more sensors. The first sensitive information can include a representation (e.g., depiction) of the individual in the sensor data. In some examples, to generate the first secure identifier for the first sensitive information, the BAM store control system extracts one or more features from the representation of the individual in the sensor data and generate the first secure identifier based on the one or more features extracted from the representation of the individual in the sensor data. The features can represent distinctive elements of the representation of the individual, such as eyes, nose, ears, mouth, hands, feet, legs, fingers, appendages, and the like. The features can represent edges, corners, blobs (e.g., relatively uniform areas), or combinations thereof. The features can be represented as vectors. The features can be extracted using the AI platform 196. In some examples, the one or more sensors include one or more image sensors, the sensor data includes one or more images, and the representation of the individual in the sensor data includes a depiction of the individual in at least one of the one or more images.

At operation 820, the BAM store control system receives second data from the device. In some examples, the BAM store control system receives the second data while the individual is in the BAM area. In some examples, the BAM store control system receives the second data while the individual is in a second BAM area. In some examples, the BAM store control system instead receives second data from a second device distinct from the device.

The second data includes second sensitive information. In some examples, at operation 820, the BAM store control system instead receives the second data from a second device other than the device of operation 805. At operation 825, the BAM store control system generates and stores a second secure identifier for the second sensitive information at least in part by hashing, tokenizing, and/or encrypting the second sensitive information. Thus, the second secure identifier may be a hash of, a token of, and/or an encrypted form of the second sensitive information. In some cases, generation of the second secure identifier from the second sensitive information may be a one-way operation, in that it is difficult or impossible to recreate the second sensitive information from the second secure identifier.

The first sensitive information and/or the second sensitive information may include, for example, payment data corresponding to a payment instrument and/or payment account of the individual, sensor data from one or more sensors 124 depicting or otherwise including a representation of a face or another identifying feature of the individual, biometric data (e.g., fingerprint data, voiceprint data, face scan data, iris scan data) for the individual, a social security number of the individual, a name of the individual, a birth date of the individual, a phone number of the individual, an email address of the individual, an address of the individual, other personal identifying information of the individual, or combinations thereof. In some examples, the one or more sensors are located in the BAM store area. In some examples, the one or more sensors that located outside of the BAM store area, but include a field of view (FOV) or range that includes at least a portion of the BAM store area.

At operation 830, the BAM store control system determines whether or not the second secure identifier (generated in operation 825) matches the first secure identifier (generated in operation 815). If the BAM store control system determines that the second secure identifier matches the first secure identifier, then operation 830 is followed by operation 835. If the BAM store control system determines that the second secure identifier differs from (does not match) the first secure identifier, then operation 830 is followed by operation 840.

At operation 835, the BAM store control system determines that the second sensitive data matches the first sensitive data based on the second secure identifier matching the first secure identifier.

At operation 840, the BAM store control system determines that the second sensitive data differs from (does not match) the first sensitive data based on the second secure identifier differing from (not matching) the first secure identifier.

The matching of the operations 800 may be useful for allowing the BAM store control system to store secure identifiers based on sensitive data rather than storing the sensitive data itself. This way, the BAM store control system can identify if the sensitive data is seen again while respecting privacy and/or security restrictions and limiting risk of sensitive data being stolen by a malicious party. For instance, payment information for customers 102, and/or facial feature data for customers 102 and/or representatives of merchants 106, can be stored as secure identifiers, so that the BAM store control system can recognize these when detected again at a later time. The sensitive data that is the basis of the secure identifiers can be deleted.

In some examples, to generate the first secure identifier for the first sensitive information, the BAM store control system encrypts the first sensitive information using an encryption key. To generate the second secure identifier for the second sensitive information, the BAM store control system encrypts the second sensitive information using the same encryption key. The encryption key can be a private key or a public key. The encryption key can be specific to the merchant, to the BAM store device, to the object, to a category of object, to the customer, or a combination thereof.

FIG. 9 is a flow diagram illustrating operations 900 for automatically requesting merchant assistance. The operations 900 can be performed by a BAM store control system. The BAM store control system that performs the operations 900 can include, for example, at least a portion of the BAM store control system 100 of FIG. 1, the server computing devices 1302, the server computing devices 1310, the POS application 1318, the user device 1402, the servers 1404, the data store 1444, the BAM store control system that performs the operations 300, the BAM store control system that performs the operations 400, the BAM store control system that performs the operations 500, the BAM store control system that performs the operations 600, the BAM store control system that performs the operations 700, the BAM store control system that performs the operations 800, the BAM store control system that performs the operations 1000, the BAM store control system that performs the operations 1100, the BAM store control system that performs the operations 1200, the computing system 1500, or a combination thereof.

At operation 905, the BAM store control system receives sensor data captured by one or more sensors that are located in a BAM store area associated with a merchant. Examples of the sensors include the sensors 124 of FIG. 1, the one or more local wireless transceivers 126 of FIG. 1, some BAM store area devices 110 of FIG. 1, the sensors 215A-215K of FIGS. 2A-2H, and the device 220C and 220S of FIGS. 2A-2C and 2G-2H. Examples of the BAM store area of operation 905 include the inner BAM store area 205 of FIGS. 2A-2C, the outer BAM store area 210 of FIGS. 2A-2C, or a combination of both. Examples of the BAM store area of operation 905 include the inner BAM store area 230 of FIGS. 2D-2F, the outer BAM store area 235 of FIGS. 2D-2F, or a combination of both. Examples of the BAM store area of operation 905 include the first inner BAM store area 240 of FIGS. 2G-2H, the second inner BAM store area 250 of FIGS. 2G-2H, the store-within-store area 255 of FIGS. 2G-2H, the outer BAM store area 245 of FIGS. 2G-2H, or a combination thereof. In some examples, the sensor data can be received over one or more sensor connectors through which the BAM store control system is coupled to the one or more sensors. In some examples, the one or more sensors are located in the BAM store area. In some examples, the one or more sensors that located outside of the BAM store area, but include a field of view (FOV) or range that includes at least a portion of the BAM store area.

At operation 910, the BAM store control system identifies, in the sensor data, a representation of an individual or object in the BAM store area. The individual may be a customer 102, a merchant, or a representative of a merchant 106. The object may be a product or service 102. The object may be a personal object of a customer 102, a merchant, or a representative of a merchant 106. In some examples, the identification of the representation of the individual or object in the sensor data can be performed by the customer pose identification and tracking engine 144 and/or the merchant pose identification and tracking engine 146 and/or the product/service identification and tracking engine 148. In some examples, the identification of the representation of the individual or object in the sensor data can be performed using the AI platform 196.

In some examples, the one or more sensors include one or more image sensors. The sensor data can include one or more images captured by the one or more image sensors. Identifying the representation of the individual or object can be performed using one or more object detection algorithms. Identifying the representation of the individual or object in the sensor data includes identifying a visual representation (e.g., depiction) of the individual or object in at least a subset of the one or more images.

At operation 915, the BAM store control system identifies, based on the individual or object, that the individual or object is in a condition that calls for merchant assistance. For instance, the BAM store control system can identify that an object associated with a product or service 112 is in a condition in which the object needs to be restocked, replenished, rearranged, reordered, moved, a corresponding price needs to be changed, or some combination thereof. The BAM store control system can identify that an individual, such as a customer 102, is in a condition in which he/she requires merchant assistance in finding a product or service 112, knowing which product or service 112 to purchase, purchasing one or more products or services 112, and/or other tasks identified herein that a customer 102 may need merchant assistance with. The BAM store control system can identify that an individual, such as a representative of a merchant 106, is in a condition in which he/she requires merchant assistance, for instance to move an object that is heavy and requires two people to move, or to open a door that requires a certain key or permission, or to perform a task that they are not experienced in.

At operation 920, the BAM store control system sends a request for merchant assistance corresponding to the condition of the individual or object (identified in operation 915) to a merchant device 108 associated with a representative of the merchant 106. In some examples, the merchant device 108 and/or the representative of the merchant 106 may be selected based on the merchant device 108 and/or the representative of the merchant 106 being near the individual or object. In some examples, the request may identify the individual or object. In some examples, the request may identify the condition.

At operation 925, the BAM store control system activates a BAM store area device 110 (e.g., a light, a speaker, a display) near the location of the individual or object to alert a representative of the merchant 106 that the condition of the individual or object calls for merchant assistance. In some cases, the BAM store area device 110 can output a particular output that corresponds to the condition, so that the representative of the merchant 106 can identify the condition based on the output. In some cases, the BAM store area device 110 can output a particular output that corresponds to the individual or object, so that the representative of the merchant 106 can identify the individual or object based on the output. In some cases, the BAM store area device 110 can output a particular output that corresponds to the representative of the merchant 106, so that the representative of the merchant 106 can identify the output corresponds to him/her (the representative of the merchant 106) based on the output.

In an illustrative example of the operations 900, the BAM store control system can identify that a particular product needs to be restocked, and can display, on a display screen in the BAM store area near the product, an alert identifying the product, the needs-to-be-restocked condition, and/or the name of a representative of the merchant 106 tasked with restocking the product. In a second illustrative example of the operations 900, the BAM store control system can identify that a particular customer 102 is having an issue with paying for a purchase, and can send, to a merchant device 108 of a representative of the merchant 106, a request to help the customer 102 that identifies the customer 102 and their condition (having an issue paying for the purchase).

FIG. 10 is a flow diagram illustrating operations 1000 for automatically setting a mode of a merchant device. The operations 1000 can be performed by a BAM store control system. The BAM store control system that performs the operations 1000 can include, for example, at least a portion of the BAM store control system 100 of FIG. 1, the server computing devices 1302, the server computing devices 1310, the POS application 1318, the user device 1402, the servers 1404, the data store 1444, the BAM store control system that performs the operations 300, the BAM store control system that performs the operations 400, the BAM store control system that performs the operations 500, the BAM store control system that performs the operations 600, the BAM store control system that performs the operations 700, the BAM store control system that performs the operations 800, the BAM store control system that performs the operations 900, the BAM store control system that performs the operations 1100, the BAM store control system that performs the operations 1200, the computing system 1500, or a combination thereof.

At operation 1005, the BAM store control system receives sensor data captured by one or more sensors that are located in a BAM store area associated with a merchant. Examples of the sensors include the sensors 124 of FIG. 1, the one or more local wireless transceivers 126 of FIG. 1, some BAM store area devices 110 of FIG. 1, the sensors 215A-215K of FIGS. 2A-2H, and the device 220C and 220S of FIGS. 2A-2C and 2G-2H. Examples of the BAM store area of operation 1005 include the inner BAM store area 205 of FIGS. 2A-2C, the outer BAM store area 210 of FIGS. 2A-2C, or a combination of both. Examples of the BAM store area of operation 1005 include the inner BAM store area 230 of FIGS. 2D-2F, the outer BAM store area 235 of FIGS. 2D-2F, or a combination of both. Examples of the BAM store area of operation 1005 include the first inner BAM store area 240 of FIGS. 2G-2H, the second inner BAM store area 250 of FIGS. 2G-2H, the store-within-store area 255 of FIGS. 2G-2H, the outer BAM store area 245 of FIGS. 2G-2H, or a combination thereof. In some examples, the sensor data can be received over one or more sensor connectors through which the BAM store control system is coupled to the one or more sensors. In some examples, the one or more sensors are located in the BAM store area. In some examples, the one or more sensors that located outside of the BAM store area, but include a field of view (FOV) or range that includes at least a portion of the BAM store area.

At operation 1010, the BAM store control system identifies, in the sensor data, a representation of a merchant device 108 that is in the BAM store area. In some examples, the identification of the representation of the merchant device 108 can be performed by the merchant pose identification and tracking engine 146. In some examples, the identification of the representation of the merchant device 108 in the sensor data can be performed using the AI platform 196. Operation 1010 can be followed by operation 1015 or operation 1025.

At operation 1015, the BAM store control system determines whether or not the sensor data includes a representation of a representative of the merchant 106 near the merchant device 108. In some examples, the identification of the representation of the representative of the merchant 106 can be performed by the merchant pose identification and tracking engine 146. In some examples, the identification of the representation of the representative of the merchant 106 in the sensor data can be performed using the AI platform 196. If the BAM store control system determines that the sensor data includes a representation of a representative of the merchant 106 near the merchant device 108, then operation 1015 is followed by operation 1020. If the BAM store control system determines that the sensor data does not include a representation of a representative of the merchant 106 near the merchant device 108, then operation 1015 is followed by operation 1025.

At operation 1025, the BAM store control system determines whether or not the sensor data includes a representation of a customer 102 near the merchant device 108. In some examples, the identification of the representation of the customer 102 can be performed by the customer pose identification and tracking engine 144. In some examples, the identification of the representation of the customer 102 in the sensor data can be performed using the AI platform 196. If the BAM store control system determines that the sensor data includes a representation of a customer 102 near the merchant device 108, then operation 1025 is followed by operation 1030. If the BAM store control system determines that the sensor data does not include a representation of a customer 102 near the merchant device 108, then operation 1025 can followed by either operation 1030 or operation 1015.

At operation 1020, the BAM store control system can set the merchant device 108 to be in merchant POS mode, in which the representative of the merchant 106 operates the merchant device 108.

At operation 1030, the BAM store control system can set the merchant device 108 to be in customer self-checkout kiosk, in which the customer 102 operates the merchant device 108 themselves.

In some examples, the one or more sensors include one or more image sensors. The sensor data can include one or more images captured by the one or more image sensors. Identifying the representation of the customer 102, the representative of the merchant 106, and/or the merchant device 108 can be performed using one or more object detection algorithms. Identifying the representation of the customer 102, the representative of the merchant 106, and/or the merchant device 108 in the sensor data includes identifying a visual representation (e.g., depiction) of the customer 102, the representative of the merchant 106, and/or the merchant device 108 in at least a first subset of the one or more images.

In an illustrative example of the operations 1000, the BAM store control system may determine that a representative of a merchant 106 is staffing a merchant device 108, which may operate in merchant POS mode while the representative of a merchant 106 is near the merchant device 108. The BAM store control system may determine that the representative of the merchant 106 has left the vicinity of (e.g., threshold radius around) the merchant device 108, and may set the merchant device 108 to a customer self-checkout kiosk mode, for instance in response to representative of the merchant 106 having left the vicinity of the merchant device 108, a customer 102 having entered the vicinity of the merchant device 108, or both.

Figure 11:
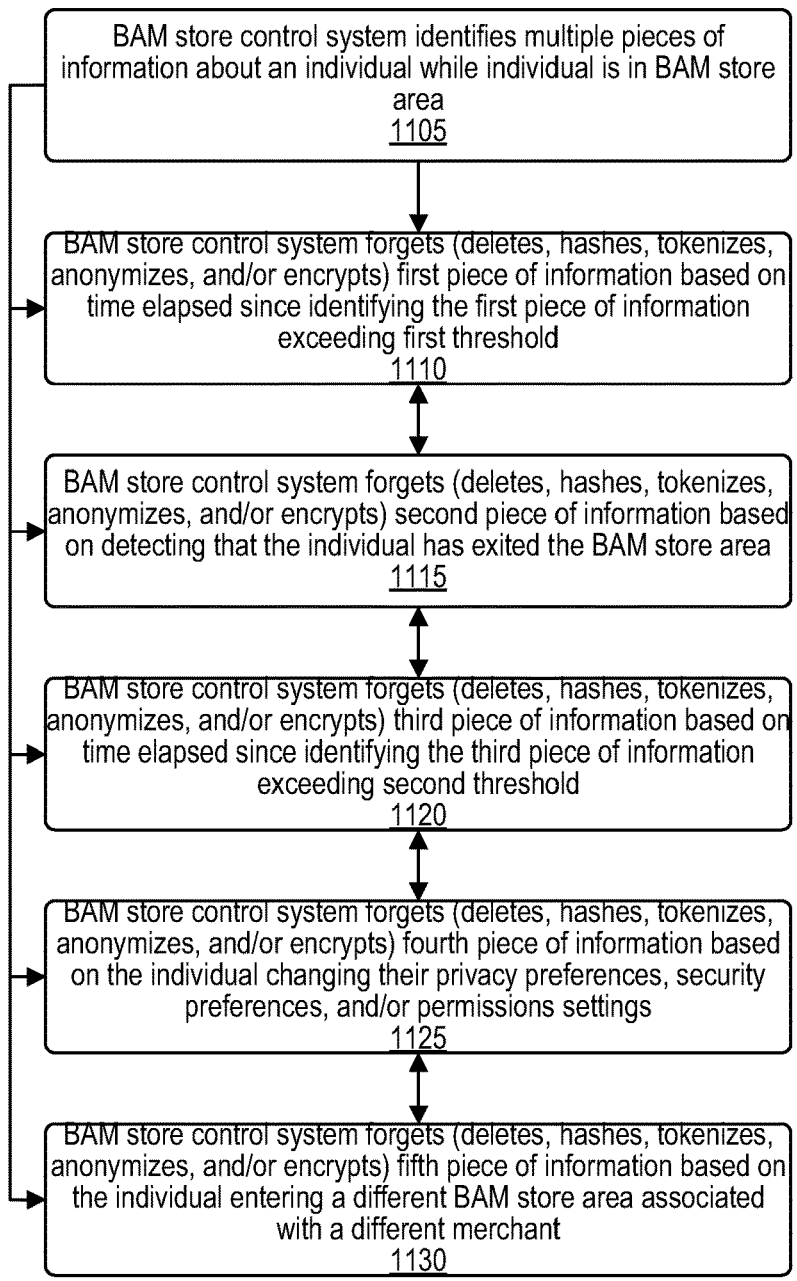
FIG. 11 is a flow diagram illustrating operations for automatically and gradually forgetting information about an individual.

FIG. 11 is a flow diagram illustrating operations 1100 for automatically and gradually forgetting information about an individual. The operations 1100 can be performed by a BAM store control system. The BAM store control system that performs the operations 1100 can include, for example, at least a portion of the BAM store control system 100 of FIG. 1, the server computing devices 1302, the server computing devices 1310, the POS application 1318, the user device 1402, the servers 1404, the data store 1444, the BAM store control system that performs the operations 300, the BAM store control system that performs the operations 400, the BAM store control system that performs the operations 500, the BAM store control system that performs the operations 600, the BAM store control system that performs the operations 700, the BAM store control system that performs the operations 800, the BAM store control system that performs the operations 900, the BAM store control system that performs the operations 1000, the BAM store control system that performs the operations 1200, the computing system 1500, or a combination thereof.

At operation 1105, the BAM store control system identifies multiple pieces of information about an individual, for example while the individual is in a BAM store area. The individual may be a customer 102, a merchant, or a representative of a merchant 106. The information can include any type of information identified about an individual discussed herein, including sensor data from one or more sensor(s) 124 that includes a representation of the individual, payment information, and the like. In some examples, the one or more sensors are located in the BAM store area. In some examples, the one or more sensors that located outside of the BAM store area, but include a field of view (FOV) or range that includes at least a portion of the BAM store area. Examples of the BAM store area of operation 1105 include the inner BAM store area 205 of FIGS. 2A-2C, the outer BAM store area 210 of FIGS. 2A-2C, or a combination of both. Examples of the BAM store area of operation 1105 include the inner BAM store area 230 of FIGS. 2D-2F, the outer BAM store area 235 of FIGS. 2D-2F, or a combination of both. Examples of the BAM store area of operation 1105 include the first inner BAM store area 240 of FIGS. 2G-2H, the second inner BAM store area 250 of FIGS. 2G-2H, the store-within-store area 255 of FIGS. 2G-2H, the outer BAM store area 245 of FIGS. 2G-2H, or a combination thereof.

At operation 1110, the BAM store control system forgets (e.g., deletes, hashes, tokenizes, anonymizes, and/or encrypts) a first piece of information (of the multiple pieces of information identified in operation 1105) based on (e.g. in response to) time elapsed since identifying the first piece of information exceeding a first threshold.

At operation 1115, the BAM store control system forgets (e.g., deletes, hashes, tokenizes, anonymizes, and/or encrypts) a second piece of information (of the multiple pieces of information identified in operation 1105) based on (e.g. in response to) detecting that the individual has exited the BAM store area (e.g., using the customer pose identification and tracking engine 146 and/or the merchant pose identification and tracking engine 148).

At operation 1120, the BAM store control system forgets (e.g., deletes, hashes, tokenizes, anonymizes, and/or encrypts) a third piece of information (of the multiple pieces of information identified in operation 1105) based on (e.g. in response to) time elapsed since identifying the third piece of information exceeding a second threshold.

At operation 1125, the BAM store control system forgets (e.g., deletes, hashes, tokenizes, anonymizes, and/or encrypts) a fourth piece of information (of the multiple pieces of information identified in operation 1105) based on (e.g. in response to) the individual changing their privacy preferences, security preferences, and/or permission settings (e.g., to request that information of a type that the fourth piece of information belongs to be forgotten).

At operation 1130, the BAM store control system forgets (e.g., deletes, hashes, tokenizes, anonymizes, and/or encrypts) a fifth piece of information (of the multiple pieces of information identified in operation 1105) based on (e.g. in response to) detecting that the individual has entered a different BAM store area (e.g., using the customer pose identification and tracking engine 146 and/or the merchant pose identification and tracking engine 148 and/or based on information received from a different BAM store control system corresponding to the different BAM store area).

In an illustrative example of the operations 1100, a BAM store control system may obtain multiple pieces of information about a customer 102, including sensor data from cameras that include visual representations (e.g., depictions) of the customer 102, payment data, information identifying that the customer 102 frequently purchases cookies, information indicating that the customer 102 just purchased milk, and information indicating that the customer 102 was looking at eggs while in the BAM store area. These BAM store control system may gradually forget (e.g., delete, hash, tokenize, anonymize, and/or encrypt) some of these different pieces of information as the customer 102 moves about the BAM store area, once the customer 102 leaves the BAM store area, and once the customer enters a second BAM store area. In one example, by the time the customer 102 enters the second BAM store area, the only information stored (and not forgotten) in the BAM store control system about the customer 102 from the initially-listed multiple pieces of information may be that the customer 102 frequently purchases cookies. Camera data and other data may be forgotten.

Figure 12:
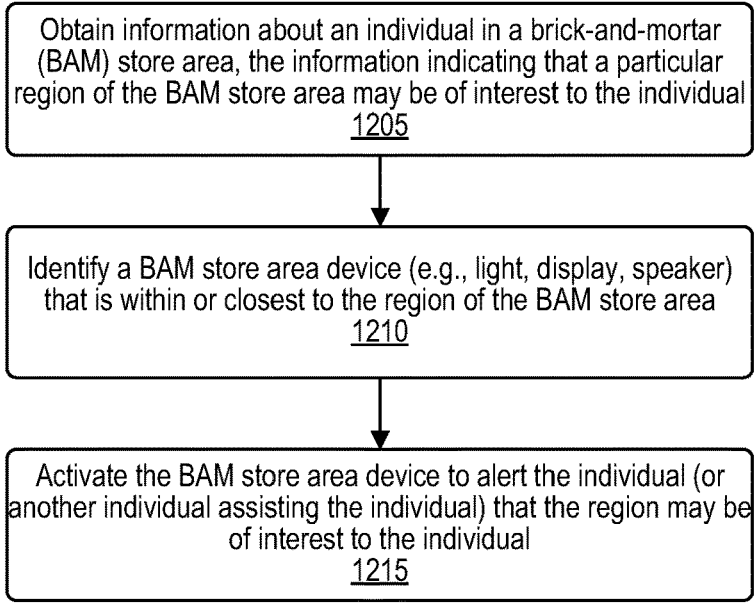
FIG. 12 is a flow diagram illustrating operations for automatically alerting an individual about a region of a brick-and-mortar (BAM) store area that may be of interest to the individual.

FIG. 12 is a flow diagram illustrating operations 1200 for automatically alerting an individual about a region of a brick-and-mortar (BAM) store area that may be of interest to the individual. The operations 1200 can be performed by a BAM store control system. The BAM store control system that performs the operations 1200 can include, for example, at least a portion of the BAM store control system 100 of FIG. 1, the server computing devices 1302, the server computing devices 1310, the POS application 1318, the user device 1402, the servers 1404, the data store 1444, the BAM store control system that performs the operations 300, the BAM store control system that performs the operations 400, the BAM store control system that performs the operations 500, the BAM store control system that performs the operations 600, the BAM store control system that performs the operations 700, the BAM store control system that performs the operations 800, the BAM store control system that performs the operations 900, the BAM store control system that performs the operations 1000, the BAM store control system that performs the operations 1100, the computing system 1500, or a combination thereof.

At operation 1205, the BAM store control system obtains information about an individual in a BAM store area. The information indicates that a particular region of the BAM store area may be of interest to the individual. The individual may be a customer 102, a merchant, or a representative of a merchant 106. The information can include any type of information identified about an individual discussed herein, including sensor data from one or more sensor(s) 124 that includes a representation of the individual, payment information, and the like. Examples of the BAM store area of operation 1205 include the inner BAM store area 205 of FIGS. 2A-2C, the outer BAM store area 210 of FIGS. 2A-2C, or a combination of both. In some examples, the one or more sensors are located in the BAM store area. In some examples, the one or more sensors that located outside of the BAM store area, but include a field of view (FOV) or range that includes at least a portion of the BAM store area. Examples of the BAM store area of operation 1105 include the inner BAM store area 230 of FIGS. 2D-2F, the outer BAM store area 235 of FIGS. 2D-2F, or a combination of both. Examples of the BAM store area of operation 1105 include the first inner BAM store area 240 of FIGS. 2G-2H, the second inner BAM store area 250 of FIGS. 2G-2H, the store-within-store area 255 of FIGS. 2G-2H, the outer BAM store area 245 of FIGS. 2G-2H, or a combination thereof. In some examples, the information may indicate that the individual is a customer 102, and that region of the BAM store area includes an object corresponding to a product or service 102 that the customer 102 has on their shopping list on their customer device 104 (or has otherwise expressed interest in or expressed that they are looking for). In some examples, the information may indicate that the individual is a representative of a merchant 102, and that region of the BAM store area includes an object corresponding to a product or service 102 that the representative of the merchant 102 should be restocked, replenished, rearranged, reordered, moved, a corresponding price needs to be changed, or some combination thereof. In some examples, the information may indicate that the individual is a representative of a merchant 102, and that region of the BAM store area includes a customer 102 that needs assistance.

At operation 1210, the BAM store control system activates a BAM store area device 110 (e.g., a light, a speaker, a display) that is within the region, or closest to the region, in the BAM store area. At operation 1225, the BAM store control system activates the BAM store area device 110 (e.g., light, speaker, display) in or near the region to alert the individual (and/or another individual assisting the individual) that the region may be of interest to the individual. In some cases, the BAM store area device 110 can output a particular output that corresponds to the reason why the region is of interest to the individual, so that the individual can identify the reason why the region is of interest to the individual based on the output. In some cases, the BAM store area device 110 can output a particular output that corresponds to the region (or a specific location within the region), so that the representative of the merchant 106 can identify the region (or a specific location within the region) based on the output. In some cases, the BAM store area device 110 can output a particular output that corresponds to the individual, so that the individual can identify the output corresponds to him/her (the individual) based on the output.

In an illustrative example of the operations 1200, the BAM store control system can identify that an individual—a customer 102—has milk on his/her shopping list on his/her customer device 104. The BAM store control system can illuminate a light, display an alert on a display, and/or play a sound on a speaker to alert the customer 102 as to the location of the aisle or other region that the milk is in. In another illustrative example of the operations 1200, the BAM store control system can identify that an individual—a representative of the merchant 106—is near a customer 102 that needs assistance. The BAM store control system can illuminate a light, display an alert on a display, and/or play a sound on a speaker to alert the representative of the merchant 106 as to the customer 102 that needs assistance.

In some cases, the BAM store control system that performs at least a subset of the operations 1200 can also perform at least a subset of the operations 300, 400, 500, 600, 700, 800, 900, 1000, and/or 1100. In some cases, the BAM store control system that performs at least a subset of the operations 1100 can also perform at least a subset of the operations 300, 400, 500, 600, 700, 800, 900, 1000, and/or 1200. In some cases, the BAM store control system that performs at least a subset of the operations 1000 can also perform at least a subset of the operations 300, 400, 500, 600, 700, 800, 900, 1100, and/or 1200. In some cases, the BAM store control system that performs at least a subset of the operations 900 can also perform at least a subset of the operations 300, 400, 500, 600, 700, 800, 1000, 1100, and/or 1200. In some cases, the BAM store control system that performs at least a subset of the operations 800 can also perform at least a subset of the operations 300, 400, 500, 600, 700, 900, 1000, 1100, and/or 1200. In some cases, the BAM store control system that performs at least a subset of the operations 700 can also perform at least a subset of the operations 300, 400, 500, 600, 800, 900, 1000, 1100, and/or 1200. In some cases, the BAM store control system that performs at least a subset of the operations 600 can also perform at least a subset of the operations 300, 400, 500, 700, 800, 900, 1000, 1100, and/or 1200. In some cases, the BAM store control system that performs at least a subset of the operations 500 can also perform at least a subset of the operations 300, 400, 600, 700, 800, 900, 1000, 1100, and/or 1200. In some cases, the BAM store control system that performs at least a subset of the operations 400 can also perform at least a subset of the operations 300, 500, 600, 700, 800, 900, 1000, 1100, and/or 1200. In some cases, the BAM store control system that performs at least a subset of the operations 300 can also perform at least a subset of the operations 400, 500, 600, 700, 800, 900, 1000, 1100, and/or 1200.

Figure 13:
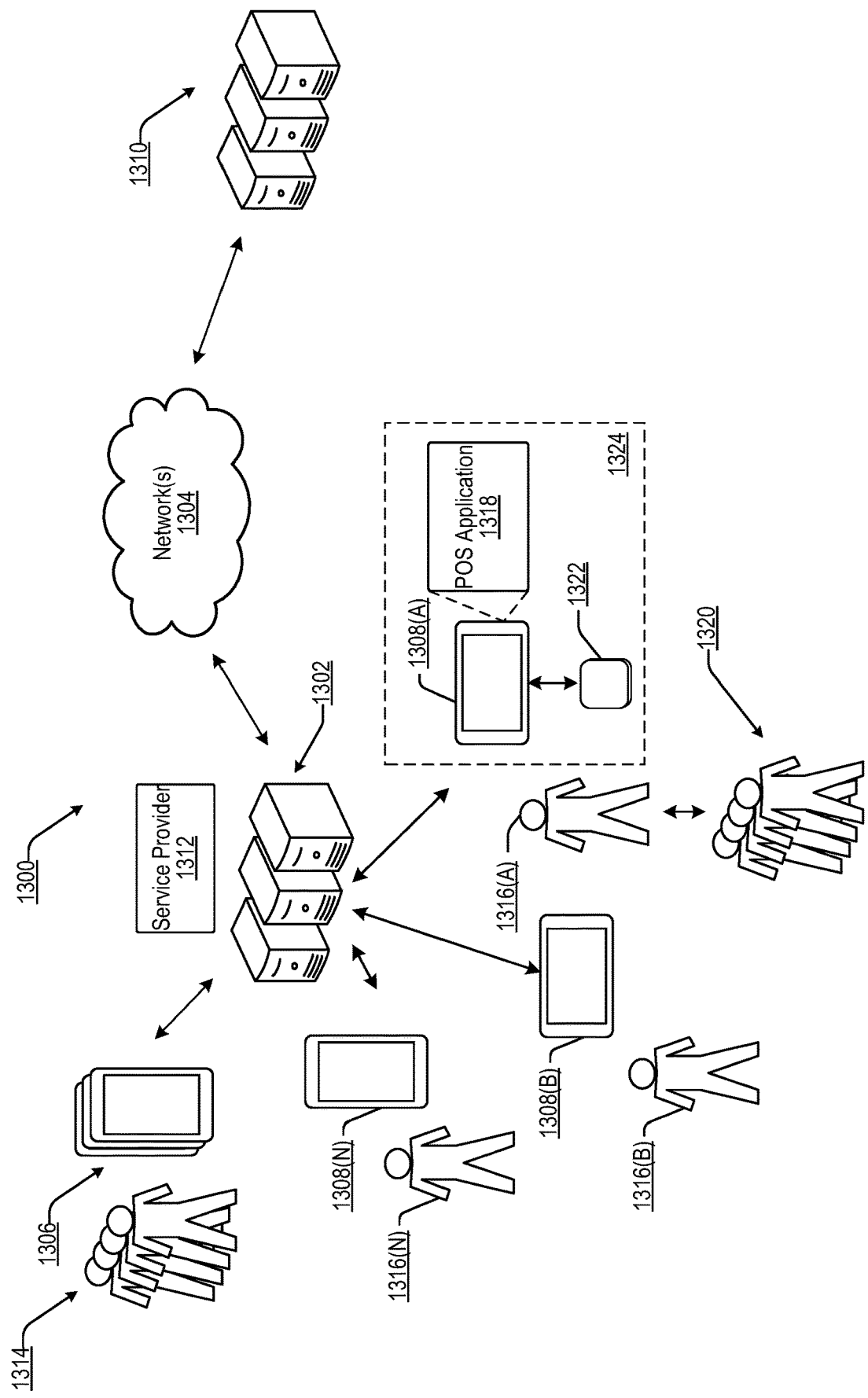
FIG. 13 is a block diagram illustrating an example environment.

FIG. 13 illustrates an example environment 1300. The environment 1300 includes server computing device(s) 1302 that can communicate over a network 1304 with user devices 1306 (which, in some examples can be merchant devices 1308 (individually, 1308(A)-608(N))) and/or server computing device(s) 1310 associated with third-party service provider(s). The server computing device(s) 1302 can be associated with a service provider 1312 that can provide one or more services for the benefit of users 1314, as described below. Actions attributed to the service provider 1312 can be performed by the server computing device(s) 1302.

In some examples, the BAM store control system 100 of FIG. 1 can include one or more of the server computing device(s) 1310. In some examples, the BAM store control system 100 of FIG. 1 can include one or more of the server computing device(s) 1302. In some examples, the user devices 1306 can include customer devices 104, merchant devices 108, and/or retail devices 110. In some examples, the server computing device(s) 1302, the server computing device(s) 1310, or a combination thereof perform at least a subset of the operations 300, 400, 500, 600, 700, 800, 900, 1000, 1100, and/or 1200 of FIGS. 3-12, respectively.

The environment 1300 can include a plurality of user devices 1306, as described above. Each one of the plurality of user devices 1306 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1314. The users 1314 can be referred to as customers, buyers, merchants, sellers, borrowers, employees, employers, payors, payees, couriers and so on. The users 1314 can interact with the user devices 1306 via user interfaces presented via the user devices 1306. In at least one example, a user interface can be presented via a web browser, or the like. In other examples, a user interface can be presented via an application, such as a mobile application or desktop application, which can be provided by the service provider 1312 or which can be an otherwise dedicated application. In some examples, individual of the user devices 1306 can have an instance or versioned instance of an application, which can be downloaded from an application store, for example, which can present the user interface(s) described herein. In at least one example, a user 1314 can interact with the user interface via touch input, spoken input, or any other type of input.

As described above, in at least one example, the users 1314 can include merchants 1316 (individually, 1316(A)-616(N)). In an example, the merchants 1316 can operate respective merchant devices 1308, which can be user devices 1306 configured for use by merchants 1316. For the purpose of this discussion, a "merchant" can be any entity that offers items (e.g., goods or services) for purchase or other means of acquisition (e.g., rent, borrow, barter, etc.). The merchants 1316 can offer items for purchase or other means of acquisition via brick-and-mortar stores, mobile stores (e.g., pop-up shops, food trucks, etc.), online stores, combinations of the foregoing, and so forth. In some examples, at least some of the merchants 1316 can be associated with a same entity but can have different merchant locations and/or can have franchise/franchisee relationships. In additional or alternative examples, the merchants 1316 can be different merchants. That is, in at least one example, the merchant 1316(A) is a different merchant than the merchant 1316(B) and/or the merchant 1316(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1308 can have an instance of a POS application 1318 stored thereon. The POS application 1318 can configure the merchant device 1308 as a POS terminal, which enables the merchant 1316(A) to interact with one or more customers 1320. As described above, the users 1314 can include customers, such as the customers 1320 shown as interacting with the merchant 1316(A). For the purpose of this discussion, a "customer" can be any entity that acquires items from merchants. While only two customers 1320 are illustrated in FIG. 13, any number of customers 1320 can interact with the merchants 1316. Further, while FIG. 13 illustrates the customers 1320 interacting with the merchant 1316(A), the customers 1320 can interact with any of the merchants 1316.

In at least one example, interactions between the customers 1320 and the merchants 1316 that involve the exchange of funds (from the customers 1320) for items (from the merchants 1316) can be referred to as "POS transactions" and/or "transactions." In at least one example, the POS application 1318 can determine transaction data associated with the POS transactions. Transaction data can include payment information, which can be obtained from a reader device 1322 associated with the merchant device 1308(A), user authentication data, purchase amount information, point-of-purchase information (e.g., item(s) purchased, date of purchase, time of purchase, etc.), etc. The POS application 1318 can send transaction data to the server computing device(s) 1302. Furthermore, the POS application 1318 can present a UI to enable the merchant 1316(A) to interact with the POS application 1318 and/or the service provider 1312 via the POS application 1318.

In at least one example, the merchant device 1308(A) can be a special-purpose computing device configured as a POS terminal (via the execution of the POS application 1318). In at least one example, the POS terminal may be connected to a reader device 1322, which is capable of accepting a variety of payment instruments, such as credit cards, debit cards, gift cards, short-range communication based payment instruments, and the like, as described below. In at least one example, the reader device 1322 can plug in to a port in the merchant device 1308(A), such as a microphone port, a headphone port, an audio-jack, a data port, or other suitable port. In additional or alternative examples, the reader device 1322 can be coupled to the merchant device 1308(A) via another wired or wireless connection, such as via a Bluetooth®, BLE, and so on. Additional details are described below with reference to FIG. 14. In some examples, the reader device 1322 can read information from alternative payment instruments including, but not limited to, wristbands and the like.

In some examples, the reader device 1322 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1322, and communicate with the server computing device(s) 1302, which can provide, among other services, a payment processing service. The server computing device(s) 1302 associated with the service provider 1312 can communicate with server computing device(s) 1310, as described below. In this manner, the POS terminal and reader device 1322 may collectively process transaction(s) between the merchants 1316 and customers 1320. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, the POS terminal and the reader device 1322 of the POS system 1324 are shown as separate devices, in additional or alternative examples, the POS terminal and the reader device 1322 can be part of a single device. In some examples, the reader device 1322 can have a display integrated therein for presenting information to the customers 1320. In additional or alternative examples, the POS terminal can have a display integrated therein for presenting information to the customers 1320. POS systems, such as the POS system 1324, may be mobile, such that POS terminals and reader devices may process transactions in disparate locations across the world. POS systems can be used for processing card-present transactions and card-not-present (CNP) transactions, as described below.

A card-present transaction is a transaction where both a customer 1320 and his or her payment instrument are physically present at the time of the transaction. Card-present transactions may be processed by swipes, dips, taps, or any other interaction between a physical payment instrument (e.g., a card), or otherwise present payment instrument, and a reader device 1322 whereby the reader device 1322 is able to obtain payment data from the payment instrument. A swipe is a card-present transaction where a customer 1320 slides a card, or other payment instrument, having a magnetic strip through a reader device 1322 that captures payment data contained in the magnetic strip. A dip is a card-present transaction where a customer 1320 inserts a payment instrument having an embedded microchip (i.e., chip) into a reader device 1322 first. The dipped payment instrument remains in the payment reader until the reader device 1322 prompts the customer 1320 to remove the card, or other payment instrument. While the payment instrument is in the reader device 1322, the microchip can create a one-time code which is sent from the POS system 1324 to the server computing device(s) 1310 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1320 may tap or hover his or her payment instrument (e.g., card, electronic device such as a smart phone running a payment application, etc.) over a reader device 1322 to complete a transaction via short-range communication (e.g., NFC, RFID, Bluetooth®, BLE, etc.). Short-range communication enables the payment instrument to exchange information with the reader device 1322. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1324, the server computing device(s) 1302, and/or the server computing device(s) 1310 may exchange payment information and transaction data to determine whether transactions are authorized. For example, the POS system 1324 may provide encrypted payment data, user authentication data, purchase amount information, point-of-purchase information, etc. (collectively, transaction data) to server computing device(s) 1302 over the network(s) 1304. The server computing device(s) 1302 may send the transaction data to the server computing device(s) 1310. As described above, in at least one example, the server computing device(s) 1310 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 1310 associated therewith) can send a fund transfer request to a server computing device of a card payment network (e.g., Mastercard®, VISA®, etc.) to determine whether the transaction is authorized or deficient. In at least one example, the service provider 1312 can serve as an acquirer and connect directly with the card payment network.

The card payment network (e.g., the server computing device(s) 1310 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1310 associated therewith) can make a determination as to whether the customer has the capacity to absorb the relevant charge associated with the payment transaction. In at least one example, the service provider 1312 can serve as an issuer and/or can partner with an issuer. The transaction is either approved or rejected by the issuer and/or the card payment network (e.g., the server computing device(s) 1310 associated therewith), and a payment authorization message is communicated from the issuer to the POS device via a path opposite of that described above, or via an alternate path.

As described above, the server computing device(s) 1310, which can be associated with payment service provider(s), may determine whether the transaction is authorized based on the transaction data, as well as information relating to parties to the transaction (e.g., the customer 1320 and/or the merchant 1316(A)). The server computing device(s) 1310 may send an authorization notification over the network(s) 1304 to the server computing device(s) 1302, which may send the authorization notification to the POS system 1324 over the network(s) 1304 to indicate whether the transaction is authorized. The server computing device(s) 1302 may also transmit additional information such as transaction identifiers to the POS system 1324. In one example, the server computing device(s) 1302 may include a merchant application and/or other functional components for communicating with the POS system 1324 and/or the server computing device(s) 1310 to authorize or decline transactions.

Based on the authentication notification that is received by the POS system 1324 from server computing device(s) 1302, the merchant 1316(A) may indicate to the customer 1320 whether the transaction has been approved. In some examples, approval may be indicated at the POS system 1324, for example, at a display of the POS system 1324. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1312 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 1314 can access all of the services of the service provider 1312. In other examples, the users 1314 can have gradated access to the services, which can be based on risk tolerance, IDV outputs, subscriptions, and so on. In at least one example, access to such services can be availed to the merchants 1316 via the POS application 1318. In additional or alternative examples, each service can be associated with its own access point (e.g., application, web browser, etc.).

The service provider 1312 can offer payment processing services for processing payments on behalf of the merchants 1316, as described above. For example, the service provider 1312 can provision payment processing software, payment processing hardware and/or payment processing services to merchants 1316, as described above, to enable the merchants 1316 to receive payments from the customers 1320 when conducting POS transactions with the customers 1320. For instance, the service provider 1312 can enable the merchants 1316 to receive cash payments, payment card payments, and/or electronic payments from customers 1320 for POS transactions and the service provider 1312 can process transactions on behalf of the merchants 1316.

As the service provider 1312 processes transactions on behalf of the merchants 1316, the service provider 1312 can maintain accounts or balances for the merchants 1316 in one or more ledgers. For example, the service provider 1312 can analyze transaction data received for a transaction to determine an amount of funds owed to a merchant 1316(A) for the transaction. In at least one example, such an amount can be a total purchase price less fees charged by the service provider 1312 for providing the payment processing services. Based on determining the amount of funds owed to the merchant 1316(A), the service provider 1312 can deposit funds into an account of the merchant 1316(A). The account can have a stored balance, which can be managed by the service provider 1312. The account can be different from a conventional bank account at least because the stored balance is managed by a ledger of the service provider 1312 and the associated funds are accessible via various withdrawal channels including, but not limited to, scheduled deposit, same-day deposit, instant deposit, and a linked payment instrument.

A scheduled deposit can occur when the service provider 1312 transfers funds associated with a stored balance of the merchant 1316(A) to a bank account of the merchant 1316(A) that is held at a bank or other financial institution (e.g., associated with the server computing device(s) 1310). Scheduled deposits can occur at a prearranged time after a POS transaction is funded, which can be a business day after the POS transaction occurred, or sooner or later. In some examples, the merchant 1316(A) can access funds prior to a scheduled deposit. For instance, the merchant 1316(A) may have access to same-day deposits (e.g., wherein the service provider 1312 deposits funds from the stored balance to a linked bank account of the merchant on a same day as POS transaction, in some examples prior to the POS transaction being funded) or instant deposits (e.g., wherein the service provider 1312 deposits funds from the stored balance to a linked bank account of the merchant on demand, such as responsive to a request). Further, in at least one example, the merchant 1316(A) can have a payment instrument that is linked to the stored balance that enables the merchant to access the funds without first transferring the funds from the account managed by the service provider 1312 to the bank account of the merchant 1316(A).

In at least one example, the service provider 1312 may provide inventory management services. That is, the service provider 1312 may provide inventory tracking and reporting. Inventory management services may enable the merchant 1316(A) to access and manage a database storing data associated with a quantity of each item that the merchant 1316(A) has available (i.e., an inventory). Furthermore, in at least one example, the service provider 1312 can provide catalog management services to enable the merchant 1316(A) to maintain a catalog, which can be a database storing data associated with items that the merchant 1316(A) has available for acquisition (i.e., catalog management services). In at least one example, the catalog may include a plurality of data items and a data item of the plurality of data items may represent an item that the merchant 1361(A) has available for acquisition. The service provider 1312 can offer recommendations related to pricing of the items, placement of items on the catalog, and multi-party fulfilment of the inventory. In at least one example, the service provider 1312 can provide business banking services, which allow the merchant 1316(A) to track deposits (from payment processing and/or other sources of funds) into an account of the merchant 1316(A), payroll payments from the account (e.g., payments to employees of the merchant 1316(A)), payments to other merchants (e.g., business-to-business) directly from the account or from a linked debit card, withdrawals made via scheduled deposit and/or instant deposit, etc. Furthermore, the business banking services can enable the merchant 1316(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1316 to visualize their cash flow to track their financial health, set aside money for upcoming obligations (e.g., savings), organize money around goals, etc.

In at least one example, the service provider 1312 can provide financing services and products, such as via business loans, consumer loans, fixed term loans, flexible term loans, and the like. In at least one example, the service provider 1312 can utilize one or more risk signals to determine whether to extend financing offers and/or terms associated with such financing offers.

In at least one example, the service provider 1312 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 1312 can offer different types of capital loan products. For instance, in at least one example, the service provider 1312 can offer a daily repayment loan product, wherein a capital loan is repaid daily, for instance, from a portion of transactions processed by the payment processing service on behalf of the borrower. Additionally and/or alternatively, the service provider 1312 can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider 1312 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1316. The service provider 1312 can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider 1312 (e.g., from payments owed to the merchant from payments processed on behalf of the merchant, funds transferred to the merchant, etc.). The service provider 1312 can offer specific financial products, such as payment instruments, tied specifically to the loan products. For example, in one implementation, the server provider 1312 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 1312 can provide web-development services, which enable users 1314 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1316. In at least one example, the service provider 1312 can recommend and/or generate content items to supplement omni-channel presences of the merchants 1316. That is, if a merchant of the merchants 1316 has a web page, the service provider 1312—via the web-development or other services—can recommend and/or generate additional content items to be presented via other channel(s), such as social media, email, etc.

Furthermore, the service provider 1312 can provide payroll services to enable employers to pay employees for work performed on behalf of employers. In at least one example, the service provider 1312 can receive data that includes time worked by an employee (e.g., through imported timecards and/or POS interactions), sales made by the employee, gratuities received by the employee, and so forth. Based on such data, the service provider 1312 can make payroll payments to employee(s) on behalf of an employer via the payroll service. For instance, the service provider 1312 can facilitate the transfer of a total amount to be paid out for the payroll of an employee from the bank of the employer to the bank of the service provider 1312 to be used to make payroll payments. In at least one example, when the funds have been received at the bank of the service provider 1312, the service provider 1312 can pay the employee, such as by check or direct deposit, often a day, a week, or more after when the work was actually performed by the employee. In additional or alternative examples, the service provider 1312 can enable employee(s) to receive payments via same-day or instant deposit based at least in part on risk and/or reliability analyses performed by the service provider 1312.

Moreover, in at least one example, the service provider 1312 can provide employee management services for managing schedules of employees. Further, the service provider 1312 can provide appointment services for enabling users 1314 to set schedules for scheduling appointments and/or users 1314 to schedule appointments.

In some examples, the service provider 1312 can provide restaurant management services to enable users 1314 to make and/or manage reservations, to monitor front-of-house and/or back-of-house operations, and so on. In such examples, the merchant device(s) 1308 and/or server computing device(s) 1302 can be configured to communicate with one or more other computing devices, which can be located in the front-of-house (e.g., POS device(s)) and/or back-of-house (e.g., kitchen display system(s) (KDS)). In at least one example, the service provider 1312 can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider 1312 can provide fulfilment services, which can use couriers for delivery, wherein couriers can travel between multiple locations to provide delivery services, photography services, etc. Couriers can be users 1314 who can travel between locations to perform services for a requesting user 1314 (e.g., deliver items, capture images, etc.). In some examples, the courier can receive compensation from the service provider 1312. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 1312 can receive requests for courier services, automatically assign the requests to active couriers, and communicate dispatch instructions to couriers via user interface (e.g., application, web browser, or other access point) presented via respective devices 1306.

In some examples, the service provider 1312 can provide omni-channel fulfillment services. For instance, if a customer places an order with a merchant and the merchant cannot fulfill the order because one or more items are out of stock or otherwise unavailable, the service provider 1312 can leverage other merchants and/or sales channels that are part of the platform of the service provider 1312 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider 1312 can enable conversational commerce via conversational commerce services, which can use one or more machine learning mechanisms to analyze messages exchanged between two or more users 1314, voice inputs into a virtual assistant or the like, to determine intents of user(s) 1314. In some examples, the service provider 1312 can utilize determined intents to automate customer service, offer promotions, provide recommendations, or otherwise interact with customers in real-time. In at least one example, the service provider 1312 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, the service provider 1312 can provide a peer-to-peer payment service that enables peer-to-peer payments between two or more users 1314. In at least one example, the service provider 1312 can communicate with instances of a payment application (or other access point) installed on devices 1306 configured for operation by users 1314. In an example, an instance of the payment application executing on a first device operated by a payor can send a request to the service provider 1312 to transfer an amount of funds (e.g., fiat currency or non-fiat currency such as cryptocurrency, securities, and related assets) from an account of the payor to an account of a payee (e.g., a peer-to-peer payment). The service provider 1312 can facilitate the transfer and can send a notification to an instance of the payment application executing on a second mobile device operated by the payee that the transfer is in process (or has been completed). In some examples, the service provider 1312 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 1312 funds the request to payee on behalf of the payor, to speed up the transfer process and compensate for any lags that may be attributed to payor's financial network.

In some implementations, the service provider 1312 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The peer-to-peer process can be initiated through a particular application executing on the user devices 1306.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 1312. For instance, the service provider 1312 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1306 (e.g., mobile device or conventional personal computer (PC)) based on instructions transmitted to and from the server computing device(s) 1302 (which, in such an example can be called a "messaging server"). In some instances, the messaging application can include a payment application with messaging capability that enables users of the payment application to communicate with one another. In such instances, the payment application can be executed on the a user device 1306 based on instructions transmitted to and from the server computing device(s) 1302 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 1312 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 1314 may be new to the service provider 1312 such that the user 1314 that has not registered (e.g., subscribed to receive access to one or more services offered by the service provider) with the service provider 1312. The service provider 1312 can offer onboarding services for registering a potential user 1314 with the service provider 1312. In some examples, onboarding can involve presenting various questions, prompts, and the like to a potential user 1314 to obtain information that can be used to generate a profile for the potential user 1314. In at least one example, the service provider 1312 can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1314 providing all necessary information, the potential user 1314 can be onboarded to the service provider 1312. In such an example, any limited or short-term access to services of the service provider 1312 can be transitioned to more permissive (e.g., less limited) or longer-term access to such services.

The service provider 1312 can be associated with IDV services, which can be used by the service provider 1312 for compliance purposes and/or can be offered as a service, for instance to third-party service providers (e.g., associated with the server computing device(s) 1310). That is, the service provider 1312 can offer IDV services to verify the identity of users 1314 seeking to use or using their services. Identity verification requires a customer (or potential customer) to provide information that is used by compliance departments to prove that the information is associated with an identity of a real person or entity. In at least one example, the service provider 1312 can perform services for determining whether identifying information provided by a user 1314 accurately identifies the customer (or potential customer) (i.e., Is the customer who they say they are?).

The service provider 1312 is capable of providing additional or alternative services and the services described above are offered as a sampling of services. In at least one example, the service provider 1312 can exchange data with the server computing device(s) 1310 associated with third-party service providers. Such third-party service providers can provide information that enables the service provider 1312 to provide services, such as those described above. In additional or alternative examples, such third-party service providers can access services of the service provider 1312. That is, in some examples, the third-party service providers can be subscribers, or otherwise access, services of the service provider 1312.

Techniques described herein can be configured to operate in both real-time/online and offline modes. "Online" modes refer to modes when devices are capable of communicating with the service provider 1312 (e.g., the server computing device(s) 1302) and/or the server computing device(s) 1310 via the network(s) 1304. In some examples, the merchant device(s) 1308 are not capable of connecting with the service provider 1312 (e.g., the server computing device(s) 1302) and/or the server computing device(s) 1310, due to a network connectivity issue, for example. In additional or alternative examples, the server computing device(s) 1302 are not capable of communicating with the server computing device(s) 1310 due to network connectivity issue, for example. In such examples, devices may operate in "offline" mode where at least some payment data is stored (e.g., on the merchant device(s) 1308) and/or the server computing device(s) 1302 until connectivity is restored and the payment data can be transmitted to the server computing device(s) 1302 and/or the server computing device(s) 1310 for processing.

In at least one example, the service provider 1312 can be associated with a hub, such as an order hub, an inventory hub, a fulfillment hub and so on, which can enable integration with one or more additional service providers (e.g., associated with the additional server computing device(s) 1310). In some examples, such additional service providers can offer additional or alternative services and the service provider 1312 can provide an interface or other computer-readable instructions to integrate functionality of the service provider 1312 into the one or more additional service providers.

Techniques described herein are directed to services provided via a distributed system of user devices 1306 that are in communication with one or more server computing devices 1302 of the service provider 1312. That is, techniques described herein are directed to a specific implementation—or, a practical application—of utilizing a distributed system of user devices 1306 that are in communication with one or more server computing devices 1302 of the service provider 1312 to perform a variety of services, as described above. The unconventional configuration of the distributed system described herein enables the server computing device(s) 1302 that are remotely-located from end-users (e.g., users 1314) to intelligently offer services based on aggregated data associated with the end-users, such as the users 1314 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider 1312, and those outside of the control of the service provider 1312, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1314 and user devices 1306. Furthermore, such features are changed dynamically based on the profiles of the users involved interacting with the GUIs. As such, techniques described herein are directed to improvements to computing systems.

Figure 14:
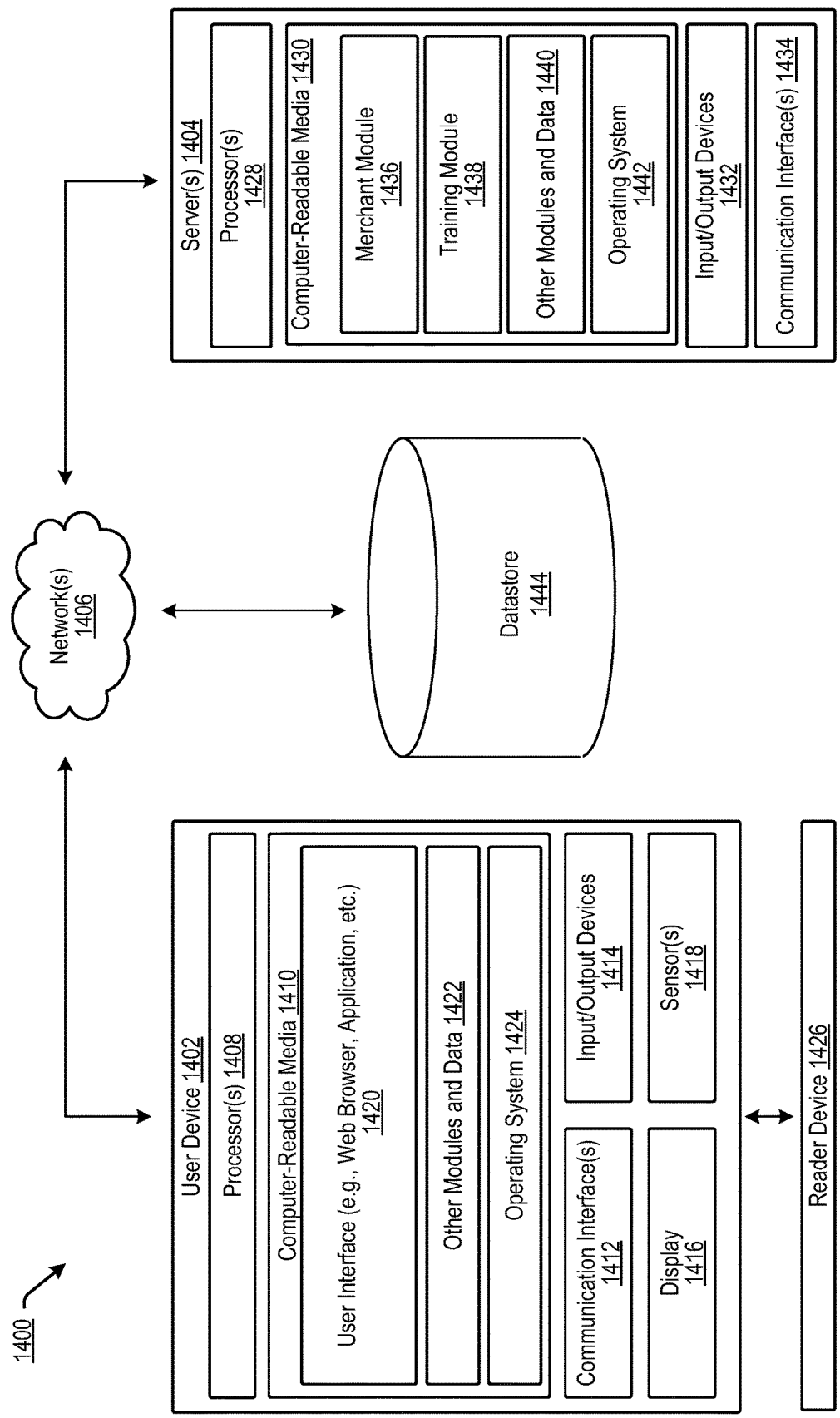
FIG. 14 is an illustrative block diagram illustrating a system for performing techniques described herein.

FIG. 14 depicts an illustrative block diagram illustrating a system 1400 for performing techniques described herein. The system 1400 includes a user device 1402, that communicates with server computing device(s) (e.g., server(s) 1404) via network(s) 1406 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1402 is illustrated, in additional or alternate examples, the system 1400 can have multiple user devices, as described above with reference to FIG. 13.

In some examples, the BAM store control system 100 of FIG. 1 can include one or more of the server(s) 1404. The customer device 104 of FIG. 1 may be an example of a user device 1402. The merchant device 108 of FIG. 1 may be an example of a user device 1402. The BAM store area device 110 of FIG. 1 may be an example of a user device 1402. The data structures 186 may be examples of the datastore 1444, or vice versa. In some examples, the server(s) 1404, in some cases using the datastore 1444 and/or the user devices 1402, perform at least a subset of the operations 300, 400, 500, 600, 700, 800, 900, 1000, 1100, and/or 1200 of FIGS. 3-12, respectively.

In at least one example, the user device 1402 can be any suitable type of computing device, e.g., portable, semi-portable, semi-stationary, or stationary. Some examples of the user device 1402 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1402 can be any computing device capable of sending communications and performing the functions according to the techniques described herein. The user device 1402 can include devices, e.g., payment card readers, or components capable of accepting payments, as described below.

In the illustrated example, the user device 1402 includes one or more processors 1408, one or more computer-readable media 1410, one or more communication interface(s) 1412, one or more input/output (I/O) devices 1414, a display 1416, and sensor(s) 1418.

In at least one example, each processor 1408 can itself comprise one or more processors or processing cores. For example, the processor(s) 1408 can be implemented as one or more microprocessors, microcomputers, microcontrollers, digital signal processors, central processing units, state machines, logic circuitries, and/or any devices that manipulate signals based on operational instructions. In some examples, the processor(s) 1408 can be one or more hardware processors and/or logic circuits of any suitable type specifically programmed or configured to execute the algorithms and processes described herein. The processor(s) 1408 can be configured to fetch and execute computer-readable processor-executable instructions stored in the computer-readable media 1410.

Depending on the configuration of the user device 1402, the computer-readable media 1410 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1410 can include, but is not limited to, RAM, ROM, EEPROM, flash memory, solid-state storage, magnetic disk storage, optical storage, and/or other computer-readable media technology. Further, in some examples, the user device 1402 can access external storage, such as RAID storage systems, storage arrays, network attached storage, storage area networks, cloud storage and/or processing, or any other medium that can be used to store information and that can be accessed by the processor(s) 1408 directly or through another computing device or network. Accordingly, the computer-readable media 1410 can be computer storage media able to store instructions, modules or components that can be executed by the processor(s) 1408. Further, when mentioned, non-transitory computer-readable media exclude media such as energy, carrier signals, electromagnetic waves, and signals per se.

The computer-readable media 1410 can be used to store and maintain any number of functional components that are executable by the processor(s) 1408. In some implementations, these functional components comprise instructions or programs that are executable by the processor(s) 1408 and that, when executed, implement operational logic for performing the actions and services attributed above to the user device 1402. Functional components stored in the computer-readable media 1410 can include a user interface 1420 to enable users to interact with the user device 1402, and thus the server(s) 1404 and/or other networked devices. In at least one example, the user interface 1420 can be presented via a web browser, or the like. In other examples, the user interface 1420 can be presented via an application, such as a mobile application or desktop application, which can be provided by a service provider 1312 associated with the server(s) 1404, or which can be an otherwise dedicated application. In some examples, the user interface 1420 can be web interfaces 128, software application interfaces 130, chat bot interfaces 134, or any other interfaces discussed with respect to the interface layer 120. In at least one example, a user can interact with the user interface via touch input, spoken input, gesture, or any other type of input. The word "input" is also used to describe "contextual" input that may not be directly provided by the user via the user interface 1420. For example, user's interactions with the user interface 1420 are analyzed using, e.g., natural language processing techniques, to determine context or intent of the user, which may be treated in a manner similar to "direct" user input.

Depending on the type of the user device 1402, the computer-readable media 1410 can also optionally include other functional components and data, such as other modules and data 1422, which can include programs, drivers, etc., and the data used or generated by the functional components. In addition, the computer-readable media 1410 can also store data, data structures and the like, that are used by the functional components. Further, the user device 1402 can include many other logical, programmatic and physical components, of which those described are merely examples that are related to the discussion herein.

In at least one example, the computer-readable media 1410 can include additional functional components, such as an operating system 1424 for controlling and managing various functions of the user device 1402 and for enabling basic user interactions.

The communication interface(s) 1412 can include one or more interfaces and hardware components for enabling communication with various other devices, such as over the network(s) 1406 or directly. For example, communication interface(s) 1412 can enable communication through one or more network(s) 1406, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1402 can further include one or more input/output (I/O) devices 1414. The I/O devices 1414 can include speakers, a microphone, a camera, and various user controls (e.g., buttons, a joystick, a keyboard, a keypad, etc.), a haptic output device, and so forth. The I/O devices 1414 can also include attachments that leverage the accessories (audio-jack, USB-C, Bluetooth, etc.) to connect with the user device 1402.

In at least one example, user device 1402 can include a display 1416. Depending on the type of computing device(s) used as the user device 1402, the display 1416 can employ any suitable display technology. For example, the display 1416 can be a liquid crystal display, a plasma display, a light emitting diode display, an OLED (organic light-emitting diode) display, an electronic paper display, or any other suitable type of display able to present digital content thereon. In at least one example, the display 1416 can be an augmented reality display, a virtually reality display, or any other display able to present and/or project digital content. In some examples, the display 1416 can have a touch sensor associated with the display 1416 to provide a touchscreen display configured to receive touch inputs for enabling interaction with a graphic interface presented on the display 1416. Accordingly, implementations herein are not limited to any particular display technology. Alternatively, in some examples, the user device 1402 may not include the display 1416, and information can be presented by other means, such as aurally, haptically, etc.

In addition, the user device 1402 can include sensor(s) 1418. The sensor(s) 1418 can include a GPS device able to indicate location information. Further, the sensor(s) 1418 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1312, described above, to provide one or more services. That is, in some examples, the service provider 1312 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1314 and/or for sending users 1314 notifications regarding available appointments with merchant(s) located proximate to the users 1314. In at least one example, location can be used for taking payments from nearby customers when they leave a geofence, or location can be used to initiate an action responsive to users 1314 enter a brick-and-mortar store of a merchant. Location can be used in additional or alternative ways as well.

Additionally, the user device 1402 can include various other components that are not shown, examples of which include removable storage, a power source, such as a battery and power control unit, a barcode scanner, a printer, a cash drawer, and so forth.

In addition, in some examples, the user device 1402 can include, be connectable to, or otherwise be coupled to a reader device 1426, for reading payment instruments and/or identifiers associated with payment objects. In some examples, as described above, the reader device 1426 can plug in to a port in the user device 1402, such as a microphone port, a headphone port, an audio-jack, a data port, or other suitable port. In additional or alternative examples, the reader device 1426 can be coupled to the user device 1402 via another wired or wireless connection, such as via a Bluetooth®, BLE, and so on. The reader device 1426 can include a read head for reading a magnetic strip of a payment card, and further can include encryption technology for encrypting the information read from the magnetic strip. Additionally or alternatively, the reader device 1426 can be an EMV payment reader, which in some examples, can be embedded in the user device 1402. Moreover, numerous other types of readers can be employed with the user device 1402 herein, depending on the type and configuration of the user device 1402.

The reader device 1426 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1426 may include hardware implementation, such as slots, magnetic tracks, and rails with one or more sensors or electrical contacts to facilitate detection and acceptance of a payment instrument. That is, the reader device 1426 may include hardware implementations to enable the reader device 1426 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1426 may also include a biometric sensor to receive and process biometric characteristics and process them as payment instruments, given that such biometric characteristics are registered with the payment service system 100 and connected to a financial account with a bank server.

The reader device 1426 may include processing unit(s), computer-readable media, a reader chip, a transaction chip, a timer, a clock, a network interface, a power supply, and so on. The processing unit(s) of the reader device 1426 may execute one or more modules and/or processes to cause the reader device 1426 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1426, the computer-readable media may include volatile memory (such as RAM), non-volatile memory (such as ROM, flash memory, miniature hard drive, memory card, or the like), or some combination thereof. In at least one example, the computer-readable media of the reader device 1426 may include at least one module for performing various functions as described herein.

The reader chip may perform functionalities to control the operations and processing of the reader device 1426. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 146, which may provide a clock signal indicating a time. Furthermore, the reader chip may perform functionality to control the network interface, which may interface with the network(s) 1406, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1426. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1402, which can be a POS terminal, and the reader device 1426 are shown as separate devices, in additional or alternative examples, the user device 1402 and the reader device 1426 can be part of a single device, which may be a battery-operated device. In such an example, components of both the user device 1402 and the reader device 1426 may be associated with the single device. In some examples, the reader device 1426 can have a display integrated therewith, which can be in addition to (or as an alternative of) the display 1416 associated with the user device 1402.

The server(s) 1404 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1404 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1404 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1404 can include one or more processors 1428, one or more computer-readable media 1430, one or more I/O devices 1432, and one or more communication interfaces 1434. Each processor 1428 can be a single processing unit or a number of processing units, and can include single or multiple computing units or multiple processing cores. The processor(s) 1428 can be implemented as one or more microprocessors, microcomputers, microcontrollers, digital signal processors, central processing units, state machines, logic circuitries, and/or any devices that manipulate signals based on operational instructions. For example, the processor(s) 1428 can be one or more hardware processors and/or logic circuits of any suitable type specifically programmed or configured to execute the algorithms and processes described herein. The processor(s) 1428 can be configured to fetch and execute computer-readable instructions stored in the computer-readable media 1430, which can program the processor(s) 1428 to perform the functions described herein.

The computer-readable media 1430 can include volatile and nonvolatile memory and/or removable and non-removable media implemented in any type of technology for storage of information, such as computer-readable instructions, data structures, program modules, or other data. Such computer-readable media 1430 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage and/or processing, or any other medium that can be used to store the desired information and that can be accessed by a computing device. Depending on the configuration of the server(s) 1404, the computer-readable media 1430 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1430 can be used to store any number of functional components that are executable by the processor(s) 1428. In many implementations, these functional components comprise instructions or programs that are executable by the processors 1428 and that, when executed, specifically configure the one or more processors 1428 to perform the actions attributed above to the service provider 1312 and/or payment processing service. Functional components stored in the computer-readable media 1430 can optionally include a merchant module 1436, a training module 1438, and one or more other modules and data 1440.

The merchant module 1436 can be configured to receive transaction data from POS systems, such as the POS system 1324 described above with reference to FIG. 13. The merchant module 1436 can transmit requests (e.g., authorization, capture, settlement, etc.) to payment service server computing device(s) to facilitate POS transactions between merchants and customers. The merchant module 1436 can communicate the successes or failures of the POS transactions to the POS systems.

The training module 1438 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1402 and/or the server(s) 1404 for use at a time after the data models have been trained (e.g., at runtime).

The one or more other modules and data 1440 can include the customer pose identification and tracking engine 144, the merchant pose identification and tracking engine 146, the product/service pose identification and tracking engine 148, the spatial mapping engine 150, the customer identifier and account management engine 152, the merchant identifier and account management engine 154, the customer preferences and needs identification and tracking engine 156, the merchant preferences and needs identification and tracking engine 158, the customer history tracking engine 160, the merchant history tracking engine 162, the customer experience customization engine 164, the merchant experience customization engine 166, the inventory management engine 168, the scheduling management engine 170, the supply chain management engine 172, the training management engine 174, the sensor and device onboarding engine 176, the learning management engine 176, or a combination thereof, the functionality of which is described, at least partially, above. Further, the one or more other modules and data 1440 can include programs, drivers, etc., and the data used or generated by the functional components. Further, the server(s) 1404 can include many other logical, programmatic and physical components, of which those described above are merely examples that are related to the discussion herein.

The one or more "modules" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In additional and/or alternative examples, the module(s) may be implemented as computer-readable instructions, various data structures, and so forth via at least one processing unit to configure the computing device(s) described herein to execute instructions and to perform operations as described herein.

In some examples, a module may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1430 can additionally include an operating system 1442 for controlling and managing various functions of the server(s) 1404.

The communication interface(s) 1434 can include one or more interfaces and hardware components for enabling communication with various other devices, such as over the network(s) 1406 or directly. For example, communication interface(s) 1434 can enable communication through one or more network(s) 1406, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1402 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1404 can further be equipped with various I/O devices 1432. Such I/O devices 1432 can include a display, various user interface controls (e.g., buttons, joystick, keyboard, mouse, touch screen, biometric or sensory input devices, etc.), audio speakers, connection ports and so forth.

In at least one example, the system 1400 can include a datastore 1444 that can be configured to store data that is accessible, manageable, and updatable. In some examples, the datastore 1444 can be integrated with the user device 1402 and/or the server(s) 1404. In other examples, as shown in FIG. 14, the datastore 1444 can be located remotely from the server(s) 1404 and can be accessible to the server(s) 1404. The datastore 1444 can comprise multiple databases and/or servers connected locally and/or remotely via the network(s) 1406.

In at least one example, the datastore 1444 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification/code (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 1312.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the account(s) 118, described above with reference to FIG. 1, can include or be associated with the merchant profiles and/or customer profiles described above.

Furthermore, in at least one example, the datastore 1444 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1444 can store additional or alternative types of data as described herein.

As described above, one aspect of the present technology is the gathering and use of data available from various sources to customize retail experiences for customers and/or merchants. The present disclosure contemplates that in some instances, this gathered data may include personal information data that uniquely identifies or can be used to contact or locate a specific person. Such personal information data can include demographic data, location-based data, telephone numbers, email addresses, social media handles, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to customize retail experiences for customers and/or merchants. Accordingly, use of such personal information data enables retail experiences to be customized based on personal details for individuals. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Account-ability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 15:
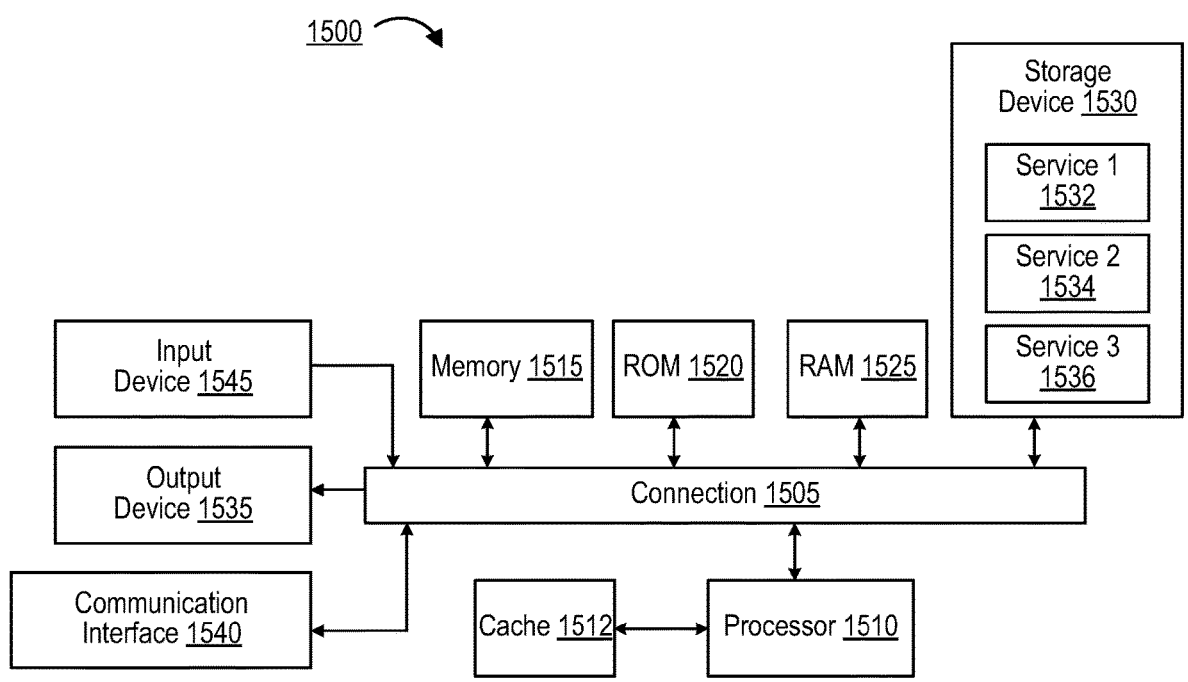
FIG. 15 is a block diagram of an exemplary computing device that may be used to implement some aspects of the technology.

FIG. 15 illustrates an exemplary computing system 1500 that may be used to implement some aspects of the technology. For example, any of the computing devices, computing systems, network devices, network systems, servers, and/or arrangements of circuitry described herein may include at least one computing system 1500, or may include at least one component of the computer system 1500 identified in FIG. 15.

Examples of computing system(s) 1500 may include the BAM store control system 100 of FIG. 1, the customer device 104 of FIG. 1, the merchant device 108 of FIG. 1, the BAM store area device 110 of FIG. 1, the data structures 186 of FIG. 1, the server computing device(s) 1302, the user devices 1306, the user device 1402, the datastore 1444, the server(s) 1404. In some examples, the computing system(s) 1500 can perform at least a subset of the operations 300, 400, 500, 600, 700, 800, 900, 1000, 1100, and/or 1200 of FIGS. 3-12, respectively.

The computing system 1500 of FIG. 15 includes one or more processors 1510 and memory 1520. Each of the processor(s) 1510 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 1510 may include one or more cores, either integrated onto a single chip or spread across multiple chips connected or coupled together. Memory 1520 stores, in part, instructions and data for execution by processor 1510. Memory 1520 can store the executable code when in operation. The system 1500 of FIG. 15 further includes a mass storage device 1530, portable storage medium drive(s) 1540, output devices 1550, user input devices 1560, a graphics display 1570, and peripheral devices 1580.

The components shown in FIG. 15 are depicted as being connected via a single bus 1590. However, the components may be connected through one or more data transport means. For example, processor unit 1510 and memory 1520 may be connected via a local microprocessor bus, and the mass storage device 1530, peripheral device(s) 1580, portable storage device 1540, and display system 1570 may be connected via one or more input/output (I/O) buses.

Mass storage device 1530, which may be implemented with a magnetic disk drive or an optical disk drive, is a non-volatile storage device for storing data and instructions for use by processor unit 1510. Mass storage device 1530 can store the system software for implementing some aspects of the subject technology for purposes of loading that software into memory 1520.

Portable storage device 1540 operates in conjunction with a portable non-volatile storage medium, such as a floppy disk, compact disk or Digital video disc, to input and output data and code to and from the computer system 1500 of FIG. 15. The system software for implementing aspects of the subject technology may be stored on such a portable medium and input to the computer system 1500 via the portable storage device 1540.

The memory 1520, mass storage device 1530, or portable storage 1540 may in some cases store sensitive information, such as transaction information, health information, or cryptographic keys, and may in some cases encrypt or decrypt such information with the aid of the processor 1510. The memory 1520, mass storage device 1530, or portable storage 1540 may in some cases store, at least in part, instructions, executable code, or other data for execution or processing by the processor 1510.

Output devices 1550 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 1570. The printer may be inkjet, laserjet, thermal, or some combination thereof. In some cases, the output device circuitry 1550 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1502.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Output devices 1550 may include any ports, plugs, antennae, wired or wireless transmitters, wired or wireless transceivers, or any other components necessary for or usable to implement the communication types listed above, such as cellular Subscriber Identity Module (SIM) cards.

Input devices 1560 may include circuitry providing a portion of a user interface. Input devices 1560 may include an alpha-numeric keypad, such as a keyboard, for inputting alpha-numeric and other information, or a pointing device, such as a mouse, a trackball, stylus, or cursor direction keys. Input devices 1560 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1502.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, personal area network (PAN) signal transfer, wide area network (WAN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Input devices 1560 may include any ports, plugs, antennae, wired or wireless receivers, wired or wireless transceivers, or any other components necessary for or usable to implement the communication types listed above, such as cellular SIM cards.

Input devices 1560 may include receivers or transceivers used for positioning of the computing system 1500 as well. These may include any of the wired or wireless signal receivers or transceivers. For example, a location of the computing system 1500 can be determined based on signal strength of signals as received at the computing system 1500 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 1500 such as a router, modem, switch, hub, bridge, gateway, or repeater. These may also include Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 1560 may include receivers or transceivers corresponding to one or more of these GNSS systems.

Display system 1570 may include a liquid crystal display (LCD), a plasma display, an organic light-emitting diode (OLED) display, an electronic ink or "e-paper" display, a projector-based display, a holographic display, or another suitable display device. Display system 1570 receives textual and graphical information, and processes the information for output to the display device. The display system 1570 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 1580 may include any type of computer support device to add additional functionality to the computer system. For example, peripheral device(s) 1580 may include one or more additional output devices of any of the types discussed with respect to output device 1550, one or more additional input devices of any of the types discussed with respect to input device 1560, one or more additional display systems of any of the types discussed with respect to display system 1570, one or more memories or mass storage devices or portable storage devices of any of the types discussed with respect to memory 1520 or mass storage 1530 or portable storage 1540, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 1500 of FIG. 15 can include those typically found in computer systems that may be suitable for use with some aspects of the subject technology and represent a broad category of such computer components that are well known in the art. That said, the computer system 1500 of FIG. 15 can be customized and specialized for the purposes discussed herein and to carry out the various operations discussed herein, with specialized hardware components, specialized arrangements of hardware components, and/or specialized software. Thus, the computer system 1500 of FIG. 15 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 1500 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® AudioOS®, Amazon® Fire OS®, Amazon® Kindle OS®, variants of any of these, other suitable operating systems, or combinations thereof. The computer system 1500 may also use a Basic Input/Output System (BIOS) or Unified Extensible Firmware Interface (UEFI) as a layer upon which the operating system(s) are run.

In some cases, the computer system 1500 may be part of a multi-computer system that uses multiple computer systems 1500, each for one or more specific tasks or purposes. For example, the multi-computer system may include multiple computer systems 1500 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 1500 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 1520, the mass storage 1530, the portable storage 1540, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 1510 for execution. A bus 1590 carries the data to system RAM or another memory 1520, from which a processor 1510 retrieves and executes the instructions. The instructions received by system RAM or another memory 1520 can optionally be stored on a fixed disk (mass storage device 1530/portable storage 1540) either before or after execution by processor 1510. Various forms of storage may likewise be implemented as well as the necessary network interfaces and network topologies to implement the same.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 3-12 for convenience and ease of understanding. However, the methods illustrated are not limited to being performed using components described in FIGS. 3-12, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 1500 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A system for identifying an interaction in a merchant brick-and-mortar (BAM) area, the system comprising:
   one or more sensors that are located within a BAM area associated with a merchant and include at least one camera with a field of view covering at least part of the BAM area;
   one or more memory units storing instructions; and
   one or more processors, wherein execution of the instructions by the one or more processors causes the one or more processors to:
      receive, from the one or more sensors, sensor data captured by the one or more sensors, the sensor data including at least one image of the BAM area captured by the at least one camera;
      identify, in the sensor data and based on extraction of a first set of features from the sensor data and classification of the first set of features, a representation of an individual who is located in the BAM area, the first set of features including at least a first image feature of the at least one image;
      track, based on the representation of the individual in the sensor data and one or more respective locations of the one or more sensors in the BAM area, one or more locations of the individual within the BAM area as the individual moves through the BAM area;
      identify, in the sensor data and based on extraction of a second set of features from the sensor data and analysis of the second set of features, a representation of an object that is in the BAM area, the second set of features including at least a second image feature of the at least one image;
      determine that the individual has moved the object across a boundary of an inventory area within the BAM area based on at least one of the representation of the individual, the representation of the object, or the one or more locations of the individual within the BAM area;
      automatically adjust a merchantable inventory of the object in response to determination of the individual moving the object across the boundary of the inventory area;
      automatically track changes over time to a rate of change of the merchantable inventory of the object, the changes including a change based on determination of the individual moving the object across the boundary of the inventory area;
      automatically generate, at a first time and based on input into a trained neural network of the tracked changes over time to the rate of change of the merchantable inventory of the object, a predictive recommendation regarding a predicted quantity at a second time of the merchantable inventory of the object in the inventory area, wherein the second time is after the first time;
      automatically output the predictive recommendation to a merchant device associated with the merchant; and
      automatically train the trained neural network further based on training data that includes the predictive recommendation regarding the predicted quantity compared with an observed quantity of the merchantable inventory of the object in the inventory area at the second time, the observed quantity determined based on additional sensor data from the one or more sensors, the additional sensor data including additional image data from the at least one camera.

2. The system of claim 1, wherein execution of the instructions by the one or more processors causes the one or more processors to:
   determine, based on the representation of the individual, that the individual is a representative of the merchant.

3. The system of claim 1, wherein execution of the instructions by the one or more processors causes the one or more processors to:
   determine, based on the representation of the individual, that the individual is a customer.

4. The system of claim 1, wherein the predictive recommendation identifies a predicted change to the merchantable inventory of the object.

5. The system of claim 1, wherein the predictive recommendation identifies when the merchantable inventory of the object is predicted to run out.

6. The system of claim 1, wherein, to determine that the individual has moved the object across the boundary of the inventory area, the one or more processors determine that the individual has moved the object into the inventory area; and
   wherein, to automatically adjust the merchantable inventory of the object, the one or more processors automatically increase the merchantable inventory of the object.

7. The system of claim 1, wherein, to determine that the individual has moved the object across the boundary of the inventory area, the one or more processors determine that the individual has moved the object out of the inventory area; and
   wherein, to automatically adjust the merchantable inventory of the object, the one or more processors automatically decrease the merchantable inventory of the object.

8. The system of claim 7, wherein execution of the instructions by the one or more processors causes the one or more processors to:
predict that the merchantable inventory of the object is to fall below a minimum threshold quantity at a specified time based on decreasing the merchantable inventory of the object, wherein the predictive recommendation is indicative of the specified time at which the merchantable inventory of the object is to fall below the minimum threshold quantity.

9. The system of claim 7, wherein execution of the instructions by the one or more processors causes the one or more processors to:
generate a schedule to replenish the merchantable inventory of the object based on and in response to decreasing the merchantable inventory of the object, wherein the predictive recommendation is indicative of the schedule to replenish the merchantable inventory of the object.

10. The system of claim 1, wherein, to output the predictive recommendation to the merchant, the one or more processors track a personal inventory of the individual and transmit the personal inventory to a point of sale (POS) device, wherein execution of the instructions by the one or more processors causes the one or more processors to:
receive verification from the POS device that the personal inventory identifies at least the object; and
initiate processing of one or more transactions for at least the object identified by the personal inventory using payment information associated with the individual in response to receipt of the verification.

11. The system of claim 1, wherein execution of the instructions by the one or more processors causes the one or more processors to:
track a personal inventory of the individual based on the determination of the individual moving the object across the boundary of the inventory area;
identify, in the sensor data, a second representation of the individual;
determine, based on the second representation of the individual, that the individual has exited the BAM area; and
initiate processing of one or more transactions for at least the object identified by the personal inventory using payment information associated with the individual in response to determining that the individual has exited the BAM area.

12. The system of claim 1, wherein execution of the instructions by the one or more processors causes the one or more processors to:
track a personal inventory of the individual based on the determination of the individual moving the object across the boundary of the inventory area;
identify, in the sensor data, a second representation of the individual;
determine, based on the second representation of the individual, that the individual has entered a second BAM area associated with a second merchant; and
initiate processing of one or more transactions for one or more objects identified by the personal inventory using payment information associated with the individual in response to determining that the individual has entered the second BAM area, wherein processing of the one or more transactions includes transferring funds for the object to the merchant and transferring funds for a second object of the one or more objects to the second merchant.

13. The system of claim 1, wherein the one or more sensors include at least one image sensor of the at least one camera, wherein identifying the representation of the individual includes detecting the individual in the at least one image using at least one object detection algorithm, and wherein identifying the representation of the object includes detecting the object in the at least one image using the at least one object detection algorithm.

14. The system of claim 1, wherein the one or more sensors include one or more local wireless signal transceivers, wherein the sensor data includes one or more local wireless communications between the one or more local wireless signal transceivers and one or more wireless communication devices within wireless communication range of the one or more local wireless signal transceivers, wherein identifying the representation of the individual includes identifying a first wireless communication device of the one or more wireless communication devices based on the one or more local wireless communications, the first wireless communication device associated with the individual.

15. A method for identifying an interaction in a merchant brick-and-mortar (BAM) area, the method comprising:
receiving, from one or more sensors that are located within a BAM area associated with a merchant, sensor data captured by the one or more sensors, wherein the one or more sensors include at least one camera with a field of view covering at least part of the BAM area, wherein the sensor data includes at least one image of the BAM area captured by the at least one camera;
identifying, in the sensor data and based on extraction of a first set of features from the sensor data and classification of the first set of features, a representation of an individual who is located in the BAM area, the first set of features including at least a first image feature of the at least one image;
tracking, based on the representation of the individual in the sensor data and one or more respective locations of the one or more sensors in the BAM area, one or more locations of the individual within the BAM area as the individual moves through the BAM area;
identifying, in the sensor data and based on extraction of a second set of features from the sensor data and analysis of the second set of features, a representation of an object that is in the BAM area, the second set of features including at least a second image feature of the at least one image;
determining that the individual has moved the object across a boundary of an inventory area within the BAM area based on at least one of the representation of the individual, the representation of the object, or the one or more locations of the individual within the BAM area;
automatically adjusting a merchantable inventory of the object in response to determination of the individual moving the object across the boundary of the inventory area;
automatically tracking changes over time to a rate of change of the merchantable inventory of the object, the changes including a change based on determination of the individual moving the object across the boundary of the inventory area;
automatically generating, at a first time and based on input into a trained neural network of the tracked changes over time to the rate of change of the merchantable inventory of the object, a predictive recommendation regarding a predicted quantity at a second time of the merchantable inventory of the object in the inventory area, wherein the second time is after the first time;

automatically outputting the predictive recommendation to a merchant device associated with the merchant; and automatically training the trained neural network further based on training data that includes the predictive recommendation regarding the predicted quantity compared with an observed quantity of the merchantable inventory of the object in the inventory area at the second time, the observed quantity determined based on additional sensor data from the one or more sensors, the additional sensor data including additional image data from the at least one camera.

16. The method of claim 15, further comprising:
determining, based on the representation of the individual, that the individual is a representative of the merchant.

17. The method of claim 15, further comprising:
determining, based on the representation of the individual, that the individual is a customer.

18. The method of claim 15, wherein determining that the individual has moved the object across the boundary of the inventory area includes determining that the individual has moved the object into the inventory area, and wherein automatically adjusting the merchantable inventory of the object includes automatically increasing the merchantable inventory of the object.

19. The method of claim 15, wherein determining that the individual has moved the object across the boundary of the inventory area includes determining that the individual has moved the object out of the inventory area, and wherein automatically adjusting the merchantable inventory of the object includes automatically decreasing the merchantable inventory of the object.

20. The system of claim 1, wherein the predictive recommendation identifies a predicted need associated with the merchantable inventory of the object and a predicted timing associated with the predicted need.

* * * * *